(12) United States Patent
England et al.

(10) Patent No.: US 10,325,325 B2
(45) Date of Patent: Jun. 18, 2019

(54) SOCIAL MARKETPLACE DIGITAL WORTH SCORE

(71) Applicant: Dell Products L.P., Round Rock, TX (US)

(72) Inventors: Aron England, Austin, TX (US); Steven Tedjamulia, Austin, TX (US); Henry Haitian Chen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 14/043,349

(22) Filed: Oct. 1, 2013

(65) Prior Publication Data

US 2014/0040067 A1    Feb. 6, 2014

Related U.S. Application Data

(63) Continuation of application No. 13/466,426, filed on May 8, 2012, now Pat. No. 8,554,635.

(60) Provisional application No. 61/485,767, filed on May 13, 2011.

(51) Int. Cl.
*G06Q 30/00* (2012.01)
*G06Q 50/00* (2012.01)
*G06Q 30/02* (2012.01)
*G06Q 30/06* (2012.01)

(52) U.S. Cl.
CPC ......... *G06Q 50/01* (2013.01); *G06Q 30/0282* (2013.01); *G06Q 30/0631* (2013.01)

(58) Field of Classification Search
CPC .................................................. G06Q 30/00

USPC ........................................................ 705/26.1
See application file for complete search history.

(56) References Cited

U.S. PATENT DOCUMENTS

| | | | |
|---|---|---|---|
| 8,355,955 B1* | 1/2013 | Mirchandani | G06Q 30/02 705/26.1 |
| 2009/0119167 A1* | 5/2009 | Kendall | G06Q 30/02 705/14.17 |
| 2010/0145772 A1* | 6/2010 | McCauley | G06Q 30/02 705/7.33 |
| 2011/0066662 A1* | 3/2011 | Davis | G06F 16/80 707/811 |
| 2011/0153451 A1* | 6/2011 | Bitz et al. | 705/26.7 |
| 2014/0222556 A1* | 8/2014 | Dutta | G06Q 30/0247 705/14.46 |

* cited by examiner

*Primary Examiner* — Mila Airapetian
(74) *Attorney, Agent, or Firm* — Terrile, Cannatti & Chambers; Stephen A. Terrile

(57) ABSTRACT

A method and system are disclosed for managing catalog resources within a social commerce environment. Users are referred by a plurality of affiliates to a social commerce marketplace system. Once referred, the users are presented with a customized social commerce storefront that is associated with an individual affiliate. Each of the customized social commerce storefronts comprises a micro catalog of purchasable products, which is a subset of a master catalog comprising a set of available products. Social data associated with the user and catalog data associated with the purchasable products is processed to generate product catalog data to the user, which is then provided to the user. The user reviews the social commerce content and selects individual purchasable products for purchase.

14 Claims, 47 Drawing Sheets

SOCIAL MARKETPLACE DIGITAL WORTH SCORE

CROSS-REFERENCE TO RELATED APPLICATION

This application claims the benefit under 35 U.S.C. § 119(e) of U.S. Provisional Application No. 61/485,767, filed May 13, 2011, entitled "Social Marketplace." U.S. Provisional Application No. 61/485,767 includes exemplary systems and methods and is incorporated by reference in its entirety.

BACKGROUND OF THE INVENTION

Field of the Invention

Embodiments of the invention relate generally to information handling systems. More specifically, embodiments of the invention provide a method and system for managing catalog resources within a social commerce environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce on the Internet. One known aspect of electronic commerce is affiliate networks, which allow online merchants to reach a larger audience through participation in various affiliate programs. Typically, potential customers are referred to the merchant's website from an affiliate's web site, which receives a share of any resulting sale as compensation for the referral. Various affiliate network services and benefits generally include referral tracking, reporting tools, payment processing, and access to a large base of participants. Over time, affiliate networks have made progress in simplifying the process of registering affiliate participants fore or more merchant affiliate programs. However, affiliates still face integration challenges when attempting to provide their users a customized subset of the merchant's website.

In recent years, information handling systems have also been instrumental in the widespread adoption of social media into the mainstream of everyday life. Social media commonly refers to the use of web-based technologies for the creation and exchange of user-generated content for social interaction. As such, it currently accounts for approximately 22% of all time spent on the Internet. More recently, various aspects of social media have become an increasingly popular for enabling customer feedback, and by extension, have likewise evolved into a viable marketing channel for vendors. This new marketing channel, sometimes referred to as "social marketing," has proven to not only have a higher customer retention rate than traditional marketing channels, but to also provide higher demand generation "lift."

Currently, social marketing is typically limited to providing a link from a social media environment to the home page of a merchant's website, where a referred user can then search for a recommended product. In some cases, the user may be referred to a predetermined product page or listing. However, no known ability is currently available for a social marketer to refer a user to a customized subset of a merchant's products. Furthermore, social marketers generally lack real-time integration with the merchant's site. As a result, they typically have to rely upon the merchant's traditional methods of referral tracking, reporting, accounting and payment processing. Moreover, there is a lack of simplified integration between merchant websites, affiliate networks, and social media environments, which pose challenges in realizing the promise of social marketing.

SUMMARY OF THE INVENTION

We provide a service to individuals, SMB and enterprises that allow them to give us access to their social networks, analytics to their sites, site content, emails and then we extract information (e.g., keywords) and match it up against our algorithm. Advertisements are then processed with the algorithm to generate a potential dollar worth score for their social property to get a higher SEO score, ad clicks, and product sales. The score will allow them to see what a site is worth if the user plans to ever buy or sell it.

A method and system are disclosed for managing catalog resources within a social commerce environment. In various embodiments, users are referred by a plurality of affiliates to a social commerce marketplace system. Once referred, the users are presented with a customized social commerce storefront that is associated with an individual affiliate. Each of the customized social commerce storefronts comprises a micro catalog of purchasable products, which is a subset of a master catalog comprising a set of available products.

In these and other embodiments, social data associated with the user and catalog data associated with the purchasable products is processed to generate product catalog data to the user, which is then provided to the user. In one embodiment, the product catalog data corresponds to a subset of the purchasable products. In another embodiment, the product catalog data is provided to the user within a user interface (UI) window of a widget. In yet another embodiment, the user's social data is processed to generate social graph data, which in turn is processed to generate keyword and theme data. The keyword and theme data is then processed to identify a subset of the product catalog data, which is then provided to the user.

In one embodiment, the product catalog data is associated with a social commerce campaign. In another embodiment, the product catalog data is associated with various types of social commerce content such as product reviews, ratings and user blogs. In this embodiment, the social commerce content is concurrently provided with the product catalog data to the user. In this and other embodiments, the user reviews the social commerce content and selects individual purchasable products for purchase

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 10 shows the display of affiliate offers within a user interface window;

FIG. 26 shows the display of social commerce data associated with a plurality of merchant products within a user interface window;

DETAILED DESCRIPTION

A method and system are disclosed for managing catalog resources within a social commerce environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
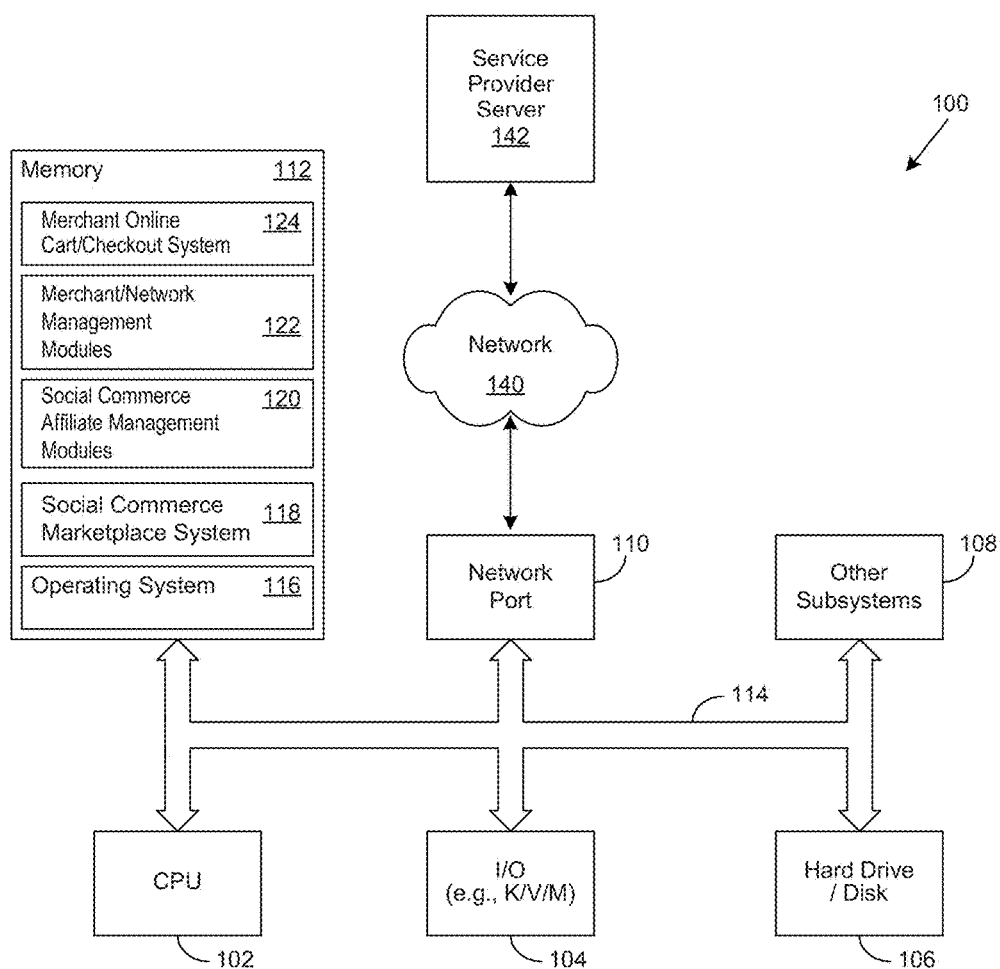
FIG. 1 is a generalized illustration of the components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a social commerce marketplace system 118, a plurality of social commerce affiliate management modules 120, a plurality of merchant/network management modules 122, and a merchant online cart/checkout system 124. In one embodiment, the information handling system 100 is able to download the social commerce marketplace system 118, the plurality of social commerce affiliate management modules 120, the plurality of merchant/network management modules 122, and the merchant online cart/checkout system 124 from the service provider server 142. In another embodiment, the social commerce marketplace system 118, the plurality of social commerce affiliate management modules 120, the plurality of merchant/network management modules 122, and the merchant online cart/checkout system 124 is provided as a service from the service provider server 142.

Figure 2:
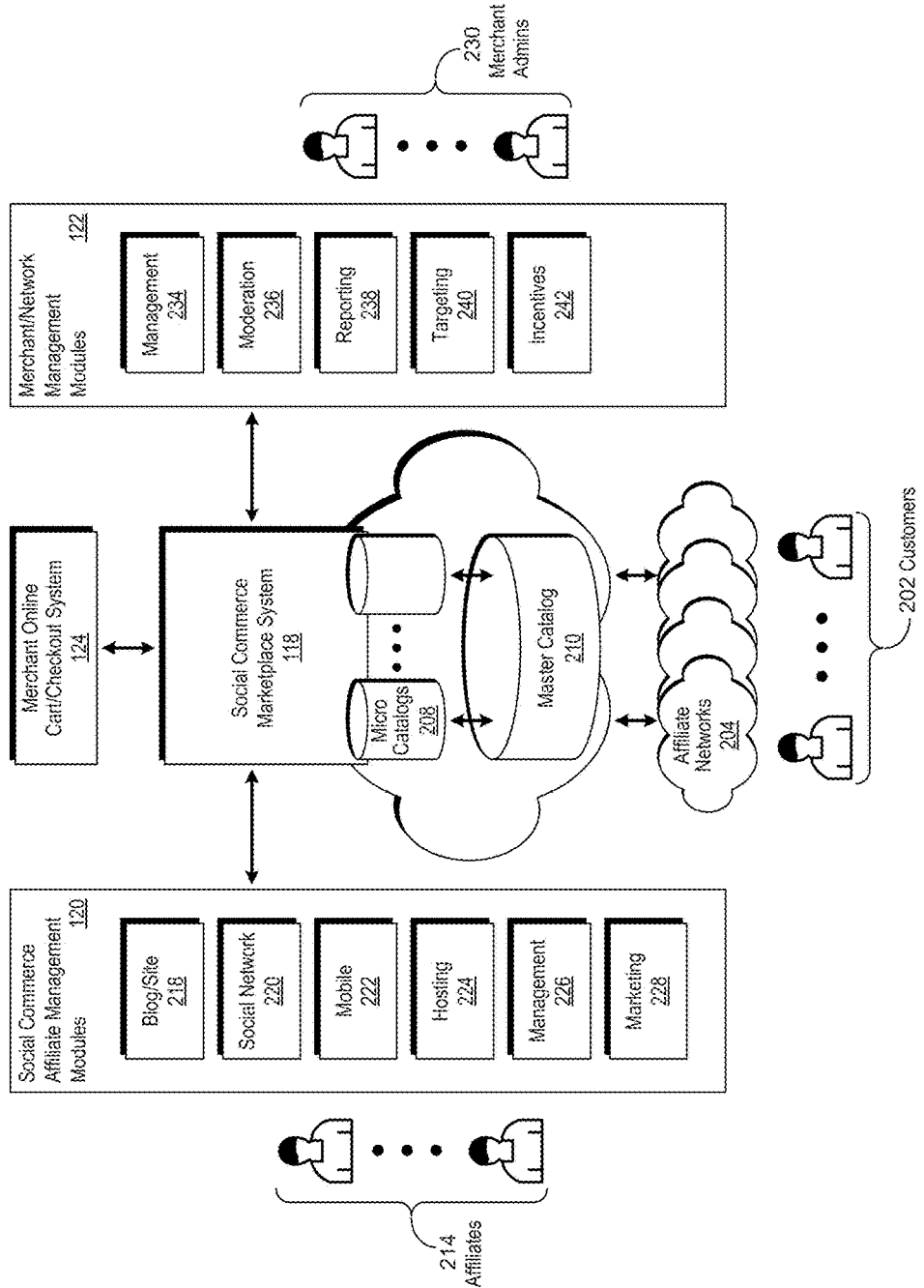
FIG. 2 is a simplified block diagram showing the implementation of a social commerce marketing system.

FIG. 2 is a simplified block diagram showing the implementation of a social commerce marketing system in accordance with an embodiment of the invention. In this embodiment, a social commerce marketplace system 118 is implemented with a plurality of social commerce affiliate management modules 120, a plurality of merchant/network management modules 122, a merchant online cart/checkout system 124. In these and other embodiments, the plurality of social commerce affiliate management modules 120 are accessed and used by a plurality of affiliates 214. Likewise, the plurality of social commerce affiliate management modules 120 comprises a blog/site management module 218, a social network management module 222, and a mobile delivery management module 222. The plurality of social commerce affiliate management modules 120 likewise comprises a hosting management module 224, a social commerce management module 226, and a marketing management module 228.

In one embodiment, the blog/site management module 214 is used by the plurality of affiliates 214 to manage the posting and linking of social commerce content from the affiliate's online blog or website to the social commerce marketplace system 118. In another embodiment, the social network management module 220 is used by the plurality of affiliates 214 to manage the linkages between one or more social media environments and the social commerce marketplace system 118. In yet another embodiment, the mobile delivery management module 222 is used by the plurality of affiliates 214 to manage the delivery of social commerce content to a mobile device. In still another embodiment, the hosting management module 224 is used by the plurality of affiliates 214 to manage the hosting environment(s) of a customized social commerce storefront associated with the affiliate and the merchant. In one embodiment, the social commerce management module 226 is used by the plurality of affiliates 214 to perform social commerce management operations as described in greater detail herein. In yet another embodiment, the marketing management module 228 is used by the plurality of affiliates 214 to perform social commerce marketing operations, as likewise described in greater detail herein.

In various embodiments, the plurality of merchant/network management modules 122 are accessed and used by a plurality of merchant administrators 230. In these and other embodiments, the plurality of merchant/network management modules 122 comprises a merchant/network management module 234, and a social commerce moderation module 236. Likewise, the plurality of merchant/network management modules 122 comprises a social commerce reporting module 238, a targeting module 240, and an incentives module 242.

In one embodiment, the merchant/network management module is used by is used by the plurality of merchant administrators 230 to manage a plurality of affiliate social commerce storefronts and a plurality of affiliate networks 204. In another embodiment, the moderation management module 236 is used by the plurality of merchant administrators 230 to monitor and moderate social commerce content and associated social media content related to the plurality of affiliates 214. In yet another embodiment, the social commerce reporting module 238 is used by the plurality of merchant administrators 230 to administer and deliver a plurality of social commerce reports as described in greater detail herein. In one embodiment, the targeting module 240 is used by the plurality of merchant administrators 230 to perform targeted advertising and promotion operations familiar to those of skill in the art and described in greater detail herein. In another embodiment, the incentives module 242 is used by the plurality of merchant administrators 230 to manage the accounting and payment of incentives to the plurality of affiliates 214 as compensation for referring customers to the merchant. As described in greater detail herein, the plurality of social commerce affiliate management modules 120 and the plurality of merchant/network management modules 122 may include additional modules and the foregoing is not intended to limit the spirit, scope or intent of the invention.

Referring now to FIG. 2, a plurality of users, such as customers 202, are referred by a plurality of affiliate networks 204 to the social commerce marketplace system 118 as described in greater detail. Once referred, the customers 202 are presented with a customized social commerce storefront that is associated with an individual affiliate of the plurality of affiliates 214 and the merchant. In various embodiments, each of the customized social commerce storefronts comprises a micro catalog 208 of purchasable products, which is a subset of a master catalog 210 comprising a set of available products. In these and other embodiments, and as likewise described in greater detail herein, the customized social commerce storefronts comprise social commerce content related to the purchasable products. In these various embodiments, the customers 202 review the social commerce content and select individual purchasable products for purchase. Once selected, an online purchase transaction familiar to skilled practitioners of the art is completed with the merchant online cart/checkout system 124.

Figure 3:
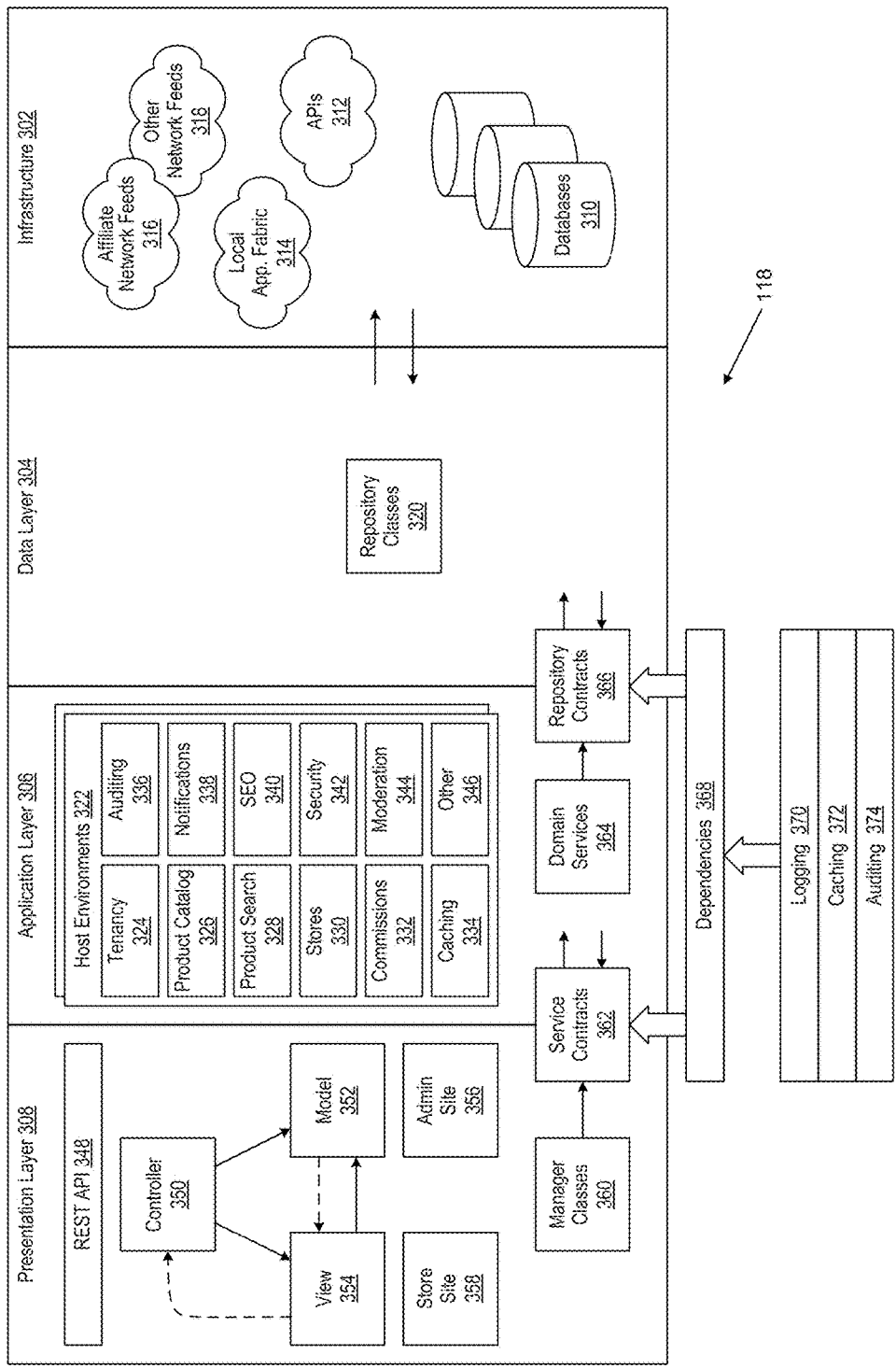
FIG. 3 is a simplified block diagram showing a high-level architecture of a social commerce marketplace system.

FIG. 3 is a simplified block diagram showing a high-level architecture of a social commerce marketplace system as implemented in accordance with an embodiment of the invention. In this embodiment, the architecture a social commerce marketplace system 118 comprises infrastructure 302, data 304, application 306 and presentation 308 layers. As shown in FIG. 3, the infrastructure 302 layer comprises feeds from affiliate networks 316, as described in greater detail herein, and other networks 318, such as advertising networks known to those of skill in the art. The infrastructure 302 layer likewise comprises a local application fabric 314, as likewise known to those of skill in the art, a plurality of application programming interfaces (APIs) 312, and a plurality of databases 310, as described in greater detail herein. The data 304 layer likewise comprises repository classes 320, which are used for the exchange of data between the data 304 and infrastructure 302 layers.

Likewise, the application 306 layer comprises host environments 322, which in turn comprise a tenancy management module 324, a product catalog management module 326, and a product search module 328. The host environments 322 likewise comprise a stores management module 330, a commission management module 332, and a caching module 334. Likewise, the host environments 322 comprise an auditing module 336, a notifications module 338, a search engine optimization (SEO) module 340, a security management module 342, a moderation management module 344, and other modules 346 as described in greater detail herein.

In one embodiment, the tenancy management module 324 is used by merchant administrators to manage a plurality of affiliate tenancies in a virtual environment. In another embodiment, the product catalog management module 326 is used to manage available products in a master catalog and purchasable products, which are subsets of the available products, in micro catalogs as described in greater detail herein. In yet another embodiment, the product search module 328 is used with various other modules in the initiation, provisioning, and management of affiliate storefronts. In still another embodiment, the commission management module 332 is used to track, account, and pay commissions to affiliates as compensation for referring customers to the merchant. In one embodiment, the caching module 334 is used to cache social commerce content and other data related to conducting social commerce operations.

In another embodiment, the auditing module 336 is used to audit social commerce transactions that are performed within the social commerce marketplace system. In yet another embodiment, the notifications module 338 is use to manage notifications to affiliates as well as users referred by the affiliates to the social commerce marketplace system. In still another embodiment, the SEO module 340 is used to perform SEO operations known to skilled practitioners of the art. In this embodiment, the SEO operations, as described in greater detail herein, are performed to optimize the identification of a purchasable product according to the search terms used by either an affiliate or a user of a social media environment. In one embodiment, the security module is used to maintain the security of the social commerce marketplace system. In another embodiment, the moderation module 344 is used to monitor and moderate social commerce content and associated social media content related to a plurality of affiliates. In yet another embodiment, the other modules 346 comprise additional modules, as described in greater detail herein, that operate within the host environments 322.

In various embodiments, the presentation 308 layer comprises a Representational State Transfer (REST) application program interface (API) 348 known to skilled practitioners of the art. In these and other embodiments, the presentation 308 layer likewise comprises a controller module 350 a presentation model 352, a presentation view 354, and a plurality of administration 356 and affiliate storefront 358 sites. In these various embodiments, the controller module 350 interacts with the presentation model 354 and presentation view 354, which likewise interact with each other, to present different aspects of the plurality of administration 356 and affiliate storefront 358 sites. Likewise, the presentation view 354 module provides feedback to the controller module 350.

Referring now to FIG. 3, the presentation 308 layer comprises manager classes 350 and the application 306 layer comprises domain services. The manager classes 360 provide presentation layer data to the service contracts module 362, which is then used for the management of the domain service 364. In turn, the domain services 364 provide application layer data to the repository contracts module 366, where it is used for the management of the repository classes 320. Likewise, the service contracts module 362 and the repository contracts module 366 are managed and bounded by a dependencies module 368. In turn, the dependencies module 368 is managed with the logging 370, caching 372, and auditing 374 management modules.

Figure 4A:
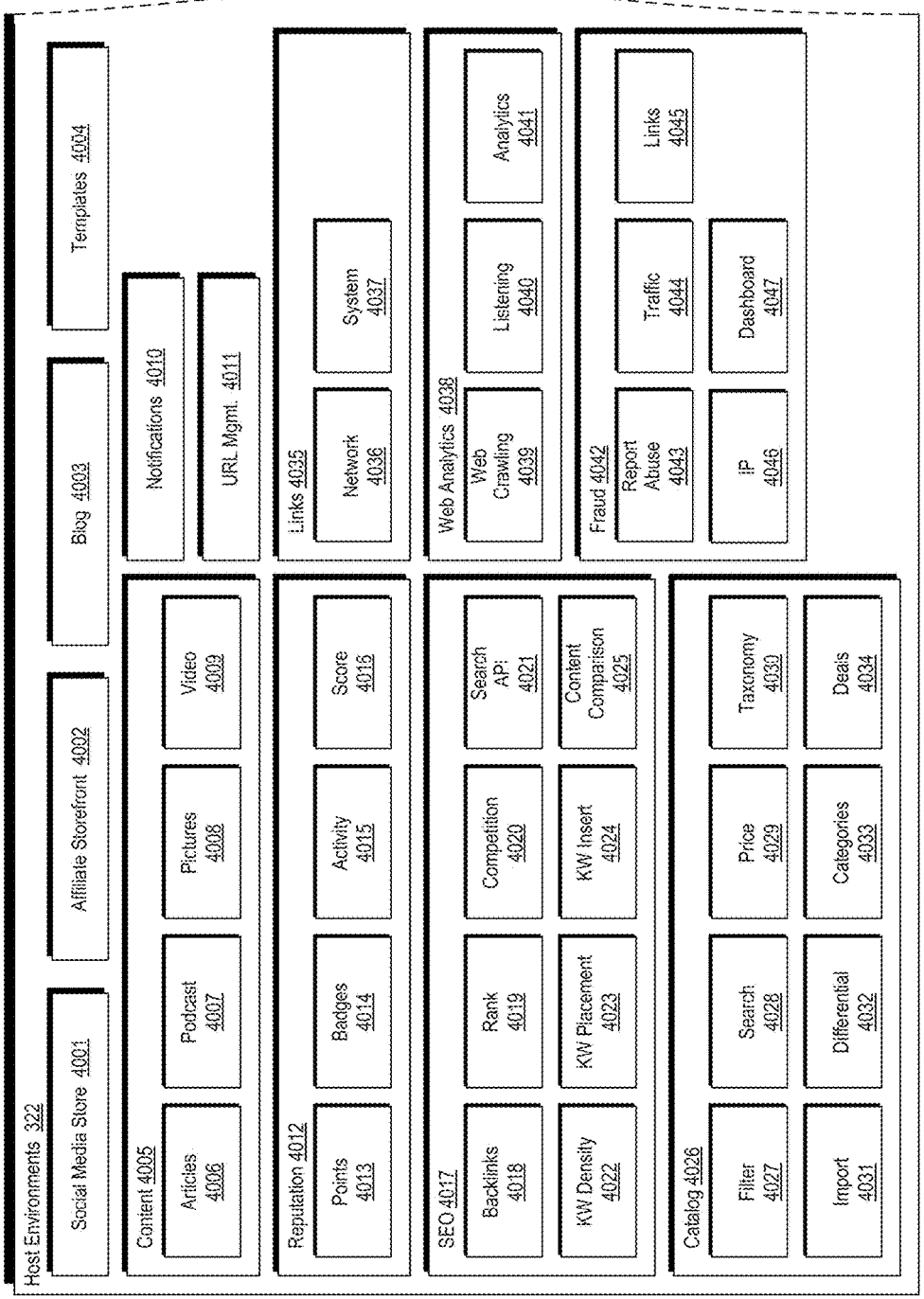
FIGS. 4a-c are a simplified block diagram showing a plurality of social commerce modules implemented within a plurality of host environments.
Figure 4B:
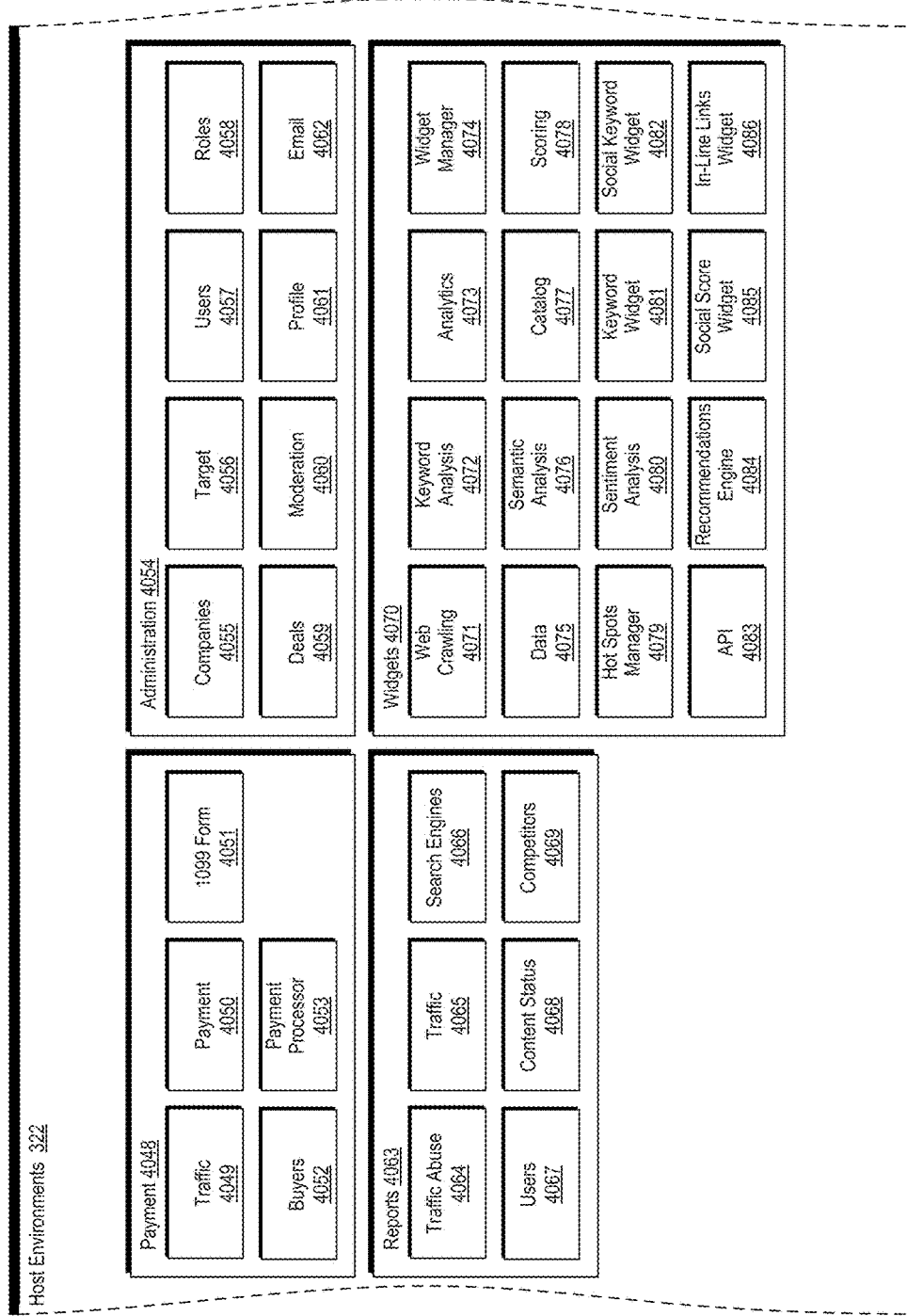
Figure 4C:
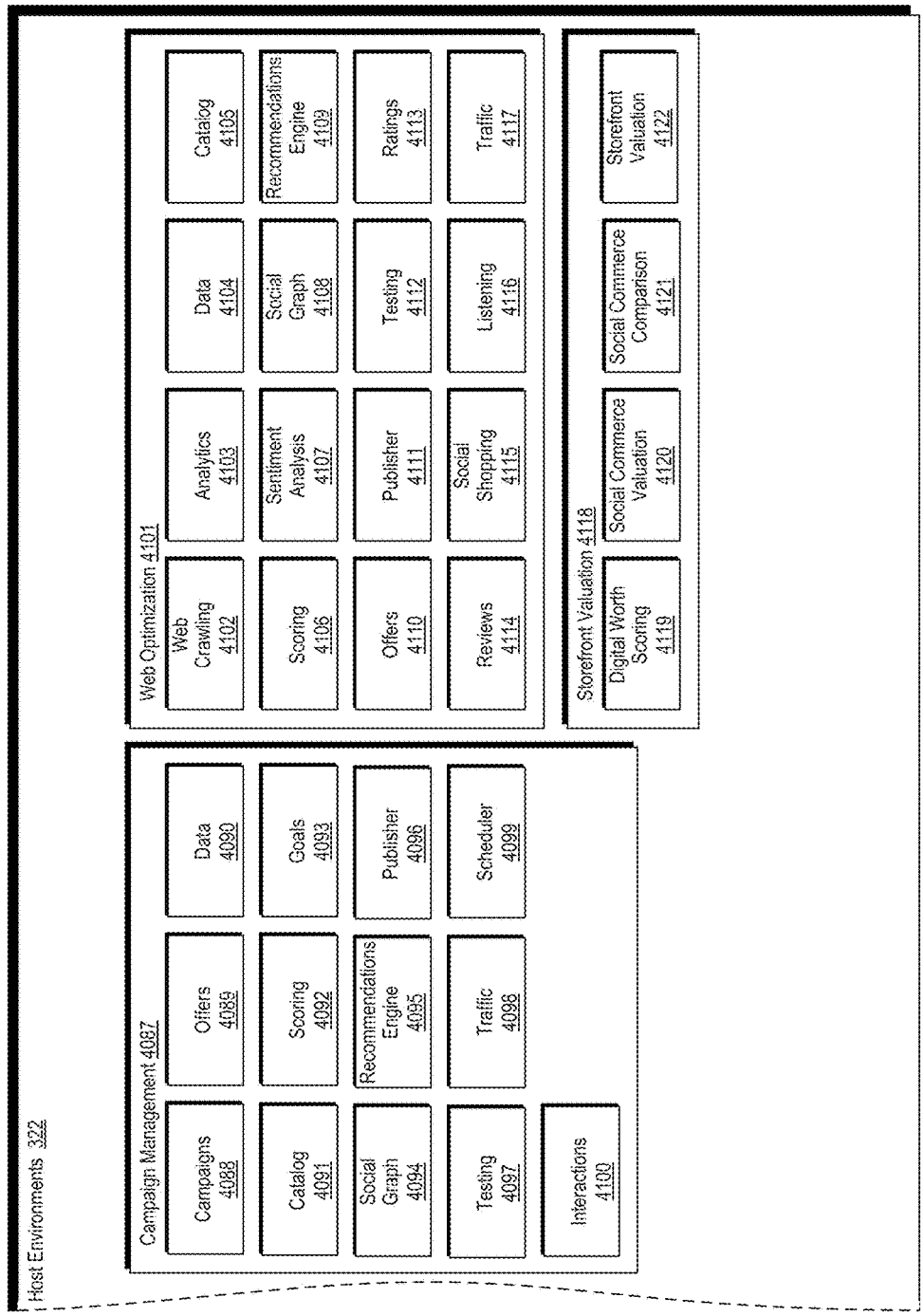

FIGS. 4a-c show a simplified block diagram of a plurality of social commerce modules implemented within a plurality of host environments in accordance with an embodiment of the invention. In this embodiment, the host environments 322 comprise social media store 4001, affiliate storefront 4002, blog 4003, templates 4004, content 4006, notifications 4010, uniform resource locator (URL) 4011, reputation 4012, and search engine optimization (SEO) 4017 management modules. Likewise, the host environments 322 comprise catalog 4026, links 4035, web analytics 4038, fraud 4042, payment 4048, administration 4054, reports 4063, widget 4070, campaign management 4087, web optimization 4101, and storefront valuation 4118 management modules.

In one embodiment, the social media store 4001 management module is used to manage a social commerce storefront that is associated with an affiliate's presence and activities within a social media environment. In another embodiment, the affiliate storefront 4002 management module is used to manage a social commerce storefront that is associated with an affiliate's web site or online blog. In yet another embodiment, the blog 4003 management module is used to manage an affiliate's blog activities as it relates to social commerce activities, processes and operations as described in greater detail herein. In still another embodiment, as likewise described in greater detail herein, the templates 4004 management module is used for the automated configuration of social commerce storefront pages. In one embodiment, the notifications 4010 management module is used for the management of notifications to affiliates and users associated with affiliates, such as users of an affiliate's online social commerce presence. In various embodiments, the affiliate's online presence may comprise a blog, a website, or a community of interest or conversation thread in a social media environment. In another embodiment, the URL 4011 management module is used to manage URL links between the host environments 322 and the affiliate's various online social commerce presences.

In yet another embodiment, the content 4005 management module further comprises articles 4006, podcast 4007, pictures 4008, and video 4009 management sub-modules. In this and other embodiments, the articles 4006, podcast 4007, pictures 4008, and video 4009 management sub-modules are used by affiliates to manage their respective, associated content as it relates to social commerce operations. In still another embodiment, the reputation 4012 management module comprises points 4013, badges 4014, activity 4015, and score 4016 management sub-modules. In this and other embodiments, the reputation 4012 management module comprises points 4013, badges 4014, activity 4015, and score 4016 management sub-modules are used by the merchant to manage reputation data associated with affiliates. As used herein, reputation data refers to data associated with social commerce activities performed by an affiliate. As an example, an affiliate may receive points from a merchant for each item of social commerce content they product. Likewise, badges may be awarded upon achievement of various point tiers or frequency of activity. Likewise, each social commerce content item may receive a score that is associated with the achievement of the points and badges. It will be appreciated that many such examples are possible and the foregoing is not intended to limit the spirit, scope, or intent of the invention.

In one embodiment, the SEO management 4017 module comprises backlinks 4018, rank 4019, competition 4020, search application program interface (API) 4021, keyword density 4022, keyword placement 4023, keyword insertion 4024, and content comparison 4025 management sub-modules. In this and other embodiments the various sub-modules of the SEO management 4017 module are used by affiliates and the merchants to perform SEO operations familiar to those of skill in the art. As an example, the backlinks 4018 management sub-module may be used to determine prior web site locations that a user has visited prior to being referred to an affiliate's social commerce storefront. Likewise, the rank 4019 management sub-module may be used to determine the search engine rank assigned to the affiliate's social commerce storefront as well as the individual search engine ranking of the search terms that resulted in the referral. As another example, the competition 4020 management sub-module may be used by the merchant to rank the search engine popularity of their competitors, or alternatively, the frequency that a competitor's web site is returned as a result of a search by a user of a social media environment. Likewise, the search API 4021 management sub-module may be used by the merchant and affiliates alike to gain access to various search engines in order to receive search metadata. As yet another example, the keyword density 4022, placement 4023, and insertion 4024 management sub-modules may likewise be used by the merchant and the affiliates to optimize searches through the use of predetermined keywords within related social commerce content. As still another example, the content comparison 4025 sub-module may be used to compare various items of social commerce content to determine which items perform better than others during SEO operations.

In another embodiment, the catalog 4026 management module comprises filter 4027, search 4028, price 4029, taxonomy 4030, import 4031, differential 4032, categories 4033, and deals 4034 management sub-modules. In this and other embodiments, the filter 4027, search 4028, price 4029, taxonomy 4030, import 4031, differential 4032, categories 4033, and deals 4034 management sub-modules are used by the affiliate for managing their social commerce storefronts. For example, the filter 4027, search 4028, price 4029, differential 4032, deals 4034, and import 4031 management sub-modules may be used individually, or in combination, to identify and populate a set of purchasable products within a micro catalog from a set of available products contained in a master catalog. Likewise, the taxonomy 4030 and categories 4033 management sub-modules may be used to understand the interrelationship of various purchasable products and how they are categorized within the affiliate's social commerce storefront. It will be appreciated that many such examples are possible and the foregoing is not intended to limit the spirit, scope, or intent of the invention.

In yet another embodiment, the links 4035 management module comprises network 4036 and system 4037 management sub-modules, which are used to manage the linkages between the various systems, modules, and sub-modules of the social commerce marketplace system and various affiliate and advertising networks. In still another embodiment, the web analytics 4038 module comprises web crawling 4039, listening 4040, and analytics 4041 management sub-modules. In this and other embodiments the web crawling 4039, listening 4040, and analytics 4041 management sub-modules are used by the merchant to perform web analytics operations familiar to skilled practitioners of the art. As an example, the merchant may use the web crawling 4039 management sub-module to perform web crawling operations to discover conversation threads associated with its products. Once discovered, the listening 4040 management sub-module may be used to monitor the conversations threads, which are then analyzed with the analytics 4041 management sub-module to determine their relevance and possible effect on social commerce operations. Those of skill in the art will be knowledgeable of many such examples. Accordingly, the foregoing is not intended to limit the spirit, scope, or intent of the invention.

In one embodiment, the fraud 4042 management module comprises an abuse reporting 4043, traffic 4044, links 4045, Internet Protocol (IP) 4046, and dashboard 4047 management sub-modules. In this and other embodiments, the abuse reporting 4043, traffic 4044, links 4045, Internet Protocol (IP) 4046, and dashboard 4047 management sub-modules are used by the merchant to identify, mitigate, and prevent fraudulent behavior within the social commerce marketplace system. As an example, the traffic 4044, links 4045, and IP 4046 management sub-modules may be used to identify the source of fraudulent behavior. Once identified, it may be reported by the abuse reporting 4043 management sub-module and then displayed for review within a user interface by the dashboard 4047 sub-module.

In another embodiment, the payment 4048 module comprises a traffic 4049, payment 4050, 1099 Form 4051, buyers 4052, and payment processor 4053 management sub-modules. In this and other embodiments, the traffic 4149, payment 4150, 1099 4151, buyers 4152, and payment processor 4153, management sub-modules are used by the merchant for the management of payment to affiliates. As an example, the buyers 4052 and traffic 4049 management sub-modules may be used to identify individual buyers and the traffic they generate at an affiliate's social commerce storefront. In turn, the payment 4050 and payment processor 4053 sub-modules may be used to track the payments made by the buyers, which are then processed by various payment processors. Likewise, the same sub-modules may be used to track commission payments made by the merchant to individual affiliates. The output of those sub-modules may then be processed by the 1099 Form 4051 sub-module for managing reporting of the commission payments to the affiliate to the Internal Revenue Service (IRS).

In yet another embodiment, the administration 4054 module comprises companies 4055, target 4056, users 4057, roles 4058, deals 4059, moderation 4060, profile 4061, and email 4062 management sub-modules. In this embodiment, the companies 4055, target 4056, users 4057, roles 4058, deals 4059, moderation 4060, profile 4061, and email 4062 management sub-modules are used by the merchant to administer the various users of the social commerce marketplace system. As an example, the target 4056 management sub-module may be used, individually or in conjunction with, the target 4056, users 4057, profile 4061, and roles 4058 management sub-modules to identify specific users of a social media environment. Once identified, their social media interactions may be monitored by the moderation 4060 management sub-module, and in turn the email 4062 and deals 4059 management sub-modules may be used individually, or in combination, to target predetermined users.

In still another embodiment, the reports module 4063 comprises traffic abuse 4064, traffic 4065, search engines 4066, users 4067, content status 4068, and competitors 4069 reporting sub-modules. In this embodiment, the traffic abuse 4064, traffic 4065, search engines 4066, users 4067, content status 4068, and competitors 4069 reporting sub-modules are used by the merchant to generate various reports related to social commerce operations, which in turn may be provided to an affiliate. As an example, the content status 4068 reporting sub-module may report on the status of various items of social commerce content and the search engines 4066 reporting sub-module may report on the search results it generates. In turn, the traffic reporting 4065 sub-module may be used to report on the social commerce traffic resulting from the search results and the users 4067 reporting sub-module may provide reports related to the various users referred to the social commerce site. Likewise, the traffic abuse reporting sub-module 4064 may be used to report on various traffic abuses related to the social commerce marketplace system, while the competitors 4069 reporting sub-module may provide reports related to competitive activity from competitors.

In various embodiments, the widgets module 4070 may comprise web crawling 4071, keyword analysis 4072, analytics 4073, widget manager 4074, data 4075, semantic analysis 4076, catalog management 4077, scoring 4078, hot spots manager 4079, sentiment analysis 4080, keyword widget 4081, social keyword widget 4082, API 4083, recommendations engine 4084, social score widget 4085 and in-line links widget 4086 sub-modules. In one embodiment, the web-crawling 4071 sub-module is implemented to perform web crawling operations to discover keywords within webpages. In another embodiment, the keyword analysis 4072 sub-module is implemented to determine related keywords, competition of keywords, search frequency of keywords, and locality of keywords. In yet another embodiment, the analytics 4073 sub-module is implemented to provide the utilization of widgets by visitors. In still another embodiment, the widget manager 4074 sub-module is implemented to provide a set of user interfaces to configure and publish a widget. In various embodiments, the widget manager 4074 sub-module is implemented to provide templates that comprise user interface (UI) themes and interactions that determine the end-user experience. In these and other embodiments, the widget manager 4074 sub-module comprises a wizard that provides a multi-step process to configure the widget. In one embodiment, the widget manager 4074 sub-module comprises a dashboard providing a UI to access the wizard, embed associated programming code, and generate related reports.

In one embodiment, the data 4075 sub-module is implemented to process social graph, user, and catalog data. In another embodiment, the semantic analysis 4076 sub-module is implemented to semantically extract keywords, topics, people and places from strings of text. In another embodiment, the catalog 4076 sub-module is implemented with a widget to process catalog data. In yet another embodiment, the hot spots manager 4077 sub-module comprises a set of user interfaces to configure and publish images and videos that contain hot spots. In still another embodiment, the sentiment analysis 4078 sub-module is implemented to extract positive, neutral and negative tone from strings of text. In one embodiment, the page keyword widget 4079 sub-module is implemented to provide a widget that automatically matches catalog products to the context of keywords extracted from a webpage. In another embodiment, the social keyword widget 4080 sub-module is implemented to provide a widget that automatically matches catalog products to a user's context by matching keywords and themes from their social graph. In yet another embodiment, the API 4081 sub-module is implemented to provide an API between a widget and various operating environments. In still another embodiment, the recommendation engine 4082 sub-module is implemented to automatically select or recommend objects that best match the user's context based on a set of algorithms. In one embodiment, the social score widget 4083 sub-module is implemented to provide a widget that dynamically presents catalog products and discounts according to a user's social score. In yet another embodiment, the in-line links widget 4084 sub-module is implemented to provide a widget that automatically creates in-line hyperlinks within text strings based on keywords that match objects from a catalog. It will be appreciated that many such embodiments are possible and the foregoing is not intended to limit the spirit, scope or intent of the invention.

In various embodiments, the campaign management module 4087 comprises campaigns 4088, offers 4089, data 4090, catalog 4091, scoring 4092, goals 4093, social graph 4094, recommendations engine 4095, publisher 4096, testing 4097, traffic 4098, scheduler 4099, and interactions management sub-modules.

In one embodiment, the campaigns 4088 management sub-module is used to create, schedule and manage on-line marketing campaigns that drive traffic to an affiliate's websites, blogs and social media networks. In another embodiment, the campaigns 4088 management sub-module is used to create an email marketing campaign. In yet another embodiment, the campaigns 4088 management sub-module is used to create dynamic landing web pages using behavioral targeting approaches to determine which content, layout and calls-to-action to present to each visitor. In still another embodiment, the campaigns 4088 management sub-module is used to post offers to users accounts (e.g., "walls") within social networking sites such as Facebook®. In another embodiment, the campaigns 4088 management sub-module is used to post content and offers via social sites like Twitter®. In yet another embodiment, the campaigns 4088 management sub-module is used to select the landing page that campaign recipients will visit when they click-through an offer (e.g., by an email, tweet, Facebook® post, etc.).

In another embodiment, the offers 4089 management sub-module is used to select predetermined products and services from one or more catalogs 4091. The selected products are then presented to a campaign recipient. In yet another embodiment, the data 4090 management sub-module is used to select the delivery medium of a campaign, such as email, search marketing, display ad, or social media. In yet another embodiment, the data 4090 management sub-module is used to select the content and creative assets that are displayed to users that view or otherwise respond to the campaign. In yet another embodiment, the offers 4089 management sub-module is used to select the delivery end-points (e.g., Facebook®, Twitter®, etc.) that the campaign will be transported through to reach the intended user(s).

In yet another embodiment, the data 4090 management sub-module is used to select the list of users that are targeted to receive a predetermined campaign. In still another embodiment, the data 4090 management sub-module is used to select the segment of users that are targeted to receive a targeted campaign. In yet another embodiment, the data 4090 management sub-module is used to store and manage the data collected from the recipients of the campaign via the interactions 4100 management sub-module. In yet another embodiment, the data 4090 management sub-module is used to store and manage the versions of landing pages (e.g., their respective content, layout, style, etc.) that are used presented to users. In yet another embodiment, the data 4090 management sub-module is used to store and manage user's social graph information.

In still another embodiment, the catalog 4091 management sub-module is used to select which products to include in the campaign's offers. In yet another embodiment, the catalog 4091 management sub-module is used to select which merchants to include in the campaign's offers.

In one embodiment, the scoring 4092 management sub-module is used to select a list of targeted campaign recipients by using various algorithms to calculate the economic value of each recipient, which is then ranked. In yet another embodiment the scoring 4092 management sub-module is used to select a list of targeted recipients by using various algorithms to calculate the social influence of each recipient, which is then ranked to determine the prioritized order of which recipients receive the campaign. In still another embodiment, the scoring 4092 management sub-module is used to select a list of targeted recipients by using various algorithms to calculate the conversion uplift of similar segments and similar campaigns within a predetermined group of accounts, which are then rank ordered.

In another embodiment, the goals 4093 management sub-module is used to create the success criteria that campaigns will be measured against. In yet another embodiment, the goals 4093 management sub-module is used to measure the response to the campaign against predefined business goals (e.g., success criteria) to determine the success of the campaign. In still another embodiment, the goals 4093 management sub-module is used to measure the interactions rates and success criteria for a specific channel (e.g., a delivery medium such as Facebook®, email, etc.). In yet another embodiment, the goals 4093 management sub-module is used compare a campaign's success rate(s) against averages across a predetermined group of accounts. In yet another embodiment, the goals 4093 management sub-module is used to suggest combinations of campaigns and offers that are likely to meet the success criteria based upon a predetermined group of accounts. In various embodiments, the business goals and success criteria may include email click through rates, landing page conversion rates, traffic volume to a predetermined landing page, mentions and re-tweets, purchases, average order value, revenue, leads, and so forth. It will be appreciated that many such business goals and success criteria are possible and the foregoing is not intended to limit the spirit or scope of the invention.

In yet another embodiment, the social graph 4094 management sub-module is used to pull a campaign recipient's data from one or more social networks (e.g., Facebook®, Twitter®, Google+®) via APIs such that it can be used by the scoring 4092 management sub-module to determine which users should receive the campaign.

In still another embodiment, the recommendation engine 4095 sub-module utilizes algorithms to dynamically select which offers provided by the offers 4089 management sub-module (e.g., products, etc.) each campaign recipient should be presented within their respective landing pages to increase the likelihood of uplift. In yet another embodiment, the recommendation engine 4095 sub-module utilizes algorithms to select which data provided by the data 4090 management sub-module (e.g., landing page layout, content, etc.) each campaign recipient should be presented within their respective landing pages to increase the likelihood of uplift. In still another embodiment, the recommendation engine 4095 sub-module is used to suggest what campaigns and offers an account should consider using to meet success criteria goals provided by the goals 4093 management sub-module.

In one embodiment, the publisher 4096 management sub-module is used to select when campaign interactions provided by the interactions 4100 management sub-module are to be made available to campaign recipients. In yet another embodiment, the publisher 4096 management sub-module is used with the recommendation engine 4095 management sub-module to select a publishing schedule of interactions provided by the interactions 4100 management sub-module that would result in a higher likelihood of meeting or exceeding goals success criteria goals provided by the goals 4093 management sub-module. In yet another embodiment, the publisher 4096 management sub-module is used to select which landing pages will be published to the Internet and made available to campaign recipients according to a schedule provided by the scheduler 4099 management sub-module.

In another embodiment, the testing 4097 management sub-module is used to randomly present different combinations of interactions, offers and data to campaign recipients in order to determine which combination results in the highest attainment of predetermined goals. In yet another embodiment, the testing 4097 management sub-module is used to present different combinations of interactions, offers and data to predetermined segments of campaign recipients to determine which combination results in the highest attainment of predetermined goals. In another embodiment, the testing 4097 management sub-module provides users the ability to change or select predetermined versions of content elements within regions of published webpage to test from within the context of the webpage using standard web browsers. In yet another embodiment, the testing 4097 management sub-module is used to select a statistical confidence interval used by the social commerce marketplace system to determine a winning combination of interactions, offers and data.

In yet another embodiment, the traffic 4098 management sub-module is used in conjunction with the testing 4097 management sub-module to select the amount and frequency of traffic to direct to a predetermined combination of interactions, offers and data to control the presentation of campaigns to visitors.

In still another embodiment, the scheduler 4099 management sub-module is used to determine when recipients will be exposed to a campaign and the frequency of follow up interactions. In another embodiment, the scheduler 4099 management sub-module is used to determine when landing pages will be published and unpublished for a predetermined campaign. In yet another embodiment, the scheduler 4099 management sub-module is used to determine when offers will be published and unpublished for a predetermined campaign.

In one embodiment, the interactions 4100 management sub-module is implemented as an instance of the user interface (UI) within a predetermined channel for a predetermined campaign recipient (e.g., an offer in combination with an end point). In one embodiment, the interactions 4100 management sub-module is used to record individual recipient engagements with a campaign to capture data (e.g., when, which end-point, did the user click through an offer, did the user convert, etc.) that the goals 4093 management sub-module uses to determine whether the business goals have been met or exceeded.

In various embodiments, the web optimization module 4101 comprises web crawling 4102, analytics 4103, data 4104, catalog 4105, scoring 4106, sentiment analysis 4107, social graph 4108, recommendations engine 4109, offers 4110, publisher 4111, testing 4112, ratings 4113, reviews 4114, social shopping 4115, listening 4116, and traffic management sub-modules.

In one embodiment, the web crawling 4102 management sub-module is used to capture a website's page content, layouts, creative assets and calls-to-action. In another embodiment, the web crawling 4102 management sub-module is used with the recommendation engine 4109 and testing 4112 management sub-modules to recommend content to use within webpages that have been statistically proven to increase uplift for the source site. In yet another embodiment, the web crawling 4102 management sub-module is used to crawl the Internet and social network sites for product ratings and reviews.

In another embodiment, the analytics 4103 management sub-module is used to capture the visitor click-stream data that is used by the recommendations engine 4109 management sub-module to determine which content, layout, and calls-to-action are most likely to result in increased visitor engagement (e.g., amount of time on-site, page views, etc.) and conversions.

In yet another embodiment, the data 4101 management sub-module is used to retrieve prior purchase history information for a visitor, which in turn is used by the recommendation engine 4109 management sub-module to determine which content, layout, and calls-to-action are most likely to result in increased visitor engagement (e.g., time on-site, page views, etc.) and a conversion event for the current site visitor or other visitors with similar characteristics. In yet another embodiment, the data 4101 management sub-module is used to retrieve current temporal information and end user device information for a visitor, which in turn is used by the recommendation engine 4109 management sub-module to determine which content, layout, and calls-to-action are most likely to result in increased visitor engagement (e.g., time on-site, page views, etc.) and a conversion event for the current site visitor or other visitors with similar characteristics.

In still another embodiment, the catalog 4105 management sub-module is used to select which products and offers to present to a visitor as determined by the recommendation engine 4109 management sub-module that are most likely to result in increased visitor engagement (e.g., time on-site, page views, etc.) or a conversion event.

In one embodiment, the scoring 4106 management sub-module is used to determine the social influence of a visitor such that the recommendations engine 4109 management sub-module is able to determine which content (e.g., products and offers), layouts, and calls-to-action to present to the user that is most likely to result in increased visitor engagement (time on site, page views), or a conversion event for a calculated social influence score. In yet another embodiment, the scoring 4106 management sub-module is used with the sentiment analysis 4107 management sub-module to calculate trends of topics and products that are then provided as recommendations to users to include within their websites to capitalize upon the trend.

In another embodiment, the sentiment analysis 4107 management sub-module is used to analyze the tone of a website, page, blog, content or social post to determine the positive, neutral or negative tonality about the topics within the content. The sentiment analysis 4107 management sub-module then aggregates tonality analysis across multiple sites, social posts, social networks, etc. to identify market trends for products and services. In turn, the recommendation engine 4109 management sub-module recommends products to merchandize in order to capitalize upon the market trends. In another embodiment, the sentiment analysis 4107 management sub-module is used to identify customer support, product and service satisfaction issues for the website owner to remedy. In another embodiment, the sentiment analysis 4107 management sub-module is used with the social graph 4108 management sub-module to determine positive topics of interest for a user and their network of users, which are then used to target predetermined content and products that match the users' topics of interest.

In yet another embodiment, the social graph 4108 management sub-module is used to retrieve visitor social data and social relationship data such that the recommendation engine 4109 management sub-module can determine which content (e.g., products and offers), layouts, and calls-to-action to present to the user that are most likely to result in increased visitor engagement (e.g., time on-site, page views, etc.) or a conversion event based upon the users social graph information. It another embodiment, the social graph 4108 management sub-module processes a user's social graph data to match it with other users that have similar social graph characteristics.

In still another embodiment, the recommendation engine 4109 management sub-module is used to determine which content (e.g., products and offers), layouts, and calls-to-action to present to the user that are most likely to result in increased visitor engagement (e.g., time on-site, page views, etc.) or a conversion event. In this and other embodiments, the recommendation engine 4109 management sub-module uses inputs from the analytics 4013, data 4104, catalog 4105, social graph 4108, and scoring 4106 management sub-modules as inputs into an algorithm for the afore-mentioned operations.

In one embodiment, the offers 4110 management sub-module is used to select which products and offers to present to a user that are most likely to result in increased engagement (e.g., time on-site and conversions). In another embodiment, the offers 4110 management sub-module is used to match the highest rated products as found by the web crawler 4102 management sub-module with products from the catalog 4105 management sub-module to present to a user.

In another embodiment, the publisher 4111 management sub-module is used to schedule the automatic publishing and un-publishing of web pages. In yet another embodiment, the publisher 4111 management sub-module is used to schedule the automatic publishing and un-publishing of products provided by the catalog 4105 management sub-module within predetermined web pages. In still another embodiment, the publisher 4111 management sub-module is used to schedule the automatic publishing and un-publishing of content variations within predetermined webpages to keep the website fresh.

In yet another embodiment, the testing 4112 management sub-module is used to randomly present different combinations of data, page layout, content and visual style within webpages to visitors to determine which combination results in the highest level of engagement (e.g., time on-site or conversions). In another embodiment, the testing 4112 management sub-module provides users the ability to change or select predetermined versions of content elements within regions of a published webpage in order to use standard web browsers to directly test from within the context of the webpage. In yet another embodiment, the testing 4112 management sub-module is used to select the statistical confidence interval the social commerce marketplace system used to determine a winning combination of data, page layout, content and visual style to automatically publish the winning version to the webpage.

In still another embodiment, the ratings 4113 management sub-module is used to dynamically select which product ratings format to display to the user that is most likely to result in higher engagement for the visitor. In another embodiment, the ratings 4113 management sub-module is used to select which products to display within a web page based upon the correlation between the products ratings and user click-through rates. In yet another embodiment, the ratings 4113 management sub-module is used to identify trends in product ratings to recommend when to add or remove a predetermined product or class of products from a website to optimize engagement.

In one embodiment, the reviews 4114 management sub-module is used to dynamically select which product reviews format to display to the user that is most likely to result in higher engagement for the visitor. In another embodiment, the reviews 4114 management sub-module is used to select which products to display within a web page based upon the correlation between the products reviews and user click-through rates. In yet another embodiment, the reviews 4114 management sub-module is used to identify trends in product reviews to recommend when to add or remove a predetermined product or class of products from a website to optimize engagement. The reviews 4114 management sub-module uses the sentiment analysis 4107 management sub-module to determine positive, neutral or negative sentiment towards a specific product. In still another embodiment, the reviews 4114 management sub-module uses the predictive scoring 4106 management sub-module to determine the direction and magnitude of market trends for each product managed by the catalog 4105 management sub-module.

In another embodiment, the social shopping 4115 management sub-module implements JavaScript® into third party website pages to display user interface (UI) controls next to products that list users in their social network that have indicated in their social network (e.g., Facebook®) that they own the product. In another embodiment, the social shopping 4115 management sub-module shows which users within their social network have visited the webpage and when. In another embodiment, the social shopping 4115 management sub-module displays a list of individuals within their social network that have used the same referring search keyword term that the user used to reach the webpage. In yet another embodiment, the social shopping 4115 management sub-module lists individuals, and their associated content, that have expressed an opinion about the product within their social networks (e.g., ratings, reviews, mentions, etc.).

In yet another embodiment, the listening 4116 management sub-module is used with the crawling 4102 management sub-module to find specific information on websites and within social network sites matching products with a catalog managed by the catalog 4105 management sub-module. In another embodiment, the listening 4116 management sub-module provides users with content ideas, content fragments, and user interface designs to consider using within their websites, based upon content collected by the web crawler 4102 management sub-module. In yet another embodiment, the listening 4116 management sub-module searches for social network mentions (e.g., Twitter® tweets or Facebook® wall posts) and provides them to the sentiment analysis 4107 management sub-module to identify positive content that the recommendations engine 4109 management sub-module uses to recommend which products to merchandize.

In still another embodiment, the traffic 4098 management sub-module is used in conjunction with testing 4112 management sub-module to select the amount and frequency of traffic to direct to a specific combination of data, layout, content and calls-to-action to control the presentation of webpage user interfaces to visitors.

In one embodiment, the storefront valuation 4118 management module is used to assess the monetary value of a social commerce storefront described in greater detail herein. In this and other embodiments, the storefront valuation 4118 management module comprises a digital worth scoring 4119 sub-module, a social commerce valuation 4120 sub-module, a social commerce comparison 4121 sub-module, and a storefront valuation 4122 sub-module. In one embodiment, the digital worth scoring 4119 sub-module is used to generate an aggregate digital worth score for the owner of the storefront and the individual social media relationships within the owner's social graph. As used herein, a digital worth score refers to a numeric value, or set of values, derived from the level of social influence a social media user is capable of exerting upon a predetermined market segment.

In another embodiment, the social commerce valuation module processes the aggregate digital worth score generated by the digital worth scoring 4119 sub-module, social site history associated with user's within the owner's social network, forecasted traffic rates associated with the value of the target social commerce storefront's key words, the value of its merchandize and services, and corresponding advertising to generate a social commerce valuation value. In yet another embodiment, the digital worth comparison 4120 sub-module is used to identify social commerce storefronts, each of which has a respective social commerce valuation value, that are comparable to the target social commerce storefront. In still another embodiment, the storefront valuation 4122 sub-module processes the respective social commerce valuation values of the target and comparable social commerce storefronts to generate a potential monetary value of the target social commerce storefront.

Figure 5:
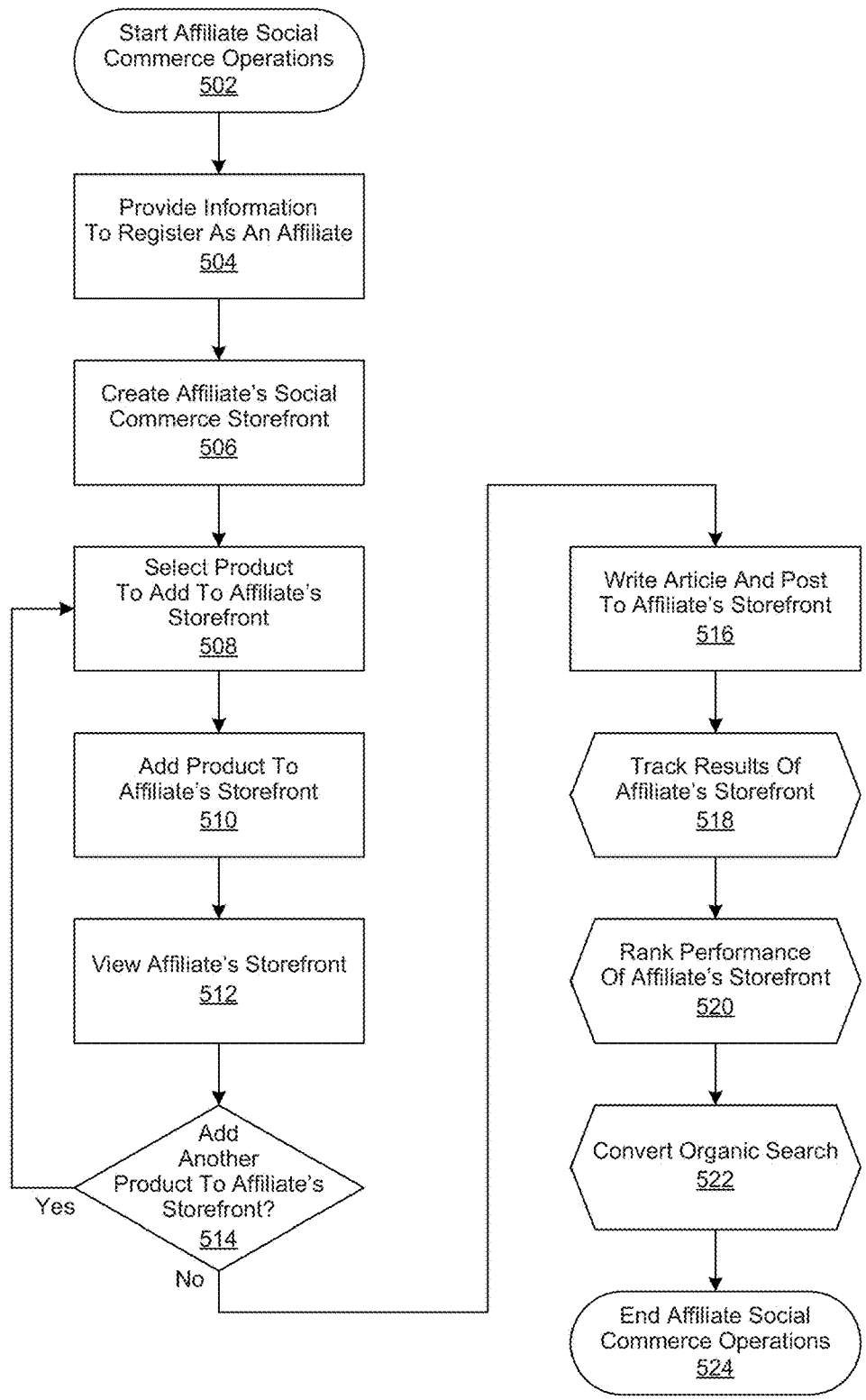
FIG. 5 is a generalized flow chart of social commerce initiation operations performed on behalf of an affiliate.

FIG. 5 is a generalized flow chart of social commerce initiation operations performed on behalf of an affiliate in accordance with an embodiment of the invention. In this embodiment, affiliate social commerce operations are begun in step 502, followed by a candidate affiliate providing information to a merchant in step 504 to register as an affiliate. The merchant then uses the provided information to create a social commerce storefront for the affiliate in step 506. The affiliate then proceeds to select a product to add to their social commerce storefront in step 508. In various embodiments, the product is selected from a plurality of available products contained in a master catalog. The selected product is then added to the affiliate's social commerce storefront in step 510. In various embodiments, a selected product becomes a purchasable product once it is added to the affiliate's social commerce storefront.

The affiliate then views their social commerce storefront in step 512, followed by a determination being made in step 514 whether to add an additional product. If so, then the process is continued, proceeding with step 508. Otherwise, an article related to one or more of the purchasable products is written in step 516 and then posted to the affiliate's social commerce storefront. The ongoing sales results of the affiliate's social commerce storefront is then tracked in step 518, as well as the ongoing ranking of its performance relative to other affiliate social commerce storefronts in step 520. Ongoing conversion of organic searches resulting in sale is likewise tracked in step 522, followed by affiliate social commerce initiation operations being ended in step 524.

Figure 6A:
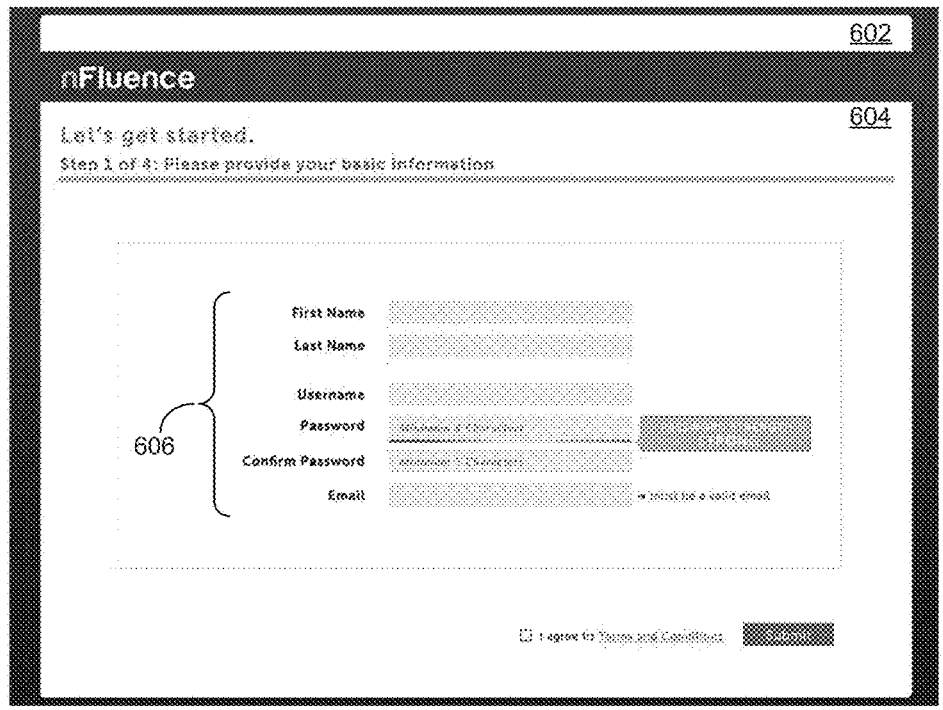
FIGS. 6a-d are generalized depictions of social commerce initiation operations performed on behalf of an affiliate within a plurality of user interface windows.
Figure 6B:
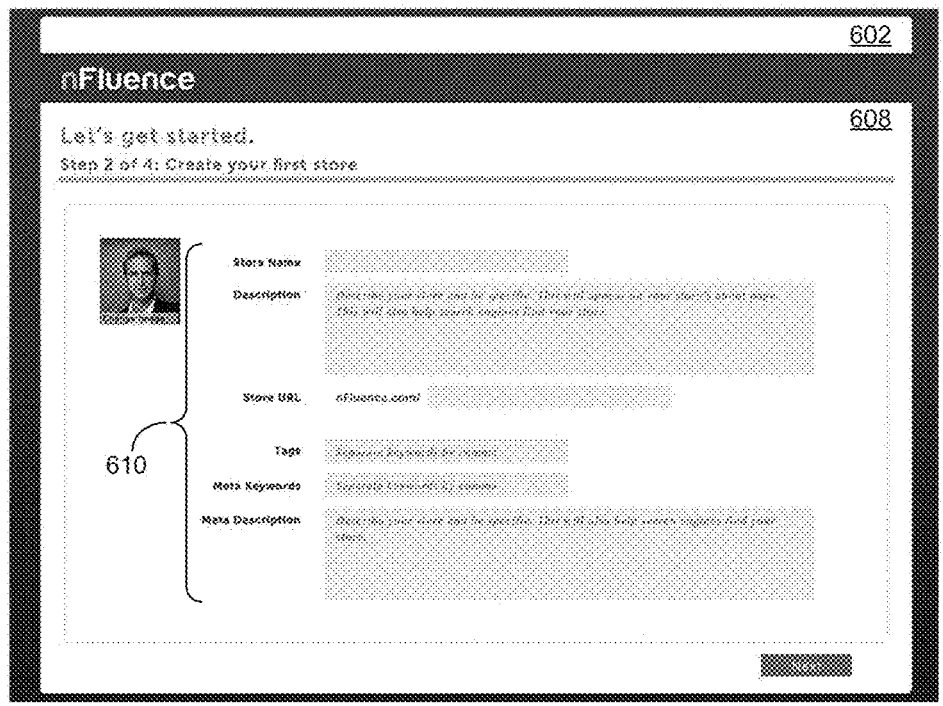
Figure 6C:
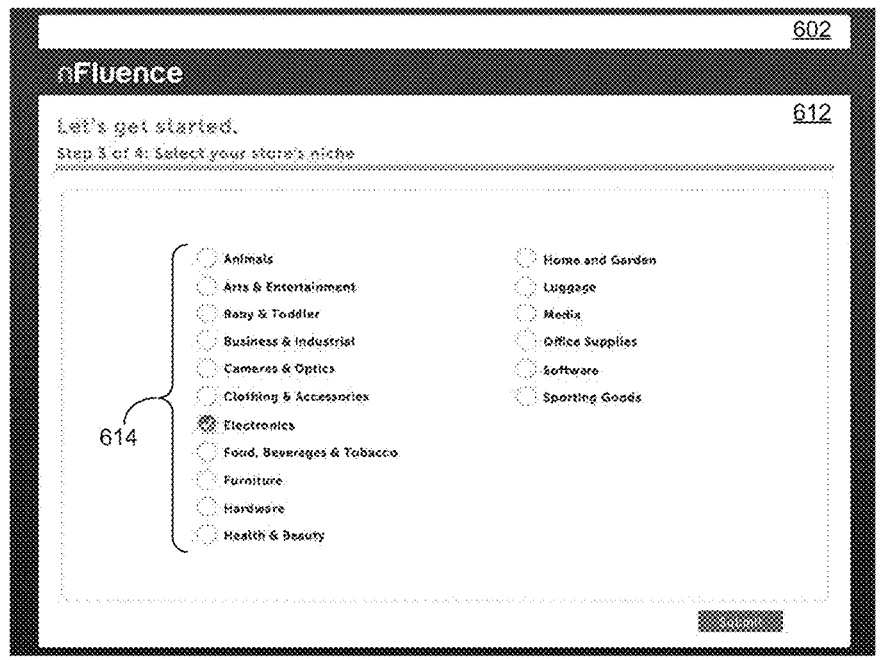
Figure 6D:
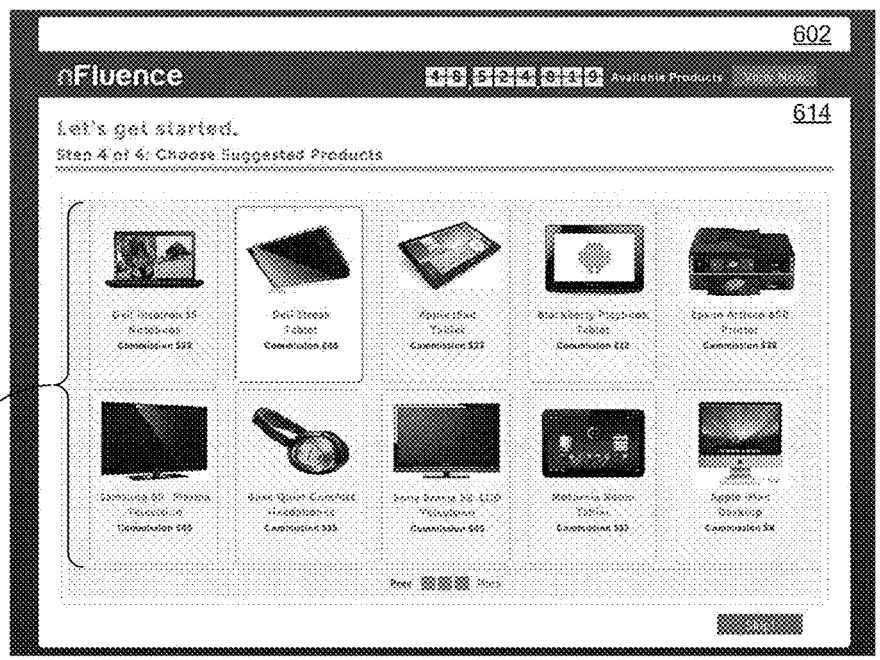

FIGS. 6*a-d* are generalized depictions of social commerce initiation operations performed on behalf of an affiliate within a plurality of user interface windows in accordance with an embodiment of the invention. In this embodiment, a social commerce storefront management module, as described in greater detail herein, is implemented within a window 604 of a user interface (UI) 602. As shown in FIG. 6*a*, the UI window 604 comprises data entry fields 606 for a candidate affiliate to provide information to initiate the creation of a social commerce storefront. Referring now to FIG. 6*b*, the affiliate then provides additional information 610 associated with their social commerce storefront. As shown in FIG. 6*c*, the affiliate selects the category 614 of their social commerce storefront, and as likewise shown in FIG. 6*d*, selects products 614 to be displayed for purchase within their social commerce storefront.

Figure 7:
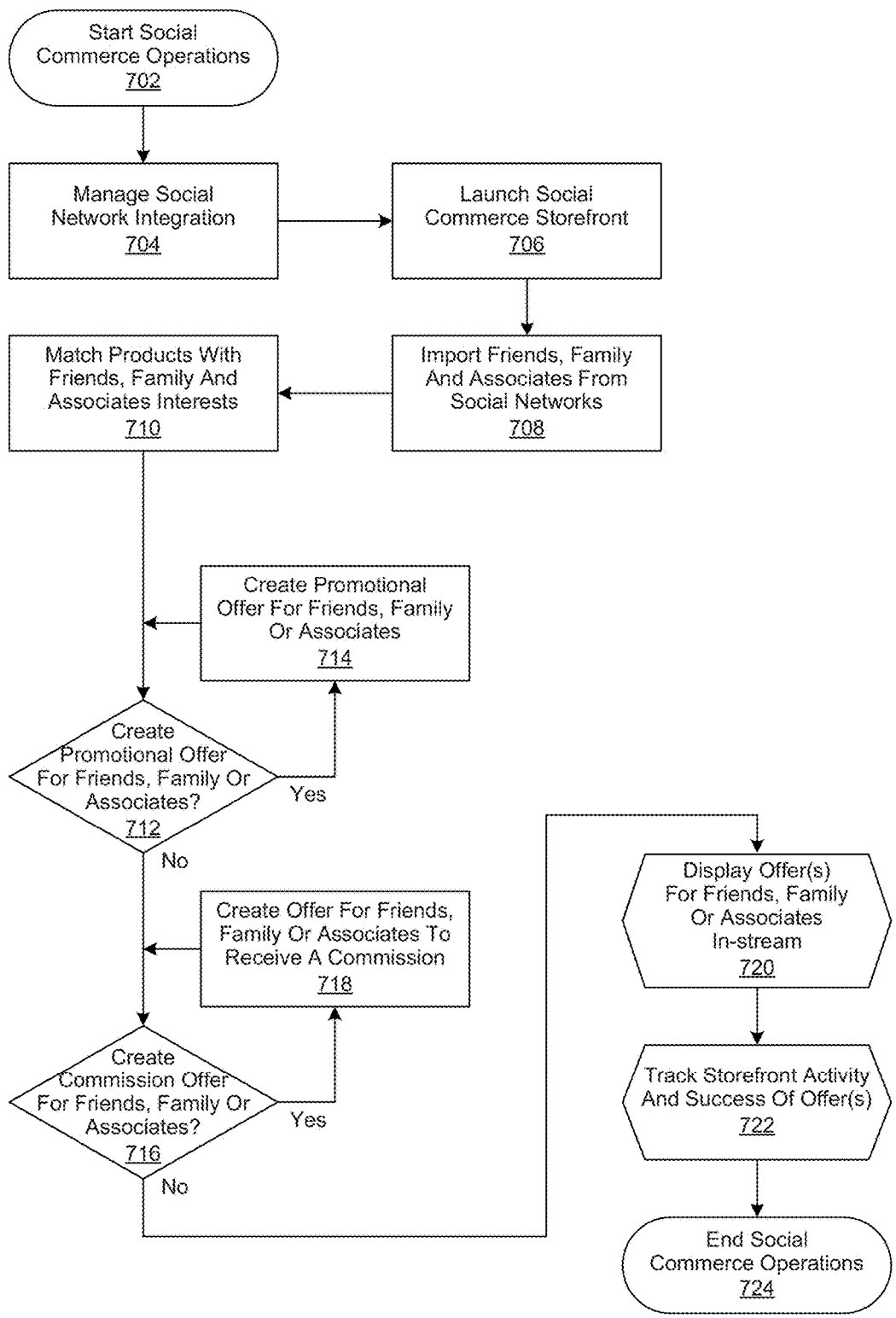
FIG. 7 is a generalized flow chart of the performance of social commerce operations.

FIG. 7 is a generalized flow chart of the performance of social commerce operations as implemented in accordance with an embodiment of the invention. In this embodiment, social commerce operations are begun in step 702, followed by the affiliate managing the integration of the social commerce storefront in step 704 with a social media environment, such as a social network. In various embodiments, the integration may be with an affiliate web site or blog. The affiliate then launches the social commerce storefront in step 706, followed by the importation of friends, family, and associates from one or more social media environments (e.g., a social network) in step 708. The friends, family and associates are then matched with products that are appropriate to their interests in step 710, followed by a determination in step 712 whether to create a promotional offer for them. If so, then a promotional offer is created in step 714 and the process is continued, proceeding with step 712. Otherwise, a determination is made in step 716 whether the affiliate will offer to provide an offer to pay a commission to the friends, family or associates in return for referrals. If so, then a commission offer is prepared in step 718 and the process is continued, proceeding with step 716. Otherwise the promotion offers(s), the commission offer(s), or both, are displayed to the friends, family and associates in-line within the social media environment in step 720. Ongoing activity at the affiliate's social commerce storefront, and the corresponding success of the offer(s), is tracked in step 722 and social commerce operations are then ended in step 724.

Figure 8:
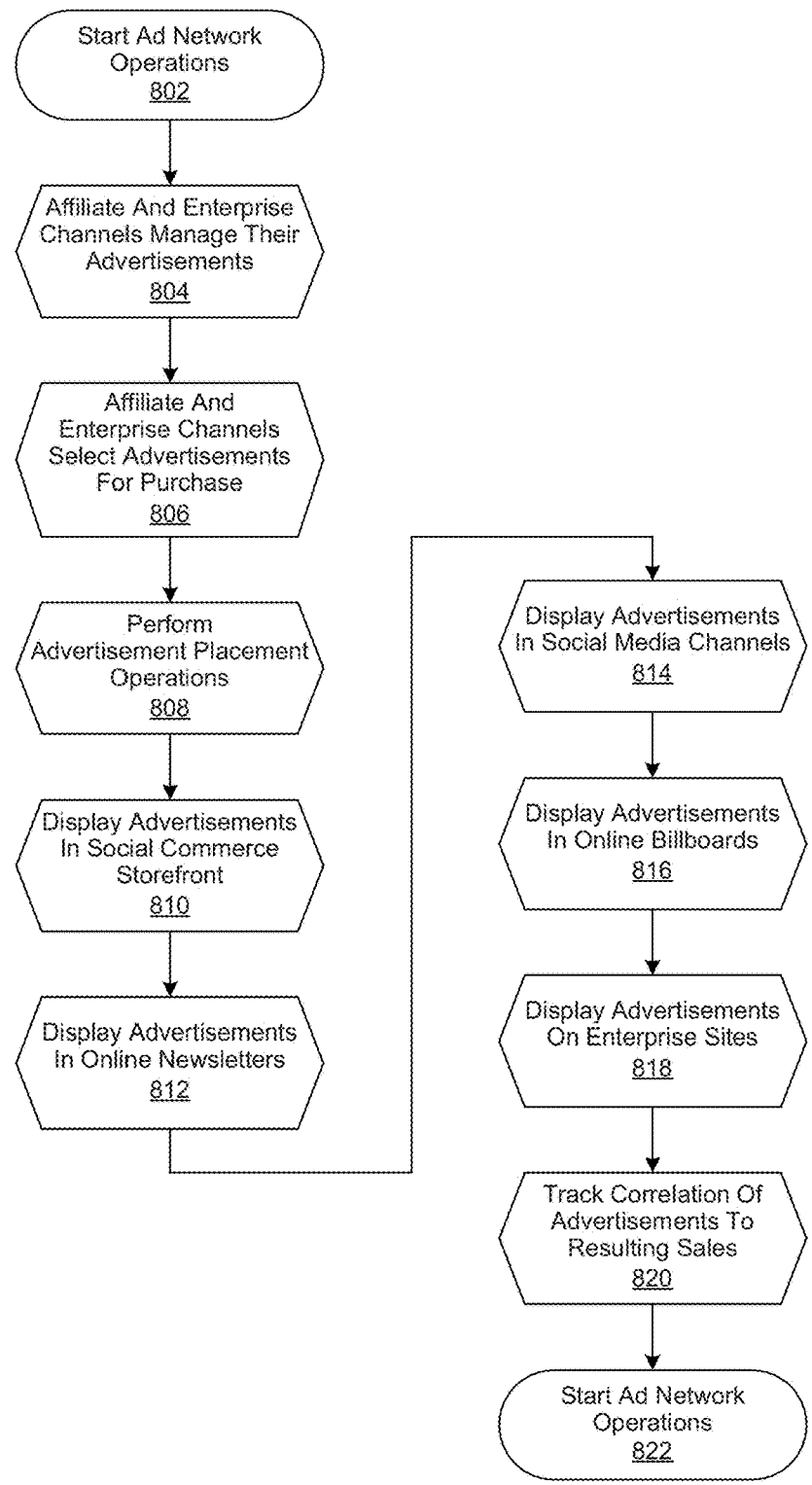
FIG. 8 is a generalized flow chart of the performance of social commerce advertising network management operations.

FIG. 8 is a generalized flow chart of the performance of social commerce advertising network management operations as implemented in accordance with an embodiment of the invention. In this embodiment, advertising network operations are begun in step 802, followed by ongoing operations in step 804 for affiliate and enterprise channels to manage their online advertisements. In step 806 the affiliate and enterprise channels perform ongoing operations to select online advertisements for purchase, followed by corresponding ongoing operations in step 808 to place the purchased online advertisements in predetermined online locations. In steps 810, 812, 814, 816, and 818, the affiliate and enterprise channels perform ongoing operations respectively display the online advertisements in social commerce storefronts, online newsletters, social media channels, online billboards, and enterprise sites. Ongoing operations are then performed in step 820 to correlate sales to the placement of the online advertisements, followed by advertising network operations being ended in step 822.

Figure 9A:
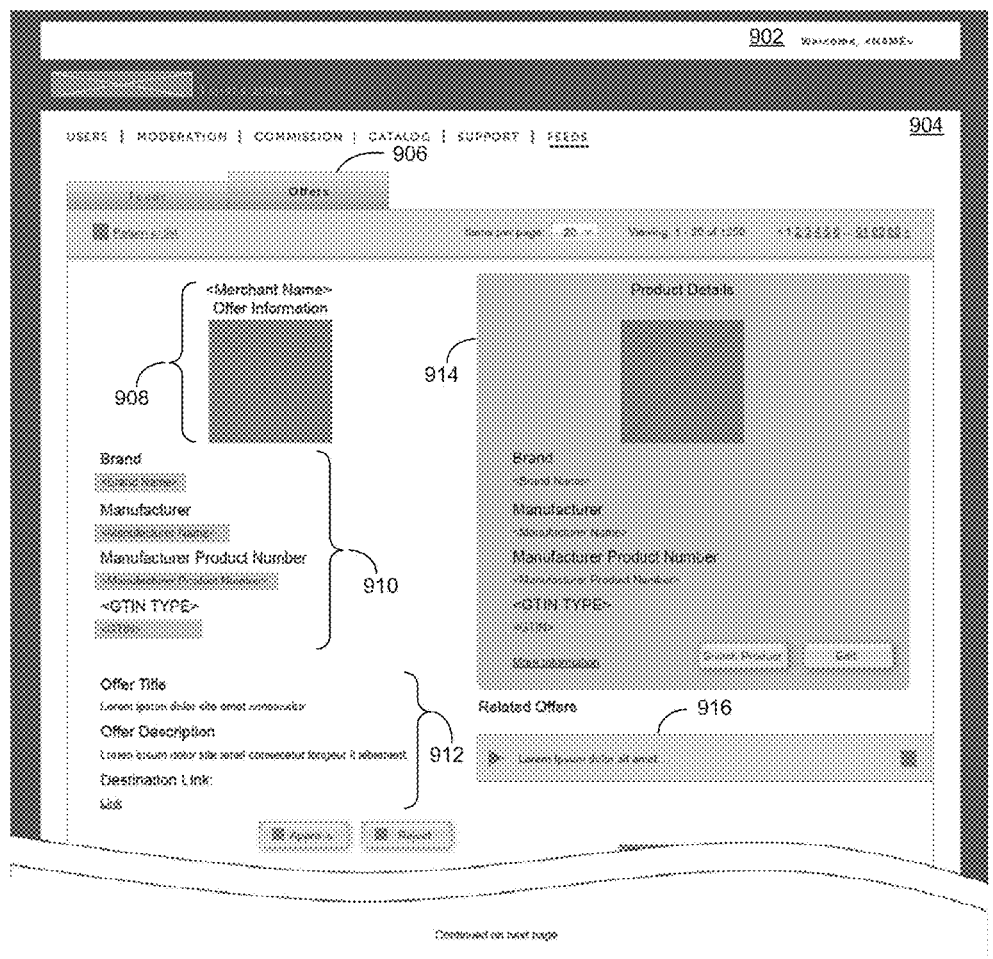
FIGS. 9a-b show the creation of an affiliate offer within a user interface window.
Figure 9B:
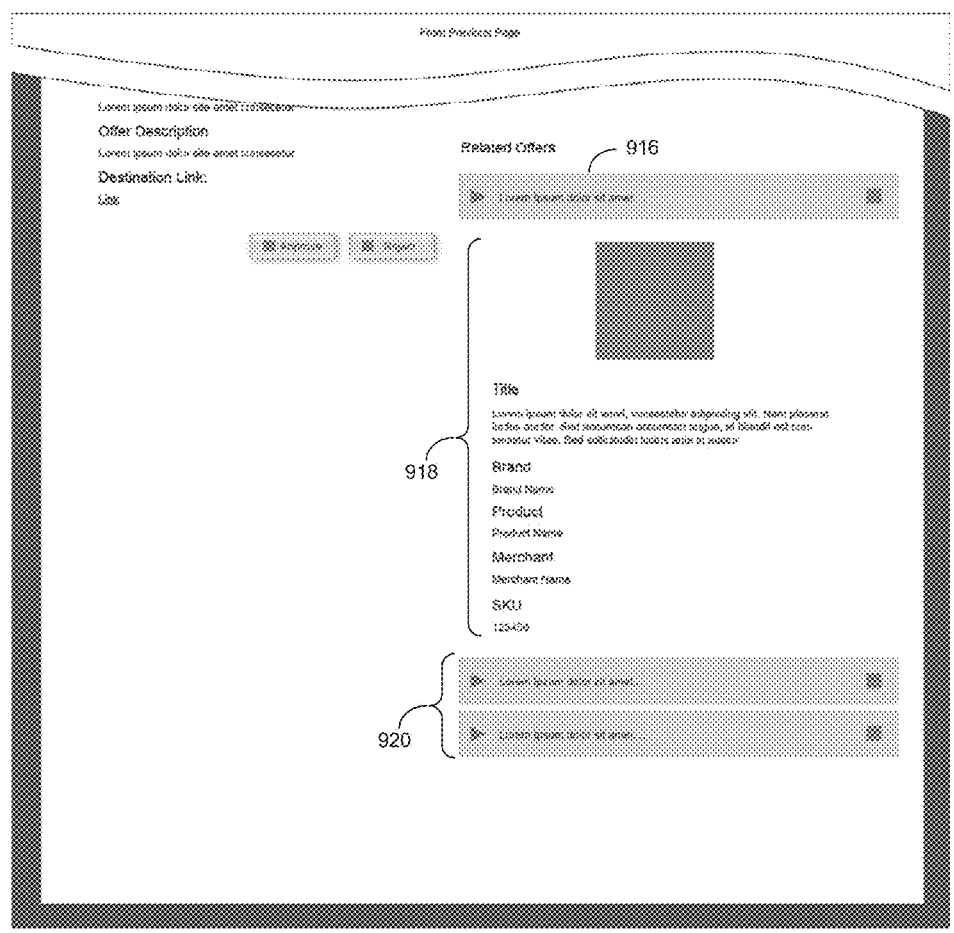

FIGS. 9*a-b* show the creation of an affiliate offer within a user interface window in accordance with an embodiment of the invention. In this embodiment, a social commerce storefront deals management module, as described in greater detail herein, is implemented within a window 904 of a user interface (UI) 902. As shown in FIG. 9*a*, the UI window 904 comprises an 'Offers' tab 906, a data entry field 908 for information related to the merchant and the affiliate making the offer, and associated data entry fields 910 corresponding to details of the purchasable product. Likewise, the UI window 904 comprises data entry fields 912 corresponding to details of the offer, as well as an offer display window 914 that provides a preview of the offer as it will appear when presented within a social media environment. As likewise shown in FIG. 9*a*, data display field 916 displays summary information corresponding to a related offer, and as shown in FIG. 9*b*, a corresponding offer display window 918 providing a preview of the related offer, as well as data display fields 920 displaying summary information corresponding to other offers.

FIG. 10 shows the display of affiliate offers within a user interface window implemented in accordance with an embodiment of the invention. In this embodiment, a social commerce storefront deals management module, as described in greater detail herein, is implemented within a window 1004 of a user interface (UI) 1002. As shown in FIG. 10, the UI window 1004 comprises an 'Offers' tab 1006, as well a listing 1008 of a plurality of offers and related information 1010.

Figure 11:
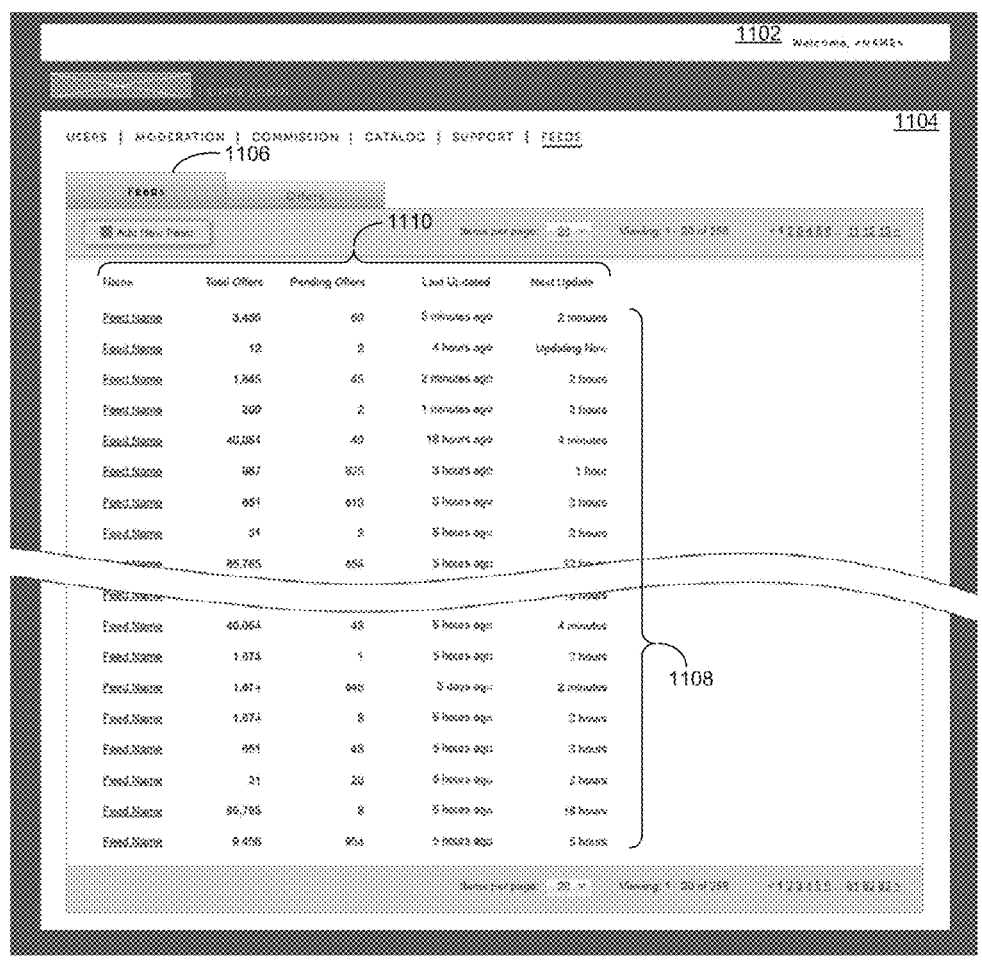
FIG. 11 shows the display of affiliate network feeds and associated offers within a user interface window.

FIG. 11 shows the display of affiliate network feeds and associated offers within a user interface window implemented in accordance with an embodiment of the invention. In this embodiment, a social commerce storefront deals management module, as described in greater detail herein, is implemented within a window 1104 of a user interface (UI) 1102. As shown in FIG. 11, the UI window 1104 comprises an 'Offers' tab 906, as well a listing 1108 of a plurality of advertising network feeds corresponding to referrals resulting from associated offers, and related information 1110.

Figure 12:
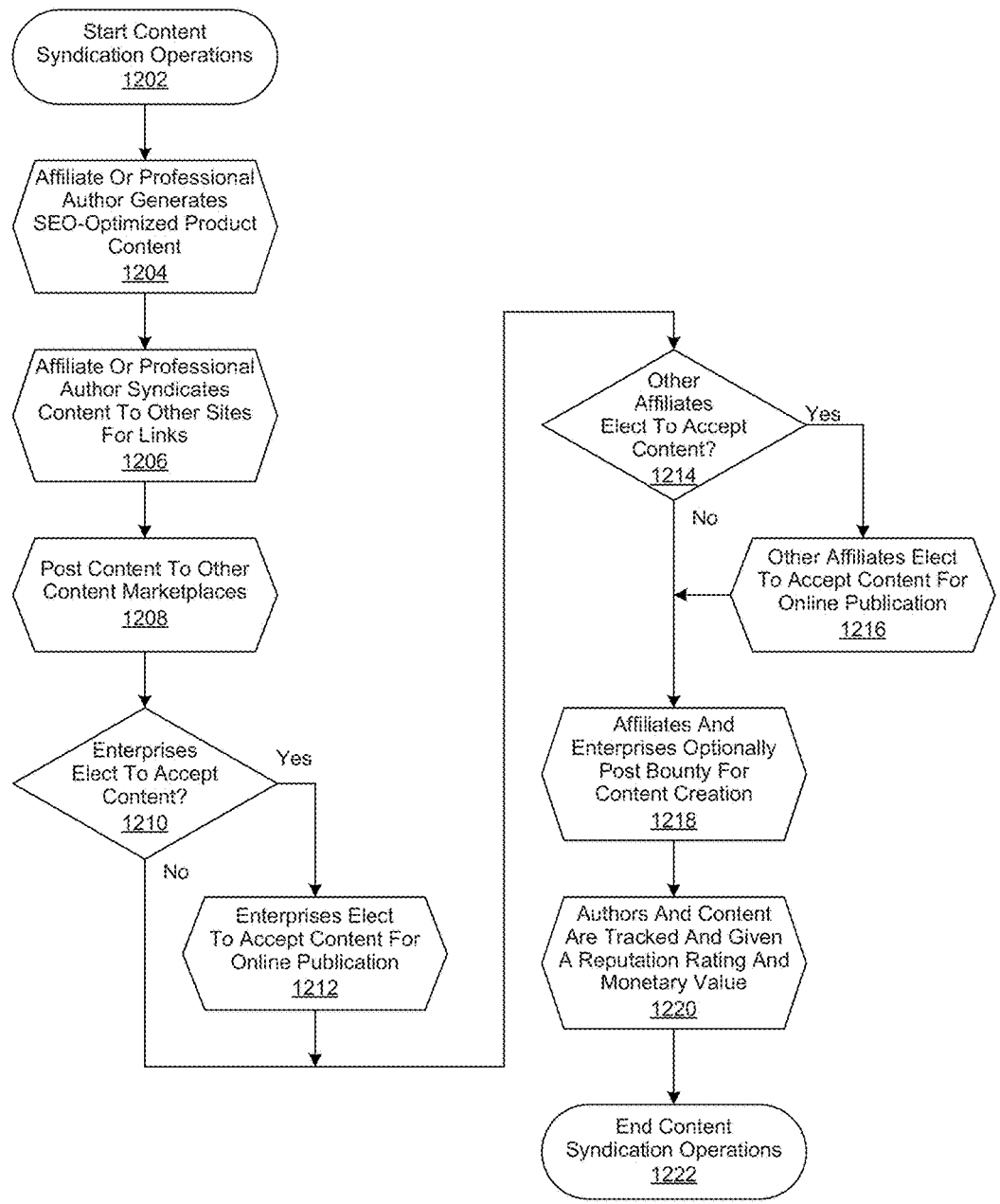
FIG. 12 is a generalized flow chart of the performance of content syndication operations.

FIG. 12 is a generalized flow chart of the performance of content syndication operations as implemented in accordance with an embodiment of the invention. In this embodiment, content syndication operations are begun in step 1202, followed by the ongoing generation of search engine optimization (SEO) content by an affiliate, a professional author, or both, in step 1204. Ongoing syndication operations are then performed in step 1206 to syndicate the SEO content other sites and establish corresponding links Then, in step 1208, ongoing operations are performed to post the SEO content to other content marketplaces known to skilled practitioners of the art. A determination is then made in step 1210 whether enterprises (e.g., corporations) elect to accept the SEO content. If so, then ongoing operations are performed by the enterprises in step 1212 to accept the SEO content for online publication. As an example, a corporation may elect to post predetermined SEO content on their internal web site for review by employees.

However, if it is determined in step 1210 that enterprises do not elect to accept the SEO content, or if they do so in step 1212, then a determination is made in step 1214 whether other affiliates elect to accept the SEO content for online publication. If so, then ongoing operations are performed by affiliates in step 1216 to accept the SEO content for publication in step 1217. For example, another affiliate may elect to publish SEO content that is complementary to content they generate themselves. However, if it is determined in step 1214 that other affiliates do not elect to accept the SEO content, or if they do so in step 1216, then ongoing operations are performed in step 1218 for enterprises, affiliates, or both, to post a "bounty" (i.e., an offer for compensation) for content creation. Thereafter, ongoing operation are performed in step 1220 to track authors, the content they generate, their corresponding reputation ratings, and the monetary value they receive as compensation for providing the content. Content syndication operations are then ended in step 1222.

Figure 13:
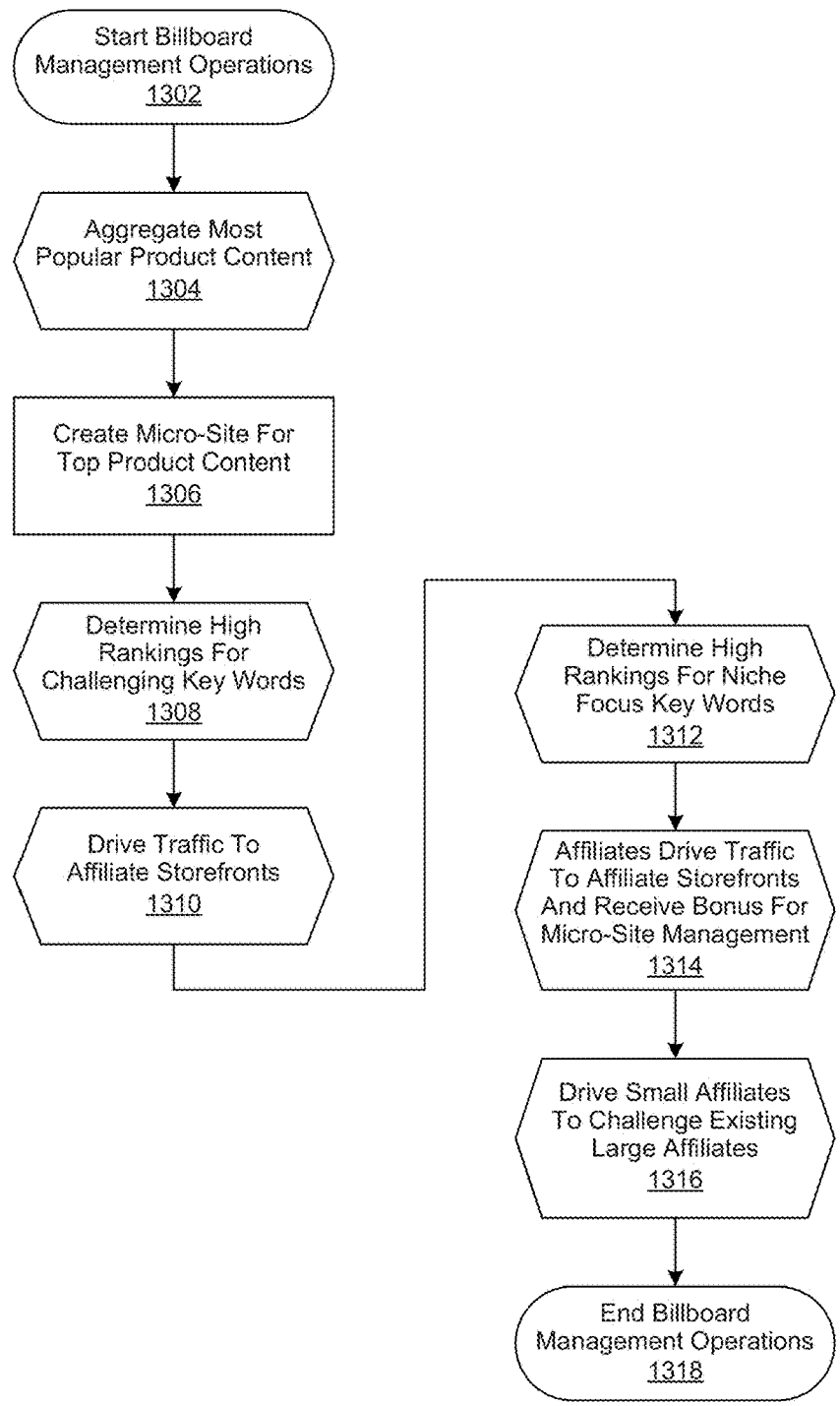
FIG. 13 is a generalized flow chart of the performance of billboard management operations.

FIG. 13 is a generalized flow chart of the performance of billboard management operations as implemented in accordance with an embodiment of the invention. In this embodiment, online billboard management operations familiar to those of skill in the art are begun in step 1320, followed by the ongoing aggregation of the most popular product content in step 1304. A micro site, such as a small, specialized web site, is then created in step 1306, followed by ongoing operations in step 1309 to determine high rankings for challenging key words used in searches for product information. Ongoing operations are then performed in step 1310 to drive traffic to affiliate social commerce storefronts, such as using the high ranking challenging key words in search engine optimization (SEO) operations known to skilled practitioners of the art. Thereafter, ongoing operations are performed in step 1312 to determine high ranking niche focus key words, followed by ongoing operations being performed by affiliates in step 1314 to drive traffic to their storefronts, and accordingly, receive compensation from a merchant for doing so. In step 1316, ongoing operations are performed by the merchant to challenge small affiliates to challenge the sales performance of larger affiliates. Online billboard management operations are then ended in step 1318.

Figure 14A:
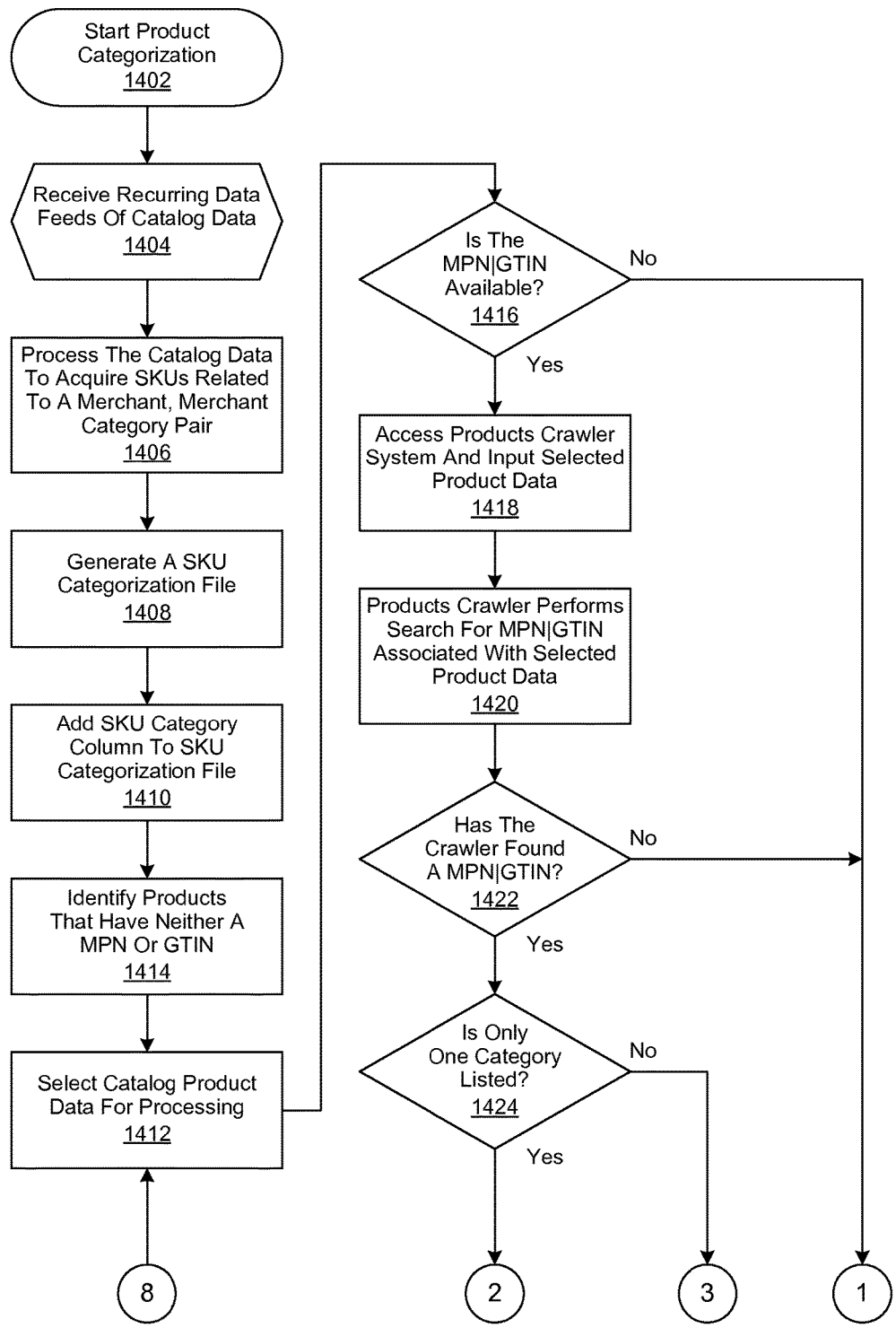
FIGS. 14A-14C are a generalized flow chart of the performance of product categorization operations.
Figure 14B:
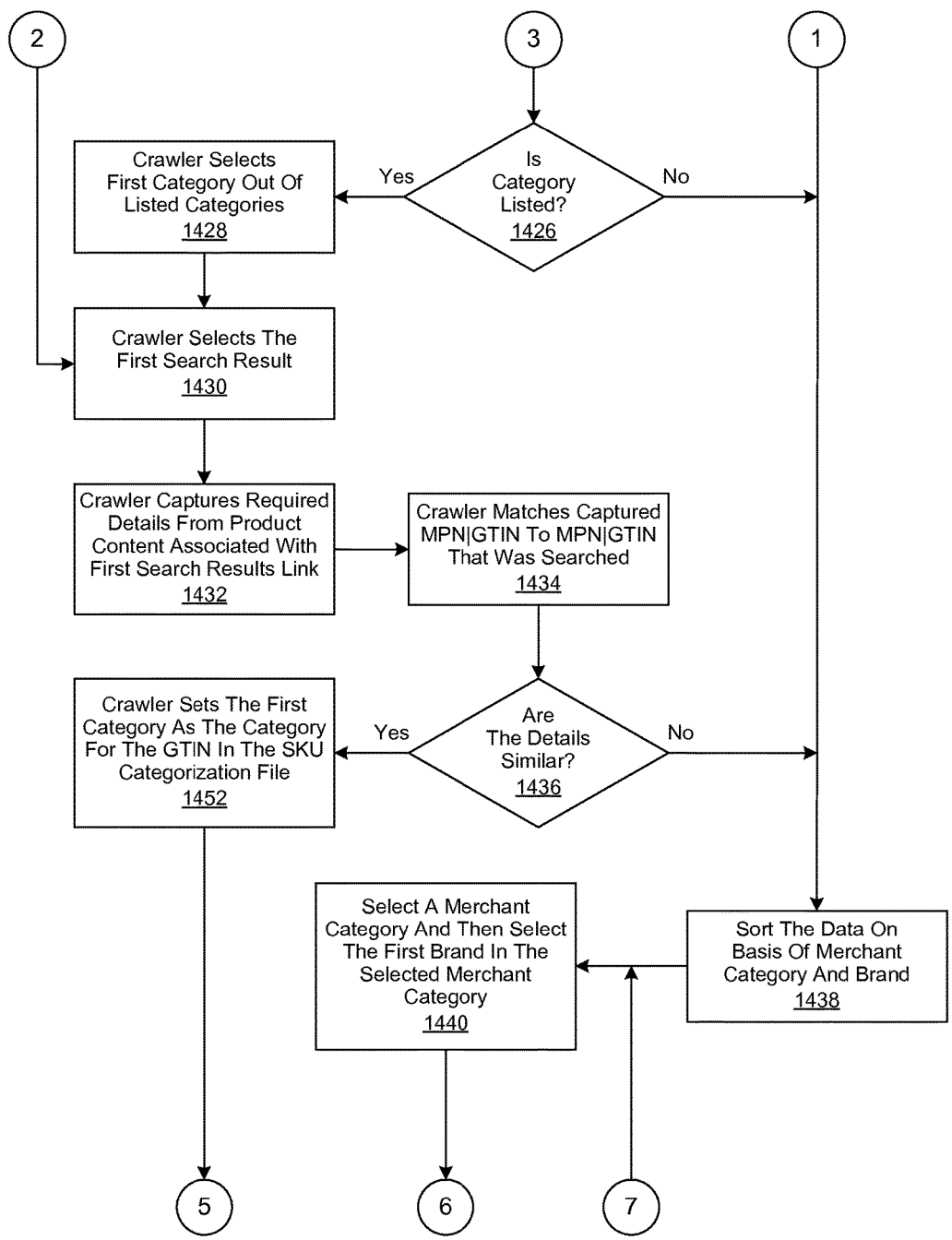
Figure 14C:
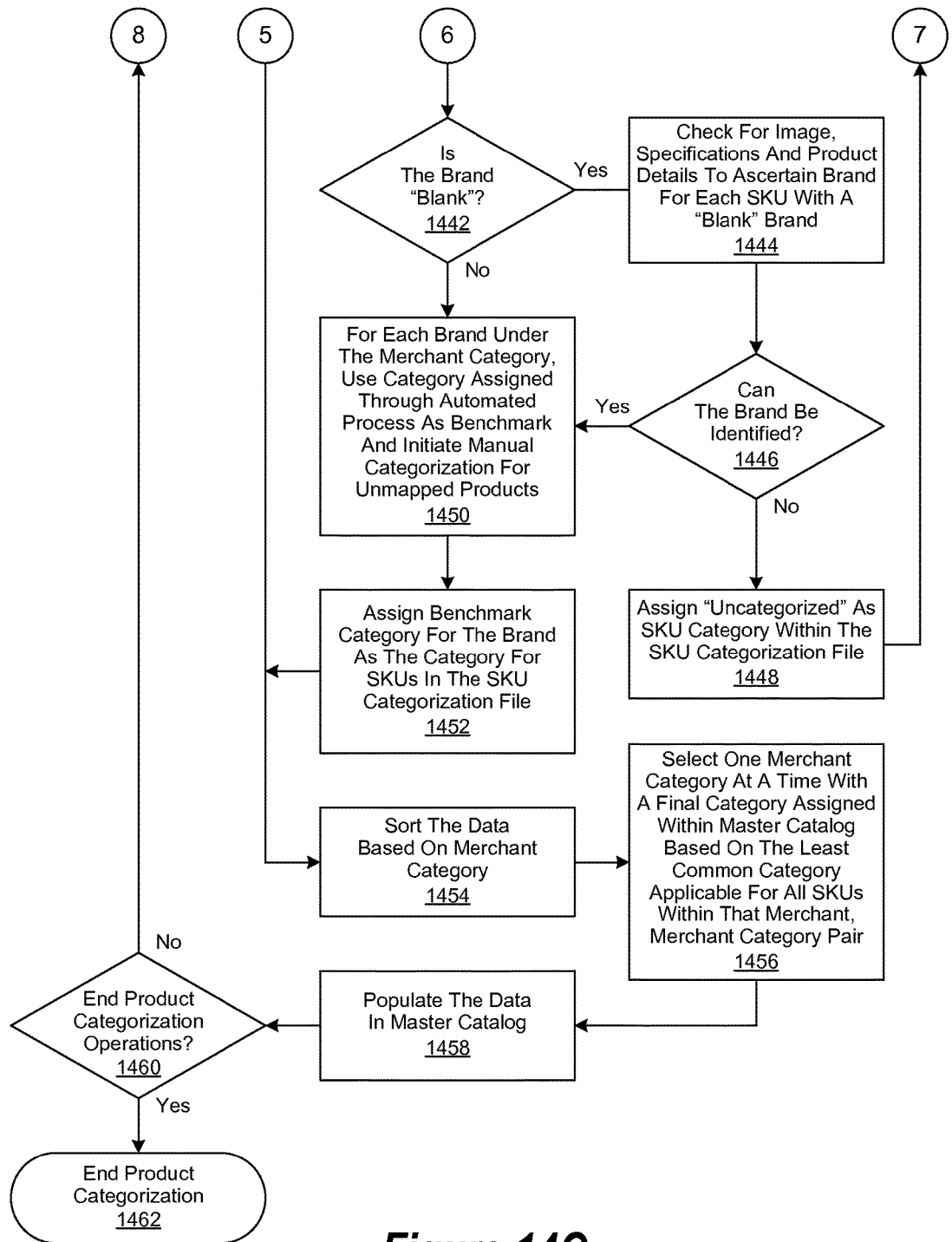
Figure 15A:
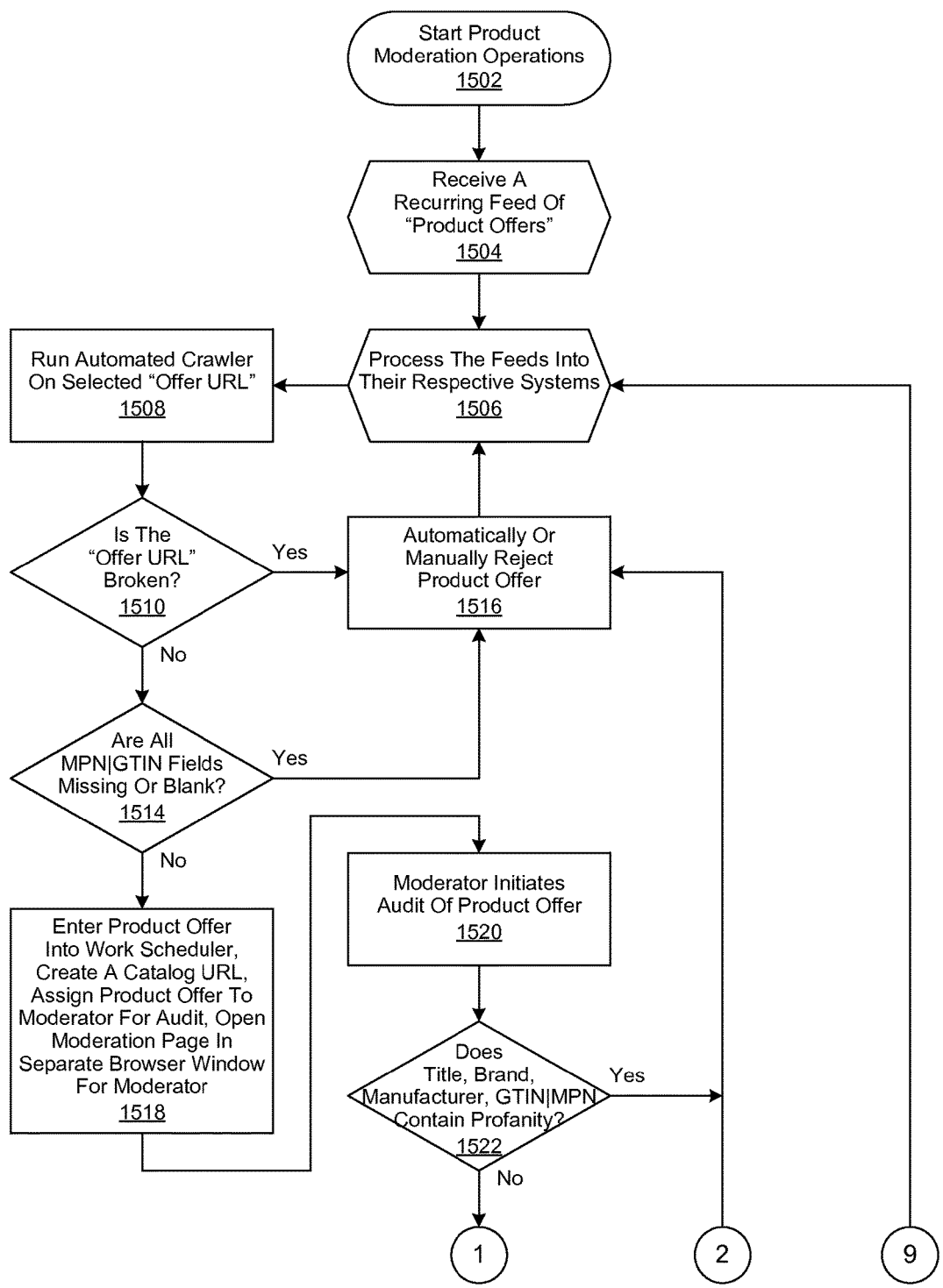
FIGS. 15A-15E are a generalized flow chart of the performance of product moderation operations.
Figure 15B:
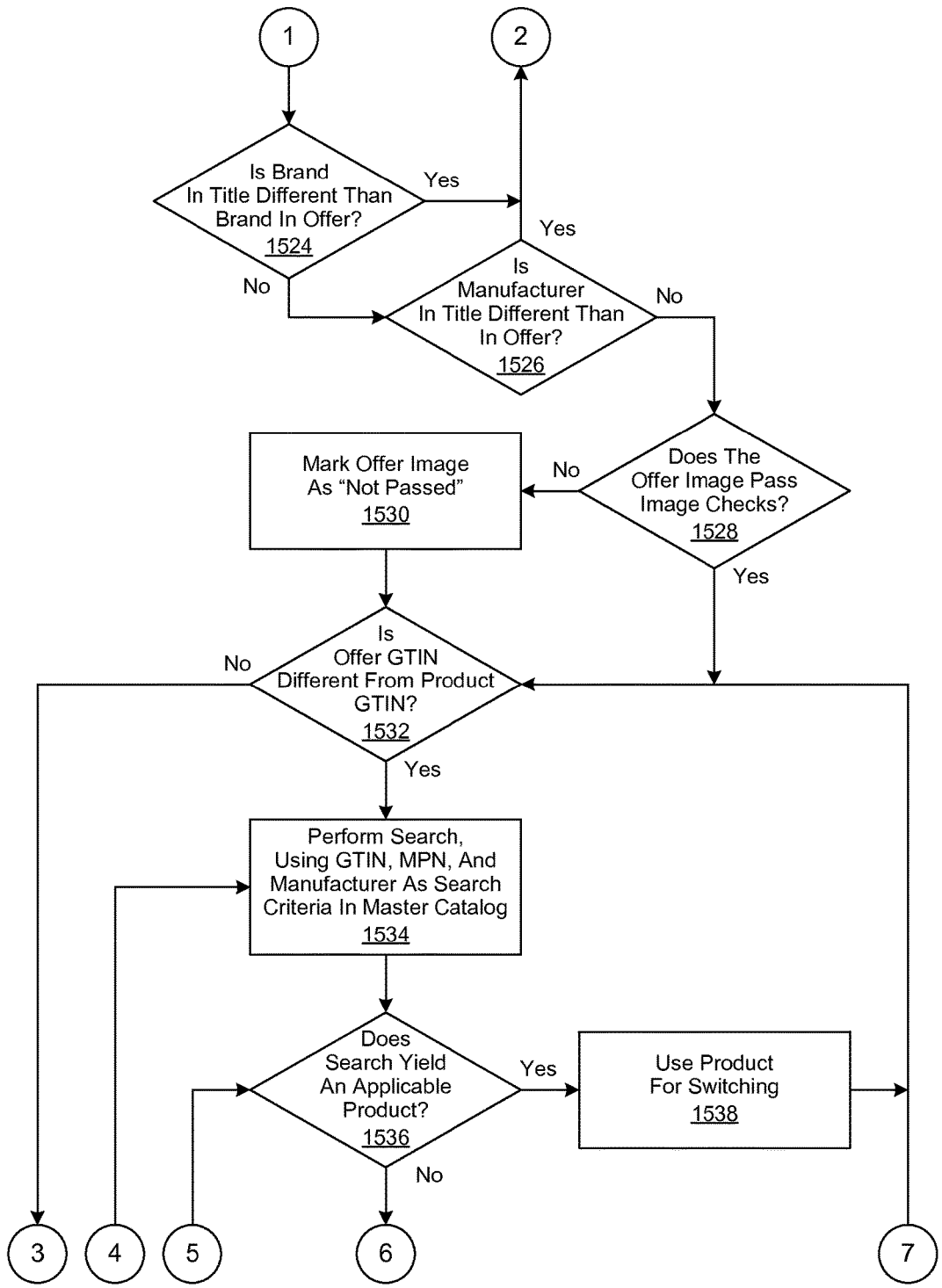
Figure 15C:
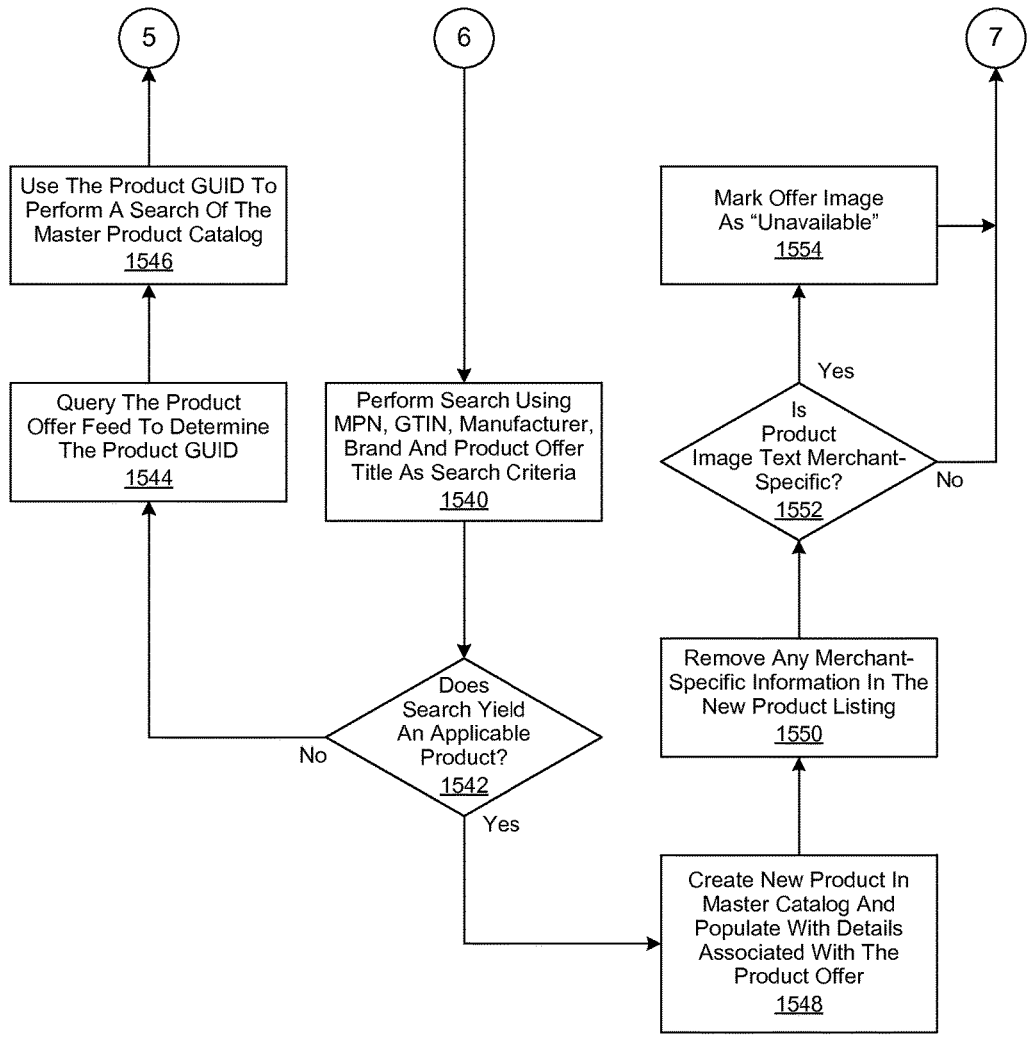
Figure 15D:
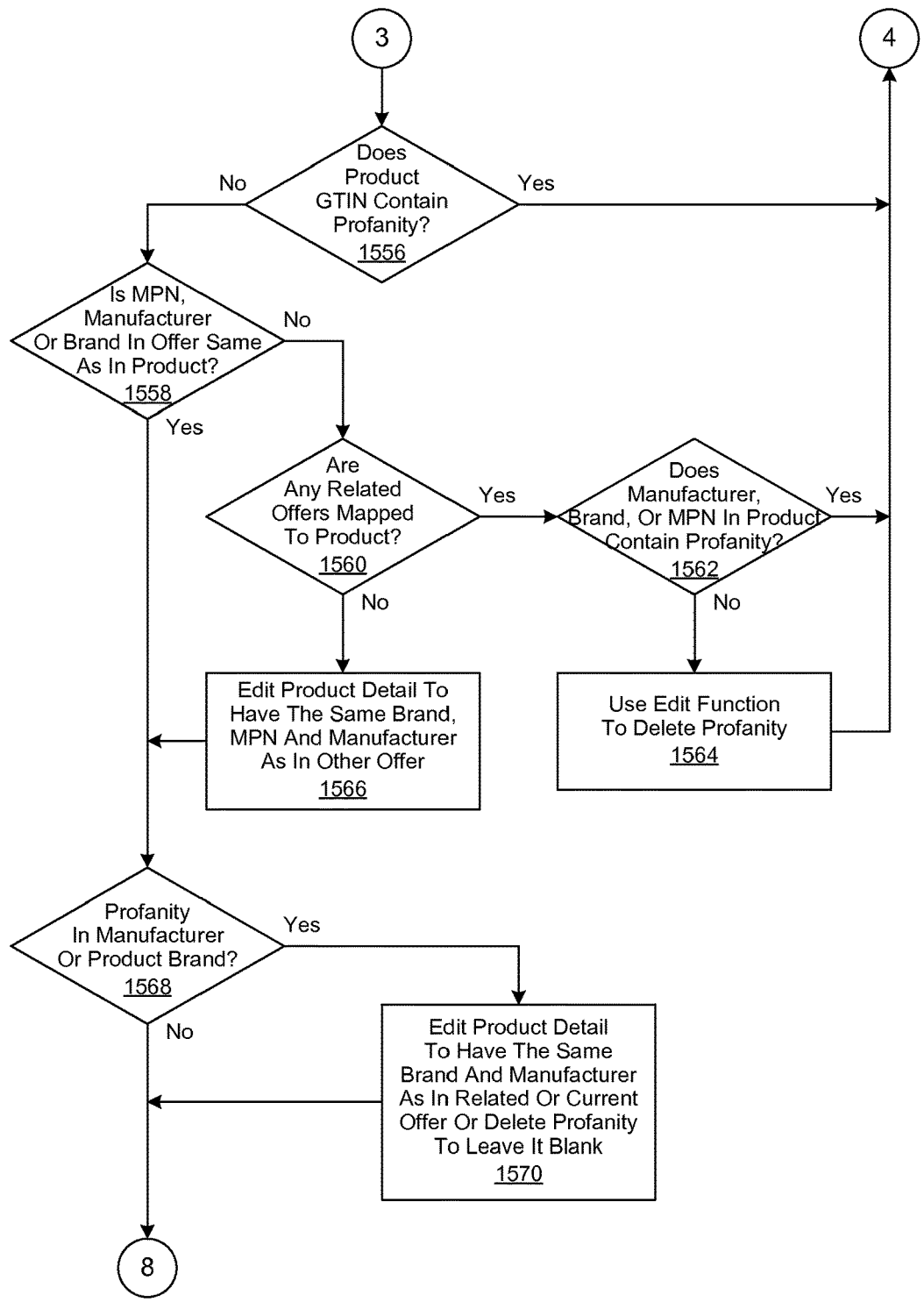
Figure 15E:
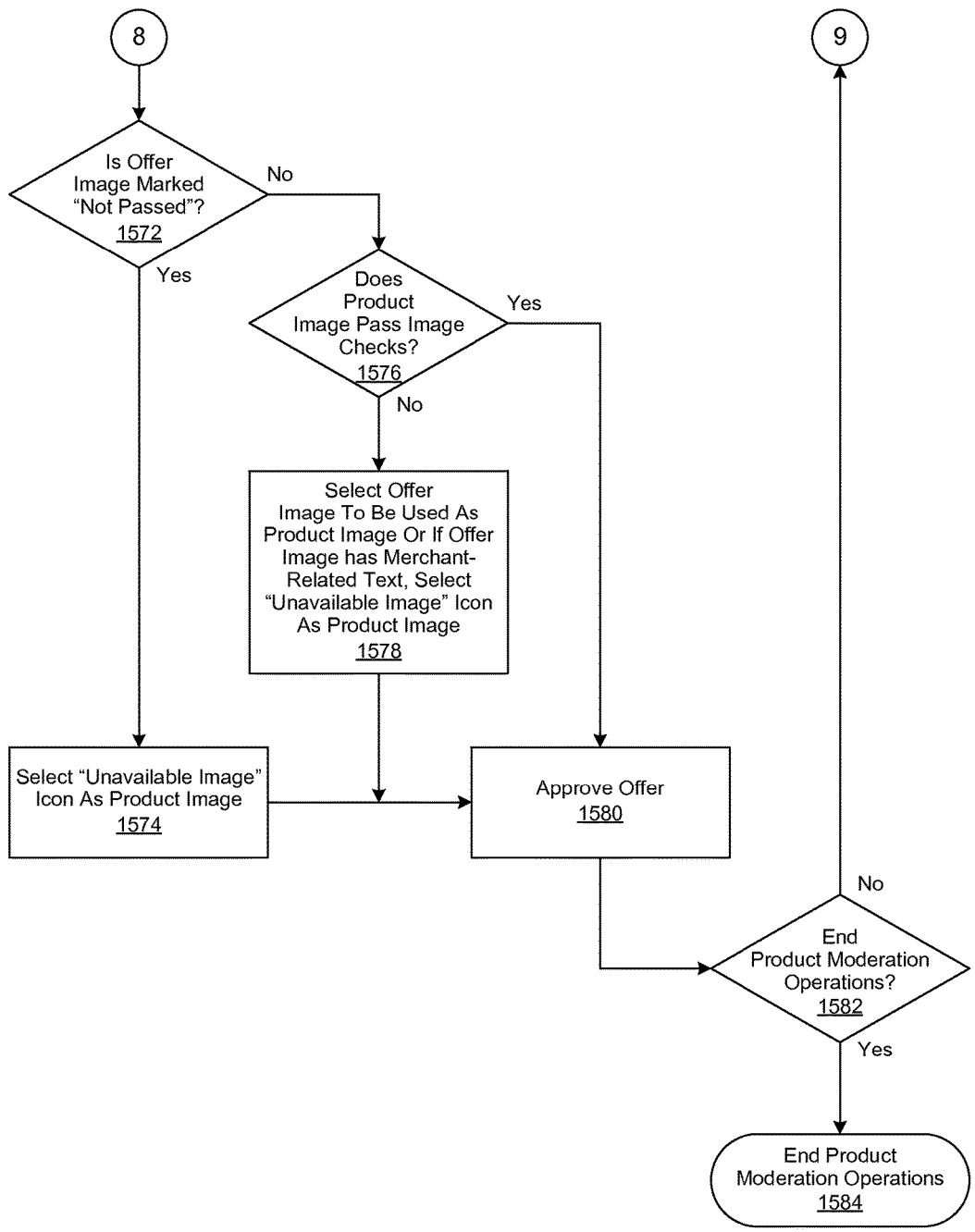

FIGS. 14A-14C are a generalized flow chart of the performance of product categorization operations as implemented in accordance with an embodiment of the invention. In this embodiment, product categorization operations are begun in step 1402, followed by the receipt of recurring data feeds of catalog data from a vendor, merchant or other product source in step 1404. The catalog data is then processed in step 1406 to acquire stock keeping units (SKUs) related to an individual vendor, merchant or other product source, their corresponding merchant category pairs, Global Trade Item Numbers (GTINs), and manufacturer part numbers (MPNs). As used herein, a merchant category pair refers to a pairing of an individual vendor, merchant or other product source and a predetermined product category.

A SKU categorization file is then generated in step 1408, followed by the addition of a SKU category column to the SKU categorization file in step 1410. Then, in step 1412, target product catalog data feeds are consolidated into batches for processing. The consolidated product catalog data is processed to identify products that have neither a MTN nor a GTIN (MPN|GTIN). Catalog product data is then selected for processing in step 1412, followed by a determination being made in step 1414 whether the selected catalog product data comprises MPN|GTIN data. If so, then a products crawler system, such as a web crawler system familiar to those of skill in the art, is accessed and the selected catalog product data is inputted in step 1418. The products crawler then performs a search in step 1420 for the MPN|GTIN associated with the selected product data. It will be appreciated by those of skill in the art that in various embodiments the product crawler may be implemented to crawl web pages, sites, and other data repositories residing on the Internet at-large, private and proprietary data repositories, or both.

A determination is then made in step 1422 whether the product crawler has identified additional product data corresponding to the MPN|GTIN associated with the selected product data. If so, then a determination is made in step 1424 whether only one product category is listed for the MPN|GTIN. If not, then a determination is made in step 1426 whether the product category is listed within the master product catalog. If so, then the product crawler selects the first product category out of a set of listed categories in step 1428. Thereafter, or if it was determined in step 1424 that only one product category was listed, the product crawler selects the first search result. Then, in step 1432, the product crawler captures all required details from product content associated with the link to the first search result. The product crawler then matches the captured MPN|GTIN to the MPN|GTIN returned in the product crawler search in step 1434, followed by making a determination in step 1436 whether the product details between the two MPN|GTIN are similar. If not, or if it was determined in step 1416 that the MPN|GTIN was not available, or in step 1422 that product crawler did not find a MPN|GTIN, or in step 1426 that a product category was not listed, then the product data is sorted on the basis of merchant category and product brand. Then, in step 1440, a merchant category is selected, followed by selecting the first product brand in the selected merchant category.

A determination is then made in step 1442 whether the product brand in the selected merchant category is "blank," (e.g., "generic," not specified, etc.). If so, then a check is performed in step 1444 with the associated product image specifications and product details to ascertain a product brand for each SKU with a "blank" product brand. A determination is then made in step 1446 whether the product brand can be verified. If not, then the SKU category within the SKU categorization file is assigned a value of "uncategorized" and the process is continued, proceeding with step 1440. Otherwise, or if it was determined in step 1442 that the product brand was not "blank," then for each product brand under the merchant category, a category assigned by an automated process is used as a benchmark and to initialize manual categorization for unmapped products in step 1450. The benchmark category for the product brand is then assigned in step 1452 as the category for SKUs in the SKU categorization file.

However, if it was determined in step 1436 that the product details between the two MPN|GTIN are not similar, then the product crawler sets the first category as the category for the GTIN in the SKU categorization file. Thereafter, or after the benchmark category for the product brand has been assigned in step 1452, then the product data is sorted, based on merchant category, in step 1454. Then, in step 1456, one merchant category at a time is selected, with a final merchant category being assigned within the master catalog, based on the least common category applicable for all SKUs within that merchant and merchant category pair. The product data is then populated in the master catalog, followed by a determination in step 1460 whether to end product categorization operations. If not, then the process is continued, proceeding with step 1412. Otherwise, product categorization operations are ended in step 1462.

FIGS. 15A-15E are a generalized flow chart of the performance of product moderation operations in accordance with an embodiment of the invention. In this embodiment, product moderation operations are begun in step 1502, followed by the receipt of a recurring data feed of "product offers" in step 1404. As used herein, "product offers" refer to product data associated with a product being offered for sale, or resale, by a merchant, vendor, manufacturer or other product source. The product offer data feeds are then processed by various systems associated with the product moderation process in step 1506 and an automated product crawler system, such as a web crawler system familiar to those of skill in the art, is run on the URL of a selected product offer in step 1508.

A determination is then made in step 1510 whether the URL associated with the selected product offer is broken. If so, then the product offer is automatically or manually rejected in step 1516 and the process is continued, proceeding with step 1506. Otherwise, a determination is made in step 1514 whether all MPN|GTIN fields in the product offer are blank. If so, then the product offer is automatically or manually rejected in step 1516 and the process is continued, proceeding with step 1506. Otherwise, in step 1518, the product offer is entered into a work scheduler, a master catalog URL is created, the product offer is assigned to a moderator for auditing, and a moderation page is opened in a separate browser window for the assigned moderator.

The assigned moderator then initiates the audit of an assigned product offer in step 1520, followed by a determination being made in step 1522 whether the title, brand, manufacturer, or MPN|GTIN fields contain profanity. If so, then the product offer is automatically or manually rejected in step 1516 and the process is continued, proceeding with step 1506. Otherwise, a determination is made in step 1524 whether the brand in the product offer title is different than the brand referenced within the product offer itself. If so, then the product offer is automatically or manually rejected in step 1516 and the process is continued, proceeding with step 1506. Otherwise, a determination is made in step 1526 whether the manufacturer in the product offer title is different than the brand referenced within the product offer itself. If so, then the product offer is automatically or manually rejected in step 1516 and the process is continued, proceeding with step 1506.

Otherwise, a determination is made in step 1528 whether the product image associated with the product offer passes image checks. As an example, the product image may not pass the image check if it contains pornography, nudity or profanity. As another example, the product image may not pass the image check if shows a product that is different than a product described within the title of the product offer or within the product offer itself. If it is determined in step 1528 that the product offer image does not pass the image checks, then the product offer image is marked as "not passed" in step 1530. Thereafter, or if it was determined in step 1528 that the product offer image passed the image checks, then a determination is made in step 1532 whether the GTIN of the product offer is different than the GTIN of the product itself. If so, then a search is performed in step 1534, using GTIN, MPN, and manufacturer name as search criteria to perform the search in the master catalog.

A determination is then made in step 1536 whether the search yielded an applicable product. If so, then the product data associated with the applicable product is used in step 1538 to replace (i.e., "switch") the product data associated with the product offer. The process is then continued, proceeding with step 1532. However, if it was determined in step 1538 that the search did not yield an applicable product, then a search is performed in step 1540 using the MPN, GTIN, manufacturer name, and the title of the product offer as search criteria. A determination is then made in step 1542 whether the search yielded an applicable product. If not, the product offer data feed is queried in step 1544 to determine the Global Unique Identifier (GUID) associated with the product offer. The GUID is then used to perform a search of the master product catalog and the process is then continued, proceeding with step 1536.

However, if it is determined in step 1542 that the search yields an applicable product, then a new product is created in the master catalog in step 1548 and populated with the details associated with the product offer. Any information specific to the merchant, vendor or other source of the product offer is then removed from the new product listing in step 1550. A determination is then made in step 152 whether the product image associated with the new product listing is specific to the merchant, vendor or other source of the product offer. If so, then the product image associated with the product offer is marked as "unavailable" in step 1554. Thereafter, or if the product image associated with the new product listing is not specific to the merchant, vendor or other source of the product offer, the process is continued, proceeding with step 1532.

However, if it is determined in step 1532 that the GTIN of the product offer is not different from the GTIN of the product itself, then a determination is made in step 1556 whether the product GTIN contains profanity. If so, then the process is continued, proceeding with step 1534. Otherwise, a determination is made in step 1558 whether the MPN, manufacturer name, or product brand in the product offer is the same as the product itself. If not, then a determination is made in step 1560 whether any related product offers are mapped to the product itself. If so, then a determination is made in step 1562 whether the MPN, manufacturer name, or product brand in the product offer contains profanity. If so, then the process is continued, proceeding with step 1534. Otherwise, an edit function is implemented in step 1564 to manually or automatically delete the profanity from MPN, manufacturer name, or product brand in the product offer and the process is continued, proceeding with step 1534. However, if it is determined in step 1560 that no other product offers are mapped to the product itself, then the product detail is manually or automatically edited in step 1566 to have the same MPN, manufacturer name, or product brand as the other product offer.

Thereafter, or if it is determined in step 1558 that the MPN, manufacturer name, or product brand in the product offer is the same as the product itself, a determination is made in step 1568 whether the manufacturer name or product brand contains profanity. If so, then the product offer is either manually or automatically edited in step 1570 to have the same product brand and manufacturer name as in the related product offer or any identified profanity is deleted. Thereafter, or if is determined in step 1568 that there is no profanity in the manufacturer name or product brand, then a determination is made in step 1572 whether the product image associated with the product offer is marked "not passed." If so, then an "unavailable image" is selected in step 1574 as the product image. Otherwise, a determination is made in step 1576 whether the product image passes image checks. If not, then a product offer image is selected in step 1578 as the product image in the master catalog, or alternatively, an "unavailable image" is selected if the product offer image has merchant-related text. Otherwise, or once the product offer images have respectively selected in steps 1574 or 1578, the product offer is approved in step 1580. A determination is then made in step 1582 whether to end product moderation operations. If not, then the process is continued, proceeding with step 1506. Otherwise, product moderation operations are ended in step 1584.

Figure 16:
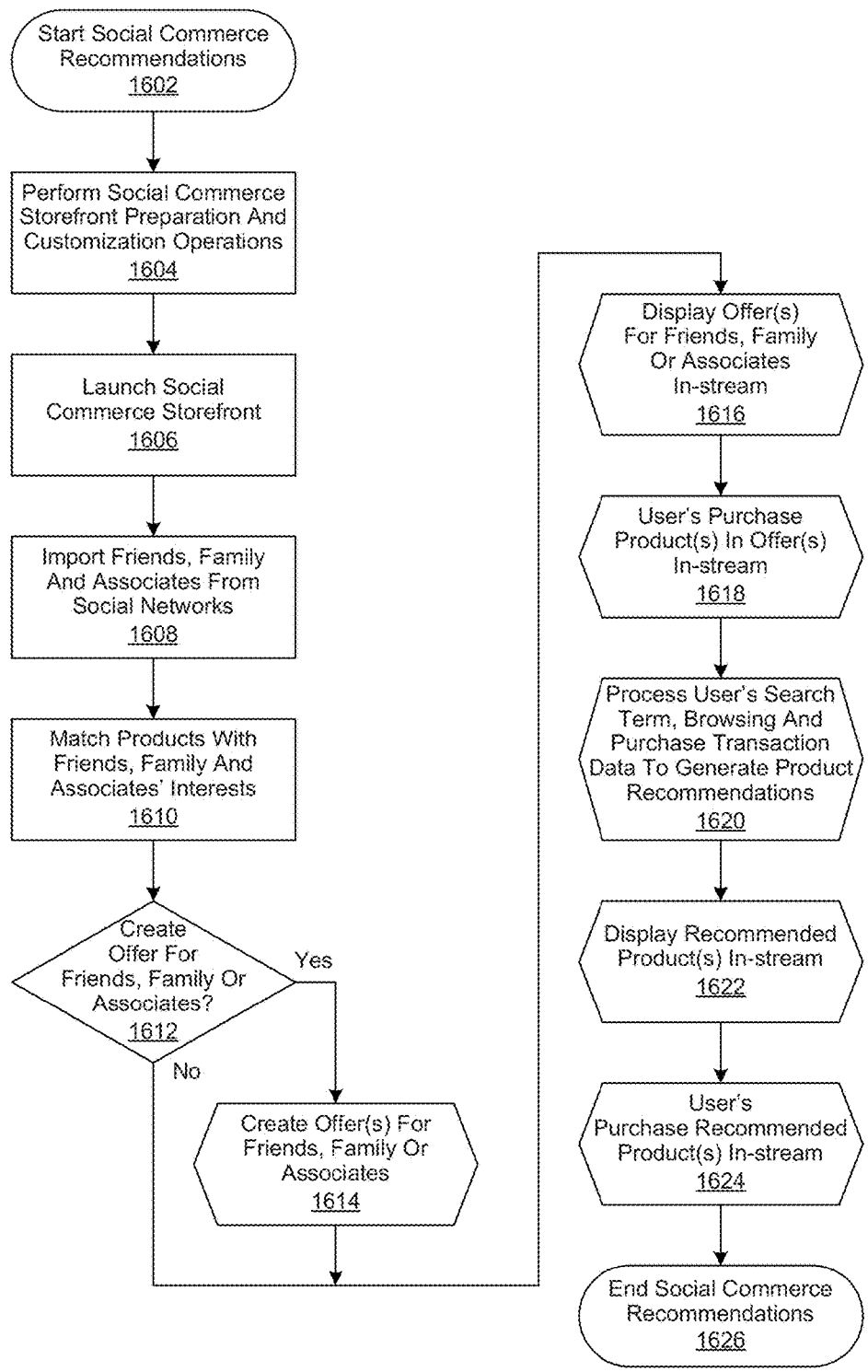
FIG. 16 is a generalized flow chart of the performance of social commerce recommendation operations.

FIG. 16 is a generalized flow chart of the performance of social commerce recommendation operations as implemented in accordance with an embodiment of the invention. In this embodiment, social commerce recommendation operations are begun in step 1602, followed by the performance of social commerce storefront preparation and customization operations in step 1604 as described in greater detail herein. Then, in step 1606, the affiliate's social commerce storefront is launched, followed by the importation in step 1608 of the affiliate's friends, family and associates from one or more social media environments, such as a social network. The products within the affiliate's social commerce storefront are then matched in step 1610 to the respective interests of the affiliate's friends, family and associates.

A determination is then made in step 1612 whether to create an offer for the affiliate's friends, family or associates. If so, then ongoing operations are performed in step 1614 to create the offer. In various embodiments, the offer is created for an individual, a subset, or a grouping of the friends, family and associates. In one embodiment, the offer is created according to search terms used by individual social media users within the friends, family or associates. In another embodiment, the offer is created according to prior purchases made by individual social media users within the friends, family or associates. In yet another embodiment, the offer is created according to social commerce content that individual social media users within the friends, family or associates have accessed. In still another embodiment, the offer is created according to social commerce data associated with the affiliate's social commerce storefront. In this and other embodiments, the social commerce data is provided to the affiliate by the merchant. Those of skill in the art will recognize that many such embodiments are possible and the foregoing is not intended to limit the spirit, scope or intent of the invention.

However, if it is decided not to create an offer in step 1612, or if the offer is created in step 1614, then ongoing operations are performed in step 1616 to display current and prior offers in-line within a social media environment to predetermined friends, family and associates. Ongoing operations are then performed in-line by users (e.g., friends, family and associates) of a social media environment to purchase products associated with the offers in step 1616. In step 1620, ongoing operations are performed to process the user's search term, browsing, purchase transaction, and other historical data to generate product recommendations, which are then displayed in-line within the social media environments to the users in step 1622. In one embodiment, the product recommendation comprises a promotional offer. Ongoing operations are then performed by the users in step 1624 to purchase the recommended products in-line within the social media environments and social commerce recommendation operations are ended in step 1626.

Figure 17:
FIG. 17 shows the selection of a merchant's products within a user interface window to generate an offer.

FIG. 17 shows the selection of a merchant's products within a user interface window implemented in accordance with an embodiment of the invention to generate an offer. In this embodiment, a social commerce storefront management module, as described in greater detail herein, is implemented within a window 1704 of a user interface (UI) 1702. As shown in FIG. 17, the UI window 1704 comprises a 'Products' tab 1706, a plurality of product selection command buttons 1708, and corresponding product data display fields 1710. In various embodiments, an affiliate uses the plurality of product selection command buttons 1708, and corresponding product data display fields 1710 to select a product for a recommendation or an offer as described in greater detail herein.

Figure 18:
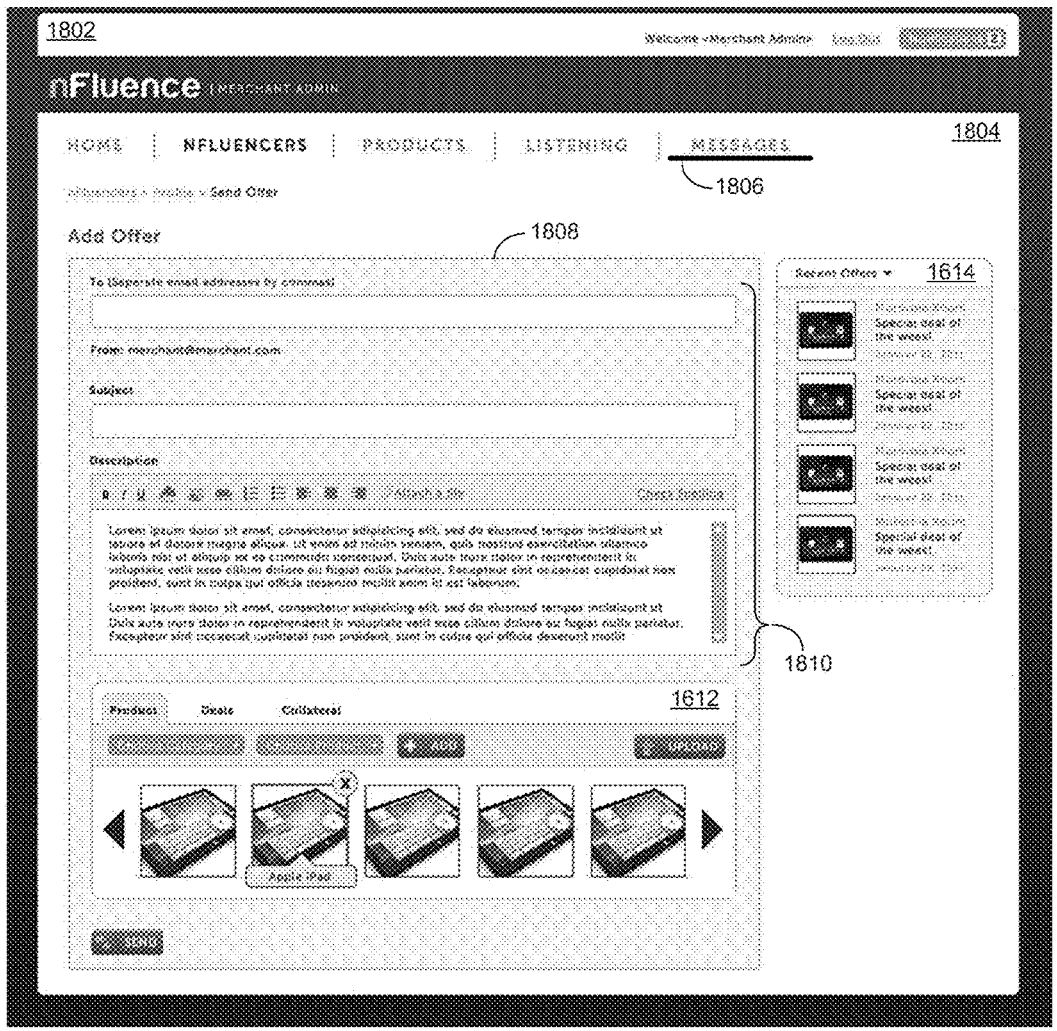
FIG. 18 shows the creation of an offer to a social media user within a user interface window.

FIG. 18 shows the creation of an offer to a social media user within a user interface window implemented in accordance with an embodiment of the invention. In this embodiment, a social commerce storefront management module, as described in greater detail herein, is implemented within a window 1804 of a user interface (UI) 1802. As shown in FIG. 18, the UI window 1804 comprises an 'Messages' tab 1806, an 'Offer' data entry form 1808, and a "Recent Offers" display sub-window comprising a plurality of recent offers. As likewise shown in FIG. 18, the 'Offer' data entry form 1808 further comprises a plurality of offer data entry fields 1810 and a plurality of product selection thumbnails 1812. In various embodiments, the 'Offer' data entry form 1808 and the plurality of product selection thumbnails 1812 are used by the affiliate to generate an offer or a recommendation.

In these and other embodiments, the offer or recommendation is created for an individual, a subset, or a grouping of friends, family and associates. In one embodiment, the offer is created according to search terms used by individual social media users within the friends, family or associates. In another embodiment, the offer is created according to prior purchases made by individual social media users within the friends, family or associates. In yet another embodiment, the offer is created according to social commerce content that individual social media users within the friends, family or associates have accessed. In still another embodiment, the offer is created according to social commerce data associated with the affiliate's social commerce storefront. In one embodiment, the recommendation comprises a promotional offer. In these various embodiments, the social commerce data is provided to the affiliate by the merchant. Those of skill in the art will recognize that many such embodiments are possible and the foregoing is not intended to limit the spirit, scope or intent of the invention.

Figure 19:
FIG. 19 shows a product offer and its corresponding social commerce data within a user interface window.

FIG. 19 shows a product offer and its corresponding social commerce data within a user interface window implemented in accordance with an embodiment of the invention. In this embodiment, a social commerce storefront management module, as described in greater detail herein, is implemented within a window 1904 of a user interface (UI) 1902. As shown in FIG. 19, the UI window 1904 comprises an 'Products' tab 1906, an 'Offer' display sub-window 1908, and a plurality of social commerce performance measurement metrics 1914 associated with the offer and corresponding data 1916. As likewise shown in FIG. 19, the 'Offer' display sub-window 1908 comprises a plurality of product data 1910 associated with the offer and a graphic 1912 of the product.

Figure 20:
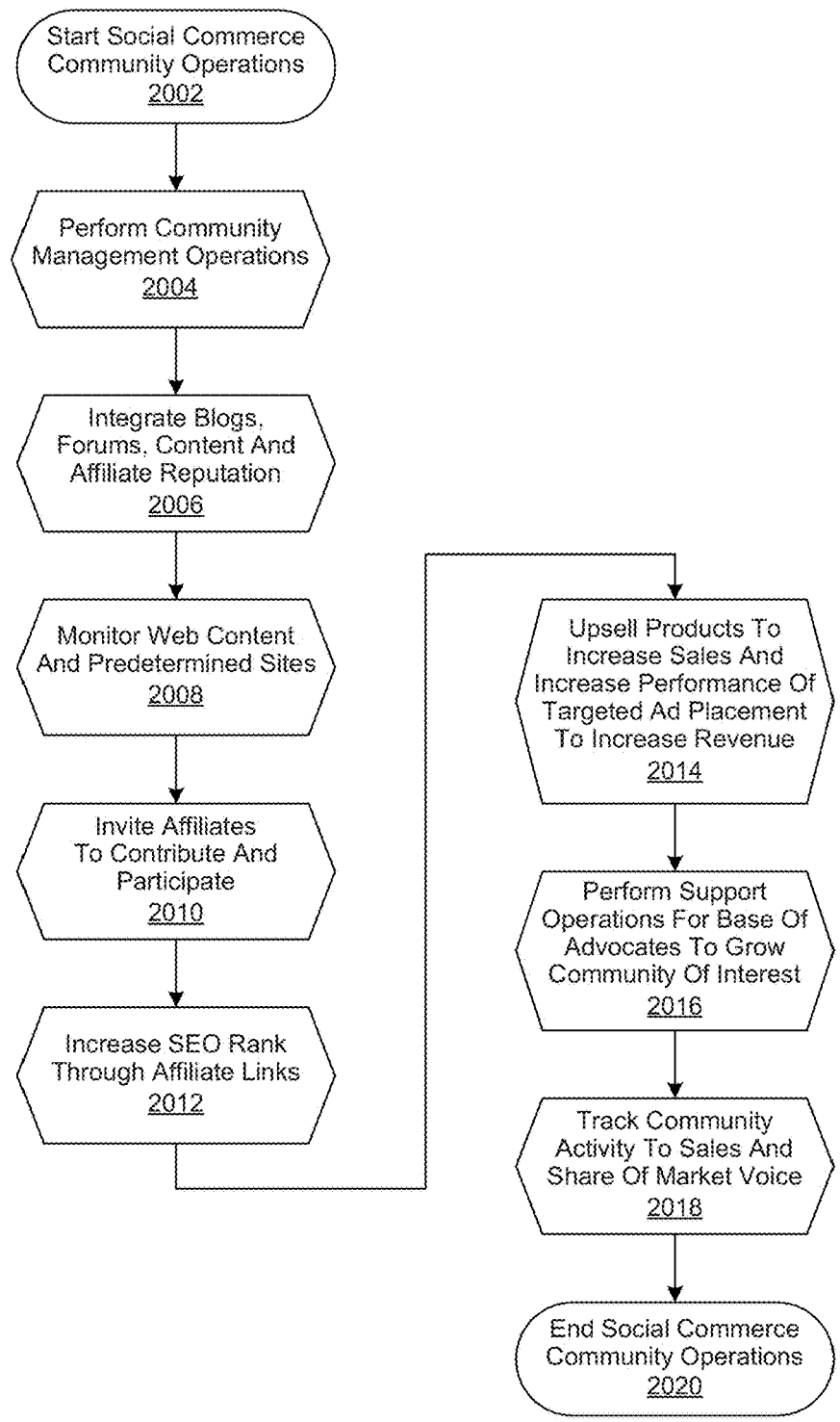
FIG. 20 is a generalized flow chart of the performance of social commerce community management operations.

FIG. 20 is a generalized flow chart of the performance of social commerce community management operations as implemented in accordance with an embodiment of the invention. In this embodiment, social commerce community management operations are begun in step 2002, followed by the ongoing performance of community management operations in 2004. As an example, a merchant may manage a plurality of communities of interest that are associated with single or multiple social media environments. In various embodiments, these communities of interest may likewise be associated with individual or multiple affiliates and affiliate networks. Many such embodiments are possible and the foregoing is not intended to limit the spirit, scope or intent of the invention.

In step 2006, ongoing operations are performed to integrate blogs, forums, and various other social commerce content with the reputation rating of various affiliates. Ongoing operations are then performed in step 2008 to monitor web content and other data at predetermined web sites, followed by ongoing operations in step 2010 to invite affiliates to contribute social commerce content and participate in various social commerce activities and promotions. In step 2012, ongoing operations are performed to increase the search engine optimization (SEO) ranking of the merchant's web site, and the presentation of associated products, through affiliate links as described in greater detail herein. Ongoing operations are then performed in step 2014 to increase revenue by upselling products in order to increase product sales as well as the performance of targeted advertisement placement. In step 2016, ongoing support operations are performed for a base of advocates to grow predetermined communities of interest. Ongoing operations are then performed in step 2018 to track community of interest activity and corresponding share of market voice. Social commerce community operations are then ended in step 2020.

Figure 21:
FIG. 21 shows the display of social commerce data associated with a predetermined affiliate within a user interface window.

FIG. 21 shows the display of social commerce data associated with a predetermined affiliate within a user interface window implemented in accordance with an embodiment of the invention. In this embodiment, a social commerce storefront management module, as described in greater detail herein, is implemented within a window 2104 of a user interface (UI) 2102. As shown in FIG. 21, the UI window 2104 comprises an 'Affiliates' tab 2106, a 'Send Email' 2112 command button and a 'Send Offer' command button 2114. As likewise shown in FIG. 21, the UI window 2104 comprises a plurality of data 2108 associated with a predetermined affiliate, and a "Product Activity" 2110 sub-window displaying data corresponding to social commerce content associated with the affiliate's social commerce storefront. The UI window 2104 likewise comprises 'Account Information' 2116, 'Items Sold' 2118, 'Commissions Paid' 2120, and 'Account Notes' 2122 data display windows, each of which displays associated social commerce data.

Figure 22:
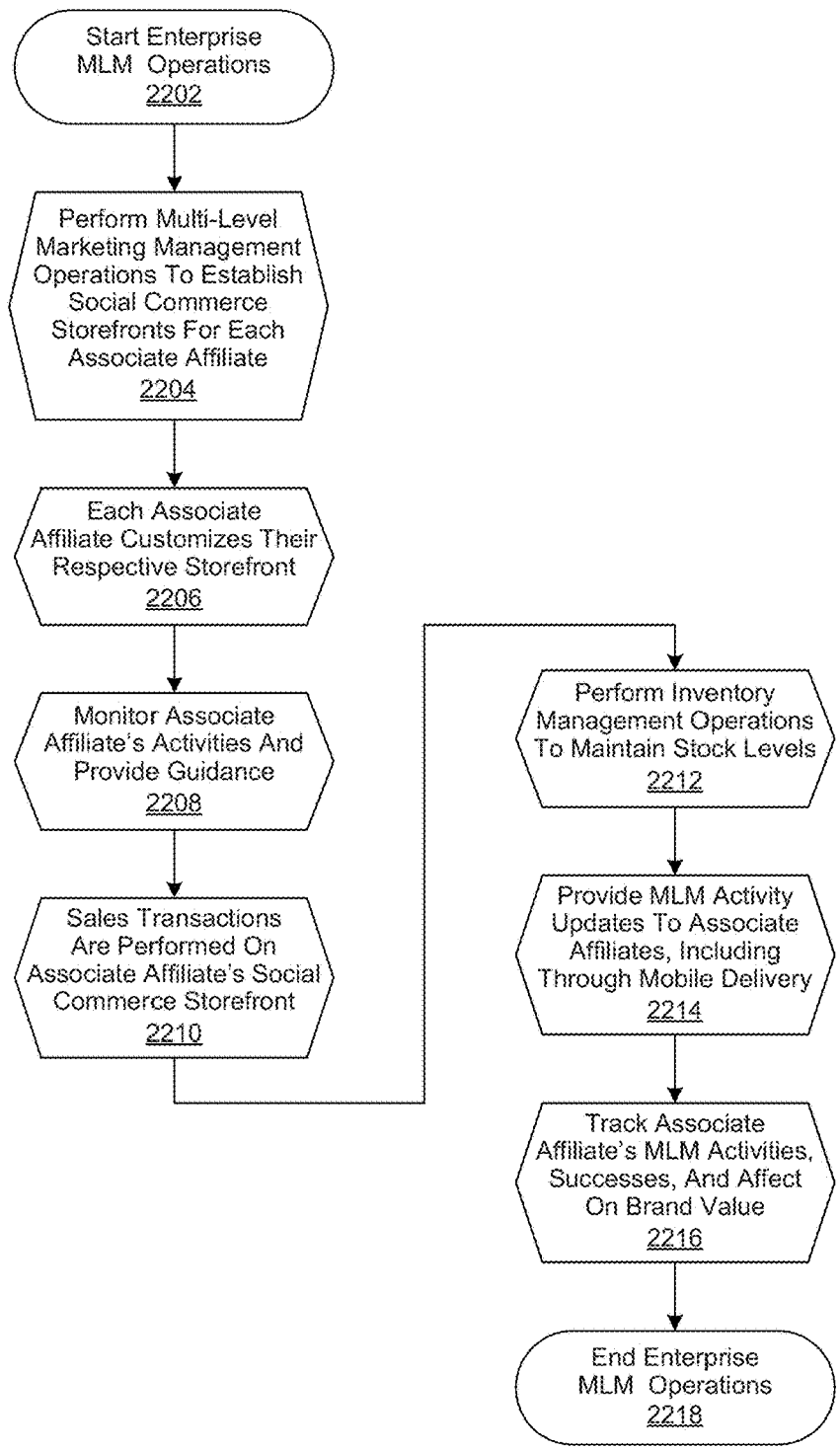
FIG. 22 is a generalized flow chart of the performance of social commerce multilevel marketing management operations.

FIG. 22 is a generalized flow chart of the performance of social commerce multilevel marketing management operations as implemented in accordance with an embodiment of the invention. In various embodiments, an affiliate of a merchant comprises a plurality of associated affiliates. As an example, an enterprise such as a corporation that provides consulting services may have multiple consultants, each of which is an associate affiliate by extension. In these and other embodiments, each associate affiliate may have one or more corresponding social commerce storefront that is unique to the associate affiliate. In this embodiment, enterprise multilevel marketing (MLM) operations are begun in step 2202, followed by the ongoing performance of MLM management operations to establish individual social commerce storefronts for each associate affiliate.

In step 2206, ongoing operations are performed by individual associate affiliates to customize and manage their respective social commerce storefront, followed by ongoing operations being performed in step 2208 to monitor their activities and provide guidance. In step 2210, ongoing sales transactions are performed, as described in greater detail herein, within each associate affiliate's social commerce storefront, followed by ongoing operations being performed in step 2212 to maintain merchant product stock levels. Ongoing operations are then performed in step 2214 to provide MLM activity updates to the associate affiliates, including through delivery to a mobile device, and ongoing operations are performed in step 2216 to track the associate affiliates' activities, successes, and effect on the merchant's brand value. Enterprise social commerce MLM activities are then ended in step 2218.

Figure 23:
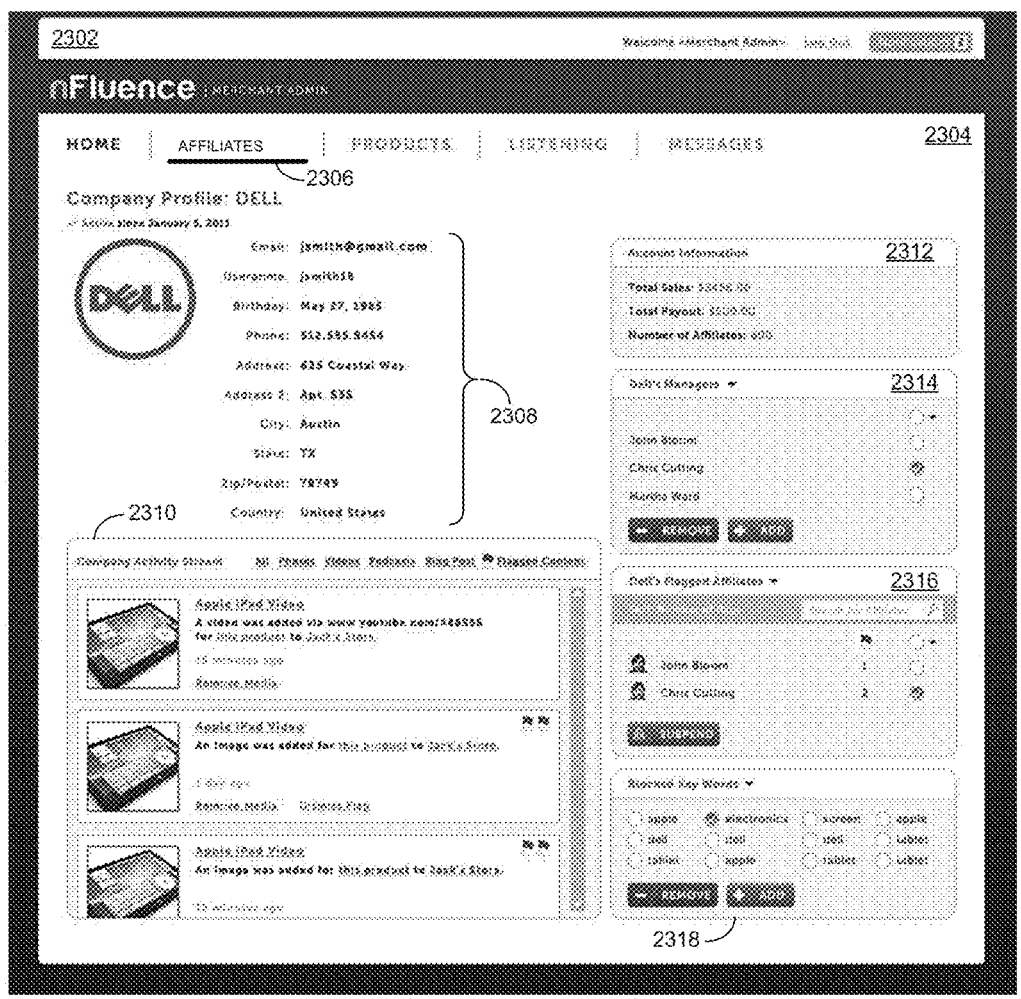
FIG. 23 shows the display of social commerce data associated with a predetermined multilevel marketing affiliate within a user interface window.

FIG. 23 shows the display of social commerce data associated with a predetermined multilevel marketing (MLM) affiliate within a user interface window implemented in accordance with an embodiment of the invention. In this embodiment, a social commerce storefront management module, as described in greater detail herein, is implemented within a window 2304 of a user interface (UI) 2302. As shown in FIG. 23, the UI window 2304 comprises an 'Affiliates' tab 2306, a MLM 'Account Information' 2312 data display window displaying a plurality of social commerce data associated with an MLM affiliate. The UI window 2304 likewise comprises a merchant MLM 'Managers' 2314 data display window displaying data associated with a merchant's MLM affiliate managers. As likewise shown in FIG. 23, the UI window 2304 comprises a 'Flagged Affiliates' data display window 2316 displaying various MLM associate affiliates that have been flagged for suspension and a 'Blocked Key Words' 2318 command button panel. The UI window 2304 likewise comprises a "Product Activity" 2310 sub-window displaying data corresponding to social commerce content associated with various MLM associate affiliates' social commerce storefronts.

Figure 24:
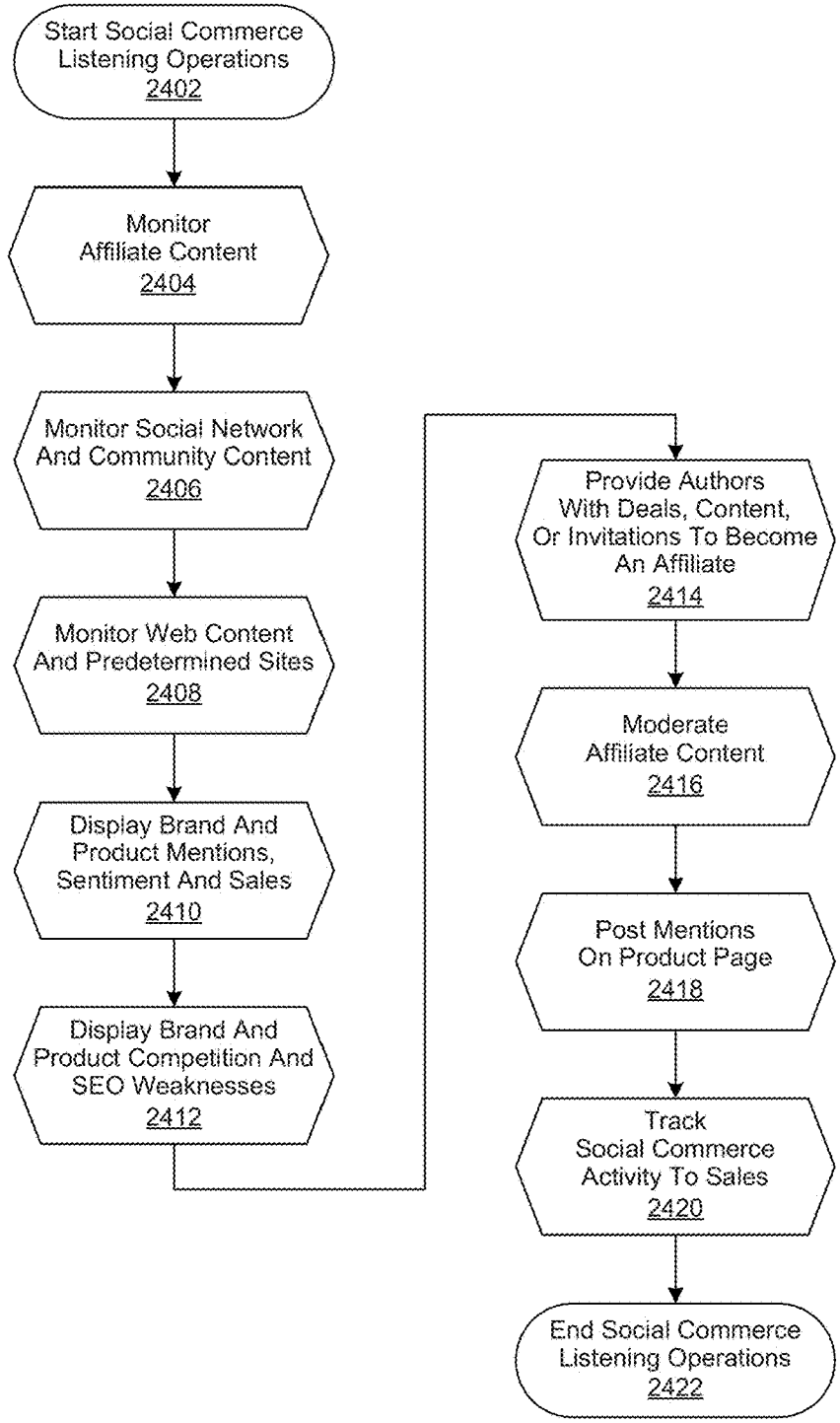
FIG. 24 is a generalized flow chart of the performance of social commerce listening operations.

FIG. 24 is a generalized flow chart of the performance of social commerce listening operations as implemented in accordance with an embodiment of the invention. In this embodiment, social commerce listening operations are begun in step 2401, followed by ongoing operations in step 2404 to monitor social commerce content associated with affiliates. In step 2406, ongoing operations are performed to monitor non-social-commerce content within various social media environments and associated communities of interest, followed by ongoing operations in step 2408 to monitor non-social-commerce content within various predetermined web sites. Ongoing operations are then performed in step 2410 to display the merchant's brand, product mentions, sentiment, and sales within various social commerce venues, followed by operations being performed in step 2412 to display competitor's brands, product competition, and search engine optimization (SEO) weaknesses.

In step 2414, ongoing operations are performed to provide various social media content authors with promotional deals, additional source content, or invitations to become an affiliate of the merchant. Ongoing operations are then performed in step 2416 to monitor social commerce content provided by affiliates, followed by ongoing operations in step 2418 to post product mentions on the respective product page within various affiliate social commerce storefronts. In step 2420, ongoing operations are performed to track social commerce activity leading to sales of purchasable products and social commerce listening operations are ended in step 2422.

Figure 25:
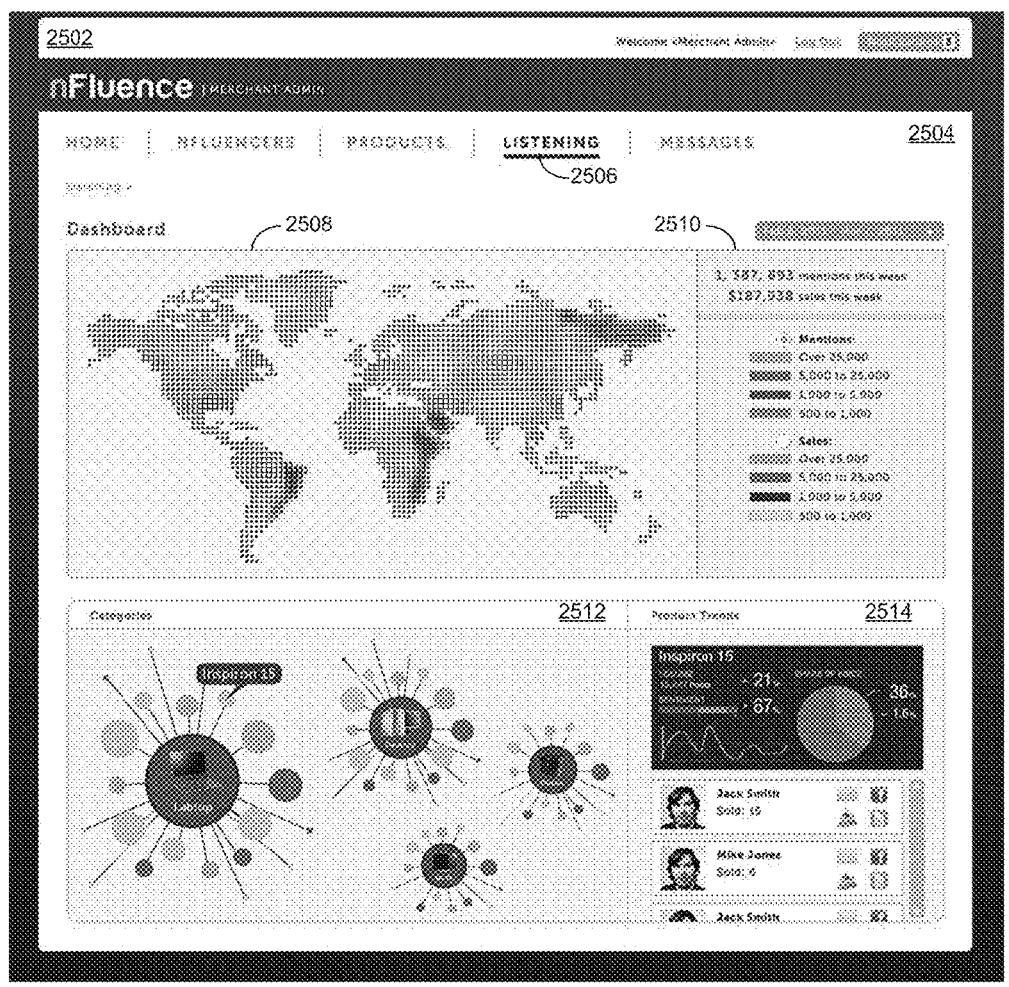
FIG. 25 shows the display of social commerce data associated with a plurality of affiliates marketing a plurality of merchant products within a user interface window.

FIG. 25 shows the display of social commerce data associated with a plurality of affiliates marketing a plurality of merchant products within a user interface window implemented in accordance with an embodiment of the invention. In this embodiment, a social commerce storefront management module, as described in greater detail herein, is implemented within a window 2504 of a user interface (UI) 2502. As shown in FIG. 25, the UI window 2504 comprises a 'Listening' tab 2506, a 'Dashboard' graphics window 2508 displaying a graphical depiction of sales activity associated with a plurality of affiliates, and a corresponding data display 2510 window displaying associated social commerce summary data. As likewise shown in FIG. 25, the UI window 2504 comprises a 'Categories' graphics window 2512 graphically depicting various products. The UI window 2504 likewise comprises a corresponding 'Product Trends' 2514 data display window displaying product trend data associated with various products graphically depicted in the 'Categories' graphics window 2512.

Figure 26:
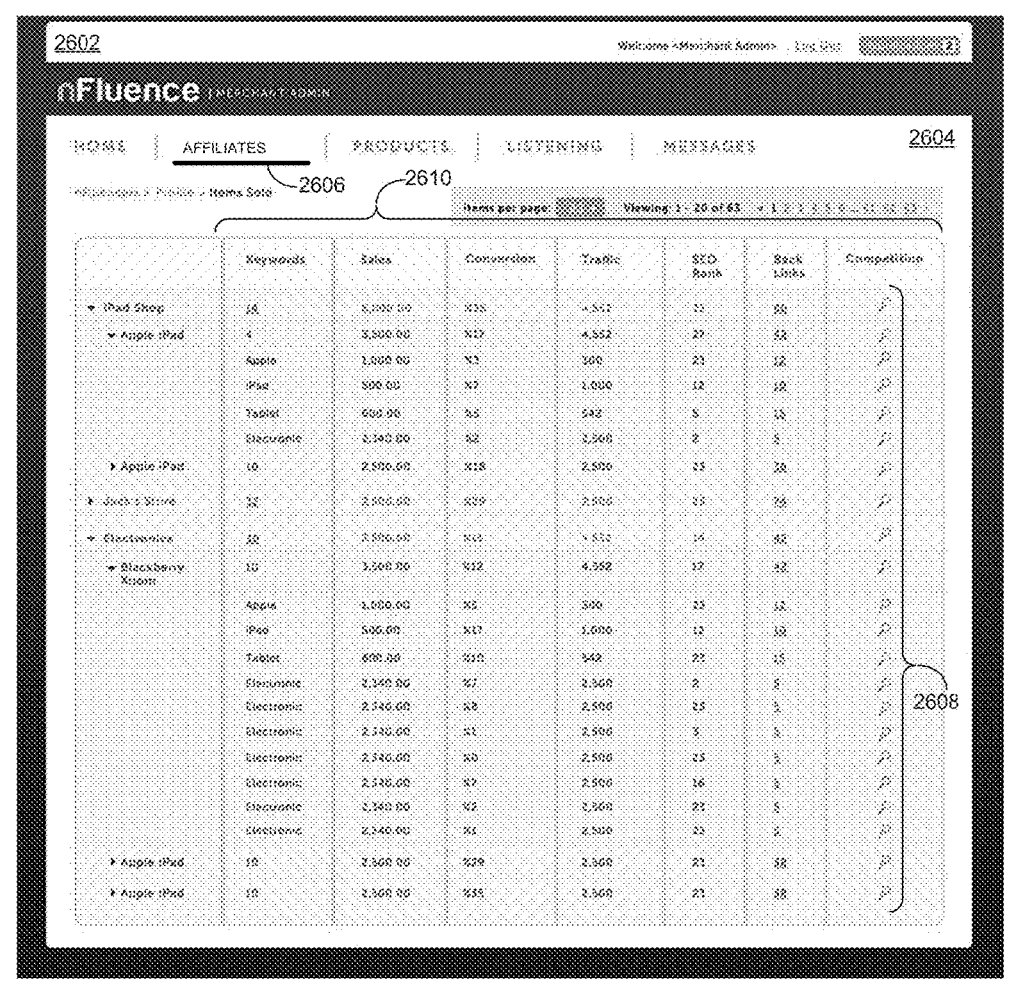

FIG. 26 shows the display of social commerce data associated with a plurality of merchant products within a user interface window implemented in accordance with an embodiment of the invention. In this embodiment, a social commerce storefront management module, as described in greater detail herein, is implemented within a window 2604 of a user interface (UI) 2602. As shown in FIG. 26, the UI window 2604 comprises an 'Affiliates' tab 2606, a plurality of social commerce metrics 2610 corresponding to a plurality of products sold in various social commerce storefronts.

Figure 27:
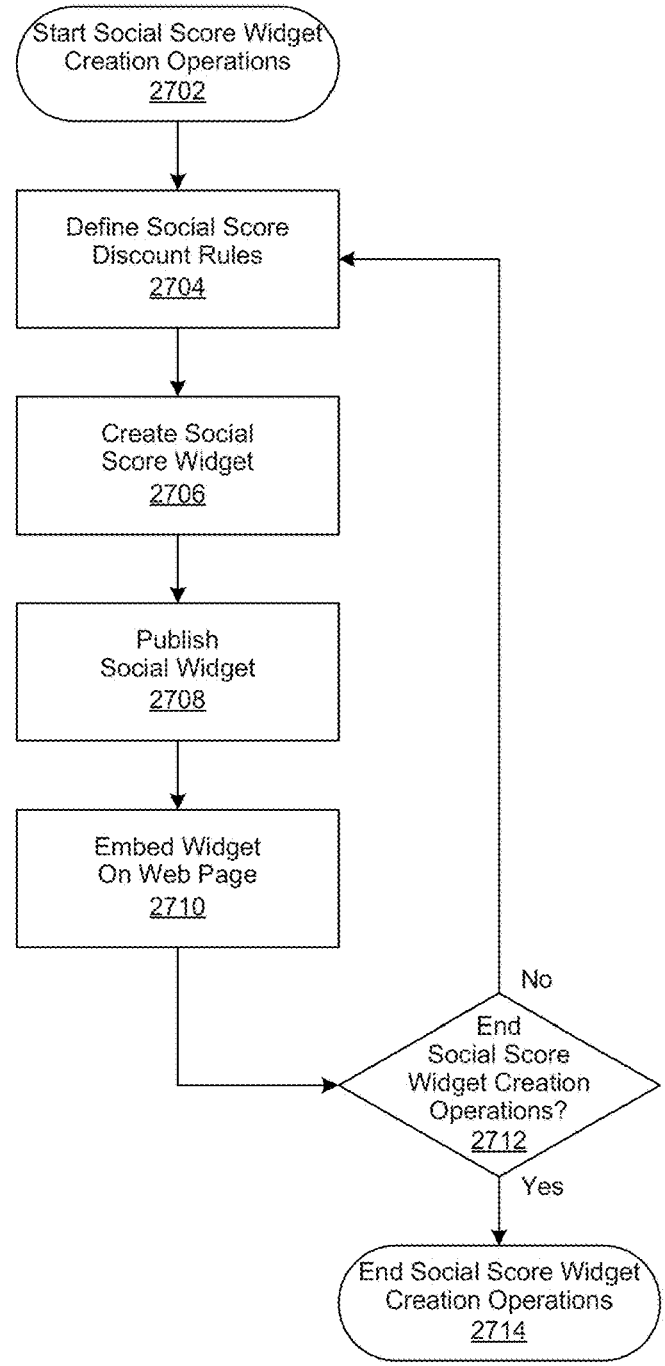
FIG. 27 is a generalized flow chart of the performance of social score widget creation operations.

FIG. 27 is a generalized flow chart of the performance of social score widget creation operations as implemented in accordance with an embodiment of the invention. In various embodiments, a social score recommendation widget is implemented to evaluate a visitor's social identity across multiple third party social sites. The resulting evaluation is then used to determine what to display (e.g., to recommend) to the user based on their social score. As used herein, a social score broadly refers to a numeric value, or set of values, that represents the user's relative value based on their influence, reach and engagement level within one or more social networks. In these various embodiments, the user's social score provides merchants and other types of organizations to dynamically present special offers. Such offers are typically presented in the context of recommendations for predetermined products, product offers or deals, and content (e.g., articles, videos, ratings, reviews, etc.). The recommendations are based on the user's perceived value, or importance, to the organization with the goal of inducing an interaction with the visitor. Likewise, social score recommendations can be combined with other types of recommendations and algorithms to further target offers to visitors based not only on their social score, but other factors that increase the likelihood of the visitor to take action and interact with the recommendation.

Referring now to FIG. 27, social score widget creation operations are begun in step 2702, followed by the definition of social score discount rules in step 2704. In various embodiments, the social score discount rules are defined by a user and then stored within the social marketplace system. The social score discount rules, as described in greater detail herein, are then used by a recommendation engine to evaluate a visitor when they interact with a social score recommendation or recommendation widget.

In one embodiment, the social score discount rules are defined through the use of a point-and-click user interface (UI) to create the rules, in combination with matching criteria associated with predetermined social scores, such as:
  visitor's social score=35
  visitor's social score<=45
  visitor's social score>=35 and visitor has an average order value>=$52.00
  visitor's social score is between 35 and 75
  visitor's social score for a predetermined social network<=25
  visitor's third party social score>20

In this and other embodiments, the rules and matching criteria are saved in a repository for late reuse. A social score widget is then created in step 2706. In various embodiments, a user accesses a widget creation module within the social commerce marketplace system and elects to create a social score widget. A subset of available assets is then selected by the user for display to a visitor within the widget. In one embodiment, the user associates the aforementioned social score rules to each selected asset to control:
  whether to display the asset in the widget
  the order to display asset in the widget
  whether to offer a discounts
  the amount of discount to apply to the asset
  which images to display To further the example, the following table illustrates how social scores can be used to dynamically control what is presented or recommended to visitors based on their social score:

| Asset | Rules assigned to Asset | Example |
| --- | --- | --- |
| Product X | Display Rule = Only display if visitor's social score >=30 | Visitor visits site with a Social Score type widget and has a social score of 37. Product X would be displayed within the widget for the user |
| Discount to display | Do not offer discount if visitor's social score <20 10% discount if visitors social score is between 20 and 30 20% discount if visitors social score is between 30 and 40 50% discount if visitors social score >40 | Visitor would be displayed a 20% discount within the widget for Product X |
| Display order in widget | Display first if visitor's social score >=35 | The first product the visitor would see in the widget would be Product X |

In one embodiment, the visitor's social score is used by the recommendation engine to control whether or not to display a recommendation and to likewise determine the type of widget to display. It will be appreciated that many such controls are possible and the foregoing is not intended to limit the spirit, scope or intent of the invention.

Once the social score widget creation process is completed in step 2706, it is published in step 2708 to the social commerce marketplace system, which finalizes its configuration and activates it for use. The social score widget is then embedded within a target host site in step 2710. In one embodiment, the social score widget is published to a third party social network site using the target site's Application Program Interface (API). In another embodiment, the social score widget is embedded by copying the widget's code, and optional JavaScript tags, to a target website's Hypertext Mark-up Language (HTML) code. In another embodiment, the social score widget is automatically embedded into a social network store web page. In yet another embodiment, the social score widget is implemented to enhance a at target's HTML code through Representational State Transfer (REST) API calls to invoke the widget. Skilled practitioners of the art will recognize that other embodiments are possible and that the foregoing is not intended to limit the spirit, scope or intent of the invention. A determination is then made in step 2712 whether to end social score widget creation operations. If not, then the process is continued, proceeding with step 2702. Otherwise, social score widget creation operations are ended in step 2714.

Figure 28:
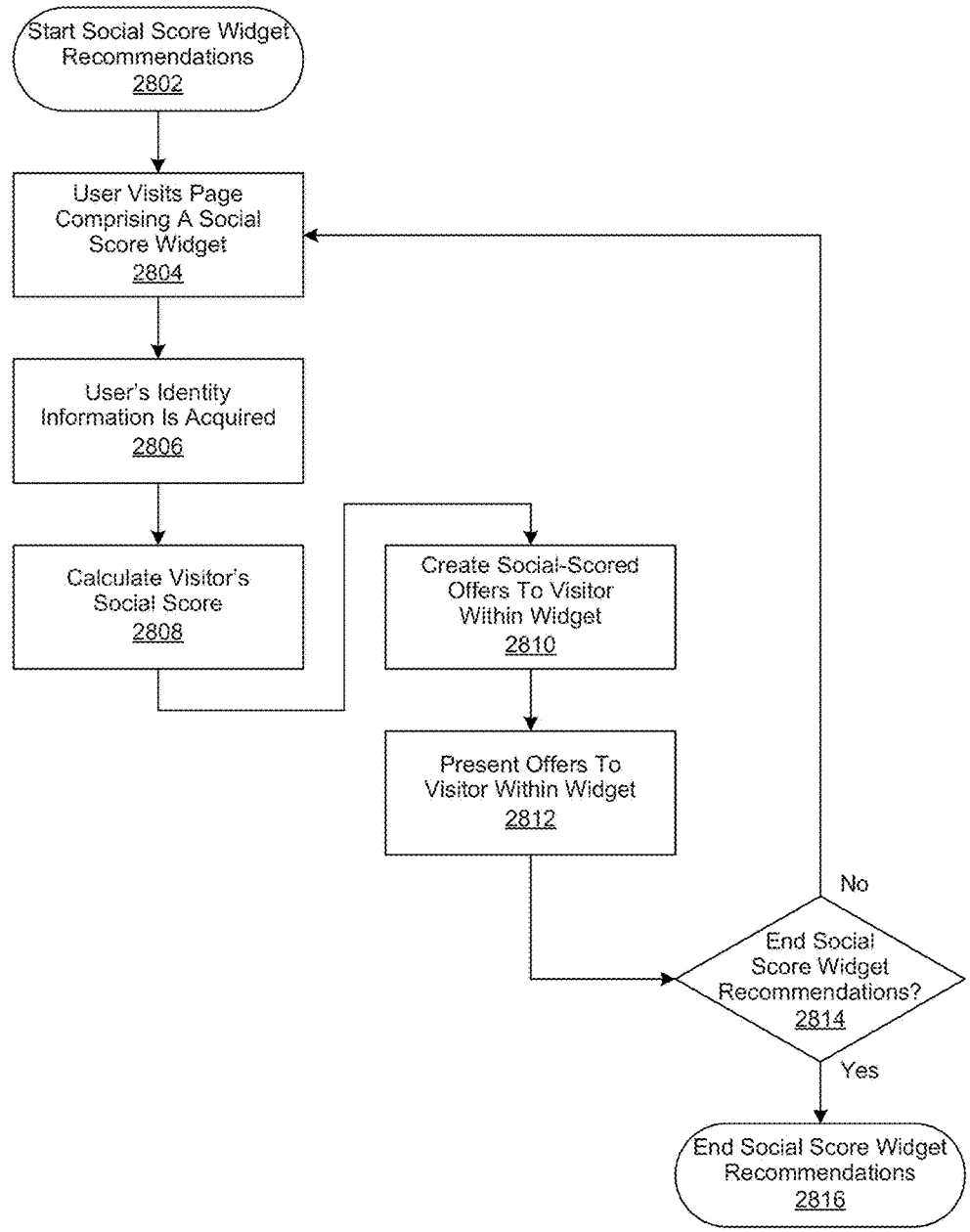
FIG. 28 is a generalized flow chart of the performance of social score widget recommendation operations.

FIG. 28 is a generalized flow chart of the performance of social score widget recommendation operations as implemented in accordance with an embodiment of the invention. In various embodiments, a social score recommendation widget is executed as a target web page loads that will dynamically present offers and discounts based on the user's social score. In this embodiment, social score widget recommendation operations are begun in step 2802, followed by a user visiting a web page in step 2804 within which a social score widget has been embedded. In one embodiments, the social score widget has been explicitly embedded within the web page as described in greater detail herein. In another embodiment, the UI for the social score widget is dynamically created and rendered by calling a REST API and manipulating a returned object of Extensible Mark-up Language (XML) code.

In step 2806, the social score recommendation widget retrieves the visitor's social identity, social graph information, and social site history from the social commerce marketplace system. As used herein, social graph information refers to information that describes the online relationship between a plurality of users. In one embodiment, the social commerce marketplace system authenticates to multiple third party social networking sites to retrieve the users' social identity and history.

Then, in step 2808, the afore-mentioned social information associated with the visitor is analyzed and associated calculations are performed to generate a social score that represents the visitor's relative value to the organization. In one embodiment, the calculated social score is saved to the social commerce marketplace system so it can be reused by other modules when performing their associated operations. In another embodiment, as described in greater detail herein, the social commerce marketplace system uses information retrieved from various social network sites to calculate multiple social scores for the user. In various embodiments, different social scores may include:

- a Holistic Social Score, based on the analysis of visitor data from all third party social sites
- an Individual Social Score, based on the analysis of visitor data from a single target social site (e.g., Facebook®, Twitter®, Tumblr®, Google+®, etc.)
- a Third Party Social Score, provided by a third party social scoring service In various embodiments, the calculated social score is generated by using one or more social facets to create two types of social scores. As an example, a social score associated with an individual may be calculated according to analysis of the following attributes:

Influence
  # of followers on social networks
  # & frequency of re-tweets/mentions by others about the user's content
  Scores of followers/re-tweeters
  Sentiment score of comments/posts/mentions by others
  Sentiment score of the comments/posts by the user
Engagement
  # & frequency of posts by user
  # of likes by others about the user and the user's content
  # of mentions by others
  # of comments posted by others on the user's posts
  # average time others spend on the user pages
  Average frequency others visit or revisit the user's site/pages
Reach
  # of blogs
  # of followers on social networks
  # of visits to the user's social pages
  # of visitor to the user's blog sites
  # of backlinks
  blog site page rank To further the example, a social score associated with a product or its associated brand may likewise be calculated according to analysis of the following attributes:

Influence
  # of followers on social networks
  # & frequency tweets/mentions by others that contain the brand or product name
  Scores of followers/re-tweeters
  Sentiment score of comments/posts/mentions by others
Engagement
  # & frequency of posts by Brand/Product
  # of likes by others about the Brand/Product and its social site/page content
  # of mentions by others
  # of comments posted by others on the Brand/Products posts
  # average time others spend on the Brand/Product pages
  Average frequency others visit or revisit the Brand/Product's site/pages
Reach
  # of blogs
  # of followers on social networks
  # of visits to the Brand/Product's social pages
  # of visits for blog sites
  # of backlinks
  Blog site page rank Then, in step 2810, the social score recommendation widget executes the social scoring rules described in step 2806 to determine what type of widget will be displayed, the content (e.g., products, offers, deals, etc.) it will contain, and the order in which it will be displayed. Thereafter, the contents of the social score recommendation wizard are presented to the user in step 2812, followed by a determination in step 2814 whether to end social score recommendation widget recommendations. If not, then the process is continued, proceeding with step 2802. Otherwise, social score recommendation widget operations are ended in step 2816.

Figure 29:
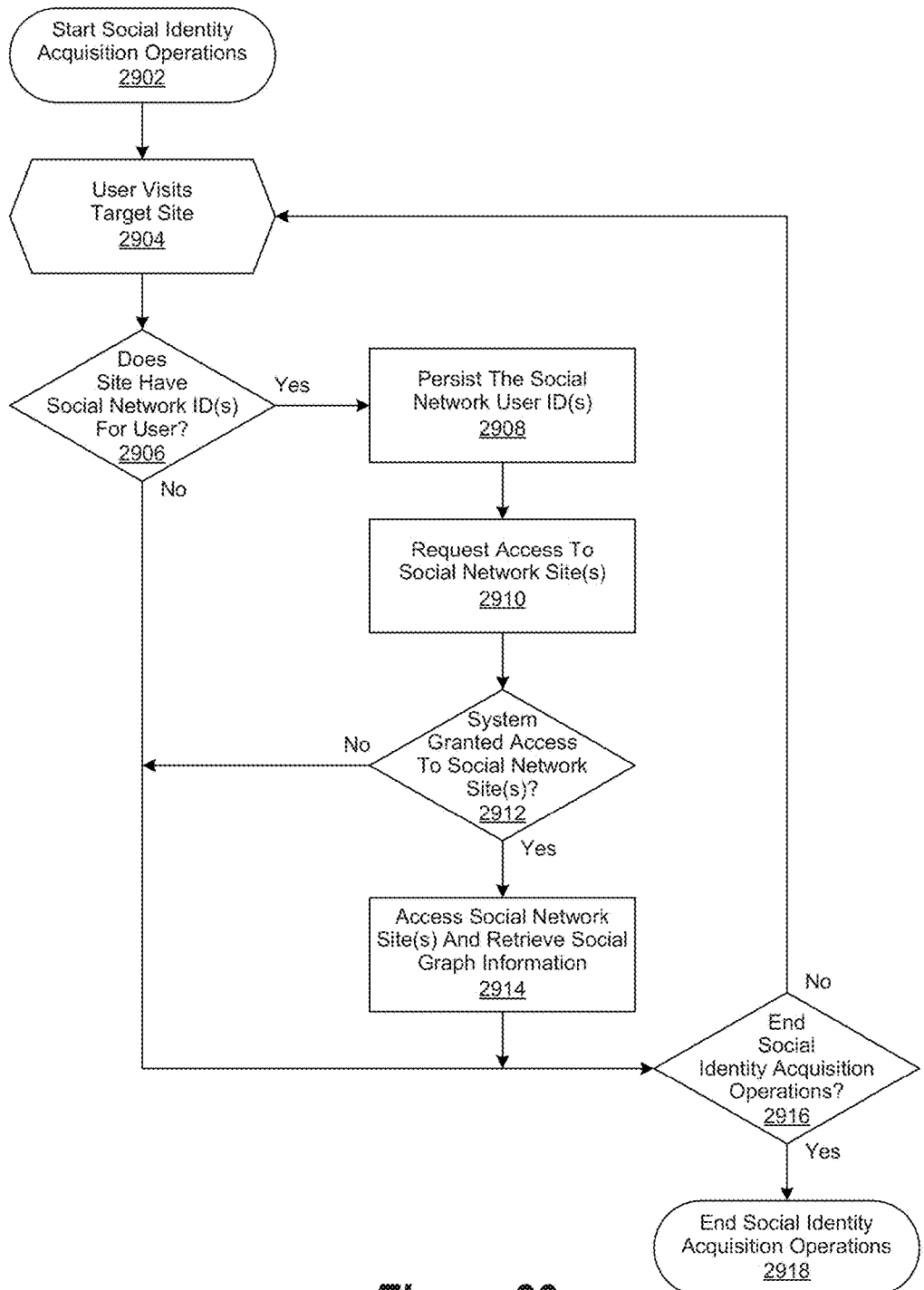
FIG. 29 is a generalized flow chart of the performance of social identity acquisition operations.

FIG. 29 is a generalized flow chart of the performance of social identity acquisition operations as implemented in accordance with an embodiment of the invention. In various embodiments, the social score recommendation widget described in the descriptive text of FIG. 29 attempts to retrieve the visitor's social identity, social graph information, and social site history from the social commerce marketplace system. If this information is not available from the system, or if it is incomplete, then the system authenticates to one or more third party social networking sites to retrieve this information. In this embodiment, beginning with step 2902, the social commerce marketplace system initiates operations associated with step 2906 of FIG. 29, followed by receiving a visitor at a target site such as a landing page.

A determination is then made in step 2906 whether the target site has one or more social network IDs for the visitor. If so, then the social network IDs are persisted in step 2908. In one embodiment, the visitor's clickstream data, session information, and collected cookie information is likewise persisted. This authentication and associated information is then used to request access to their corresponding social network sites in step 2910. In various embodiments, the social score recommendation widget uses JavaScript code and REST APIs that have been implemented at each respective host site to present the visitor's social site authentication information, such as:

```
"id": "220439",
"name": "Bret Taylor",
"first_name": "Bret",
"last_name": "Taylor",
"link": "http://www.facebook.com/btaylor",
"username": "btaylor",
"gender": "male",
"locale": "en_US"
```

In one embodiment, authentication information for access to a target social networking site is not available and the user is prompted by the social commerce marketplace system to provide the required information. In this embodiment, the system dynamically builds a user interface based on the authentication information required to access the target social network site. The user is then asked to login and provide required authentication information to the target social network site. The user is then asked to allow the social commerce marketplace system to thereafter access the required authentication information from the user's account. In another embodiment, the user elects to skip this process. In this embodiment, the social commerce marketplace system prompts the user to authorize it to access specific data. The user then has the option to either authorize limited access for each social network or to skip the process altogether.

A determination is then made in step 2912 whether the social commerce marketplace system is granted access to the one or more social network sites as a result of the provision of the aforementioned authentication information. If so, then each of the social network sites is accessed in step 2914 to retrieve the visitor's associated social graph and history.

Those of skill in the art will realize that each social network site will likely have a different set of information available for retrieval, such as:
  age of account
  relationships to other users, accounts and objects in the social network
  posts (text, links & images) they have made to their account
  posts (text, links & images) they have made to other accounts
  posts (text, links & images) others have made within their account
  likes
  backlinks to their account, pages and posts
  events they like or are following
  groups they like, joined or are following
  tweets
  re-tweets
  mentions
  applications they have associations to
  photos
  videos
  check-ins
  notes
  searches within the social network (date/time & keywords)

Thereafter, or if it was determined in step 2906 that the target site does not have a social network ID for the user, or in step 2912 that the system is not granted access to any of the social network sites, then a determination is made in step 2916 whether to end social identity acquisition operations. If not, then the process is continued, proceeding with step 2904. Otherwise, social identity acquisition operations are ended in step 2918.

Figure 30A:
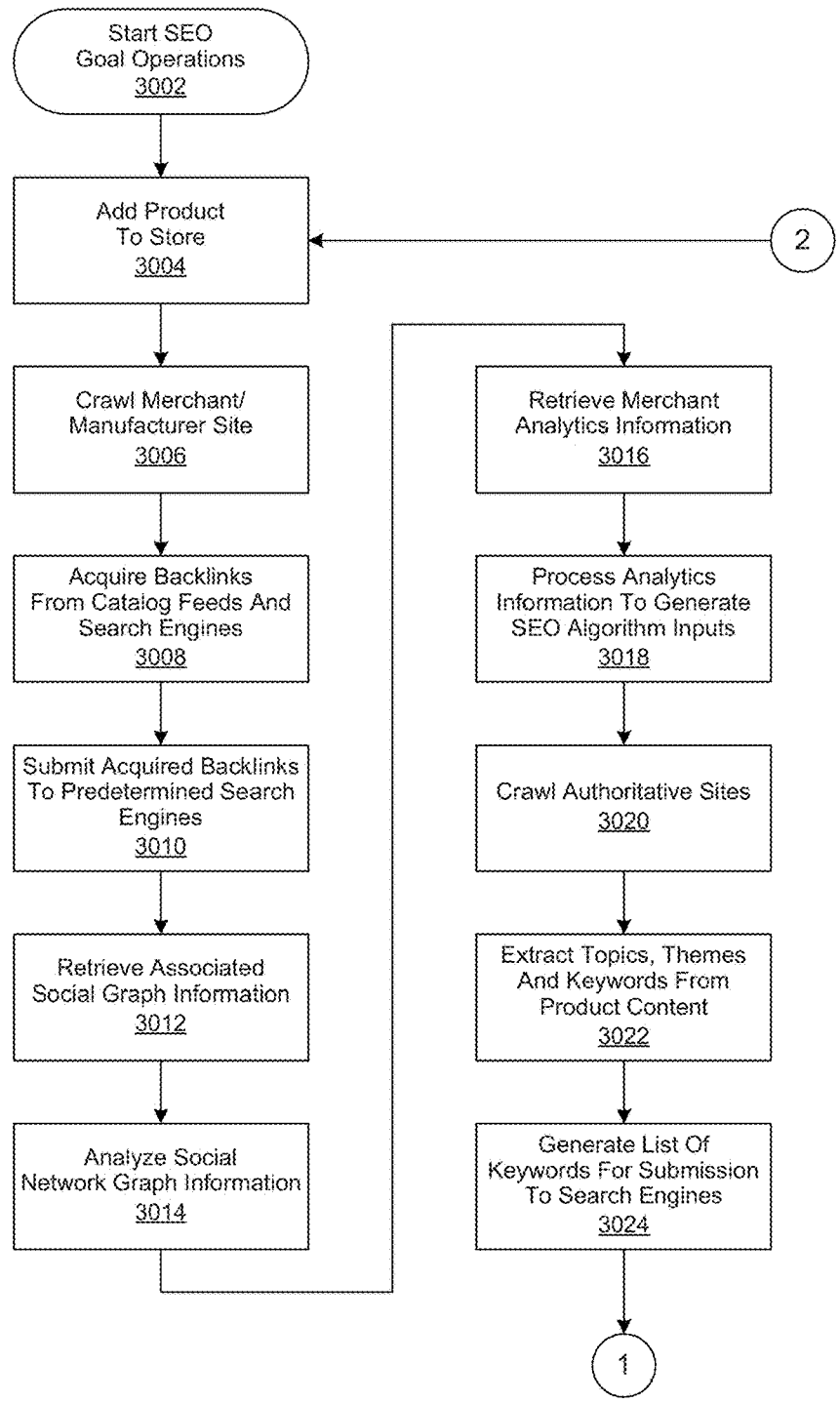
FIGS. 30a-b are a generalized flow chart of the performance of search engine optimization (SEO) goal attainment operations.
Figure 30B:
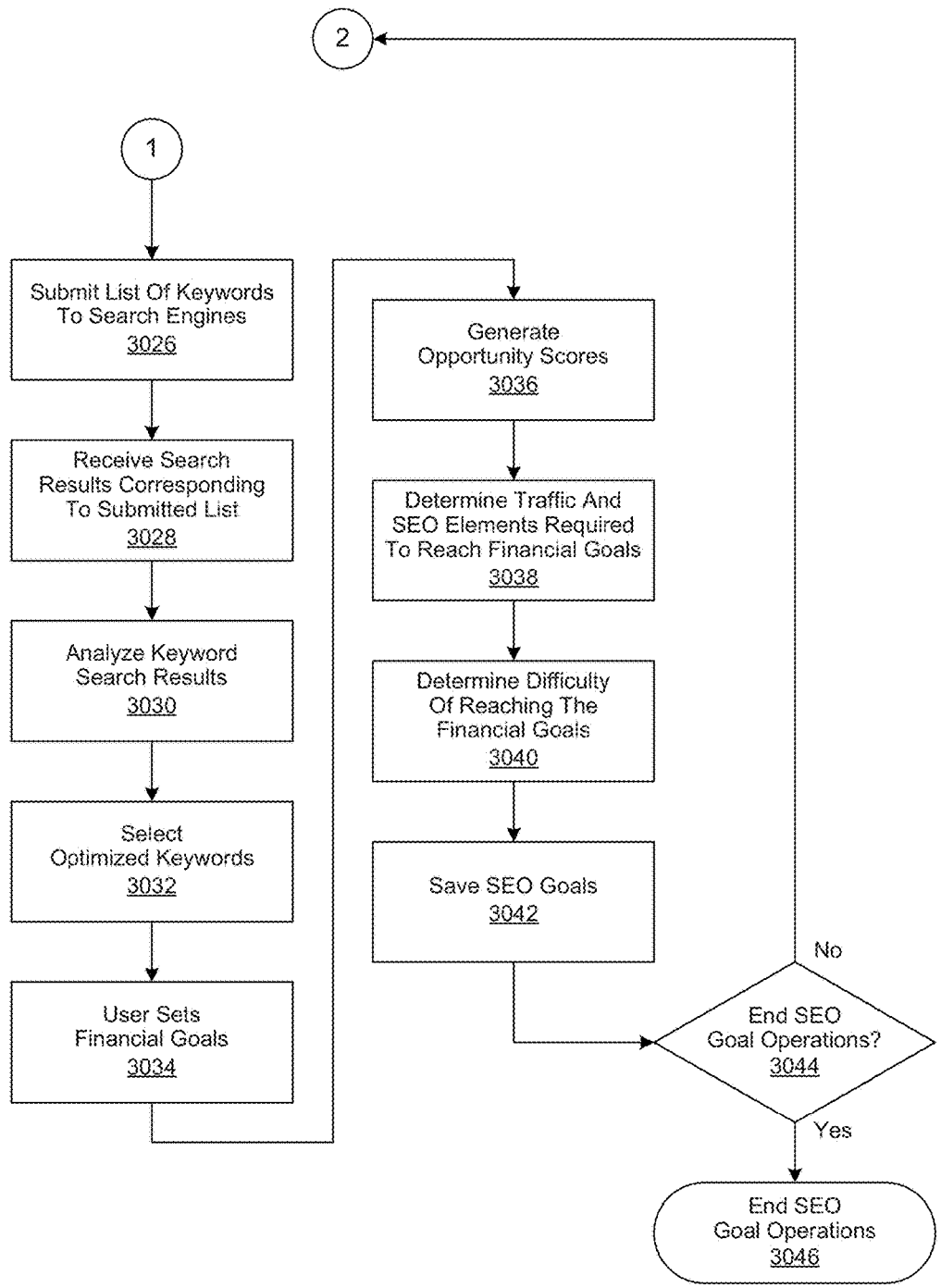

FIGS. 30*a-b* are a generalized flow chart of the performance of search engine optimization (SEO) goal attainment operations as implemented in accordance with an embodiment of the invention. In various embodiments, a SEO algorithm is implemented in a syndicated commerce environment to predict the amount of financial compensation an individual or social commerce marketplace entity can receive from the sale of a predetermined product. In certain embodiments, the SEO algorithm is further implemented to optimize their web pages to increase site traffic, and as a result, the likelihood of reaching their financial goals.

In these and other embodiments, the SEO algorithm determines keyword options for a predetermined product based upon the product's description, its web page content, and other related information. The social commerce marketplace system then uses the SEO algorithm to determine the product's associated search traffic and rank-per-keyword from various search engines. This information, in addition to sales conversion rate information, is used to estimate the likelihood of monetization for a single keyword or a group of keywords. In certain embodiments, the SEO algorithm refines its estimates by tracking and analyzing historical purchase records for a given path and visitor segment. The system then automatically modifies the website pages with optimal combinations of keywords. Once optimized, various search engines are automatically notified of the changes to the web pages to improve organic search rankings.

In various embodiments, the SEO algorithm determines the competitiveness for a predetermined keyword and then assigns it a "level of difficulty" for a user to succeed in organic search optimization. Likewise, the "level of difficulty" is used by the SEO algorithm to determine how much money the user could potentially earn selling products that correspond to a given level of difficulty. In these and other embodiments, the "level of difficulty" is further refined according to analysis of the user's generated content and any additional data the social commerce marketplace system can capture from a visitor to the user's website. The SEO algorithm then determines the likelihood of a relationship or visitor associated with the user's social graph to purchase a predetermined product. Once the likelihood is determined, the social commerce marketplace system creates tasks for the user, monitors the progress of their completion, and makes ongoing recommendations to assist the user in reaching their revenue goals. In one embodiment, a crawler sub-module is implemented with the SEO algorithm to crawl a predetermined domain or website to analyze the market opportunity or financial value of the site. In this embodiment, the output of the analysis is a list of markets to target, and a list of recommendations and tasks to complete, to capitalize on each opportunity.

Referring now to FIG. 30, SEO goal operations are begun in step 3002 to predict the estimated revenue of a predetermined product, followed by addition of the predetermined product from a store's catalog to a social commerce storefront in step 3004. In various embodiments, the social commerce marketplace system automatically creates an associated product details page within the store when the product is added. In these and other embodiments, the product details page comprises merchant, manufacturer, or store owner-defined content such as a product title and descriptions. In various embodiments, the store owner can optionally create additional product content and metadata, such as:
  Title
  Short Description
  Long Description Friendly (vanity) URLs
Keywords
Specifications
Ratings
Reviews
Product Blog
Posts to third party social sites about the product Then, in step 3006, manufacturer links, such as Uniform Resource Locators (URLs), provided in the catalog feeds described in greater detail herein are used by the social commerce marketplace system as primary sources to crawl for product content. In one embodiment, the social commerce marketplace system submits a search request to a search engine to obtain links to crawl if the manufacturer links are not included in the feed. In various embodiments, the crawled content is indexed and used by other process steps described in greater detail herein to identify keywords and high value content.

The social commerce marketplace system then acquires the domains included in the merchant's catalog feed(s) as well as the highest ranked pages within predetermined search engines in step 3008. Then, in step 3010, the acquired domains and website URLs (i.e., backlinks) are submitted to predetermined search engines, as well as other data service providers, to retrieve the number, quality, trust, and other information about the inbound links to each domain. In various embodiments, this information is stored within the social commerce marketplace system and is subsequently used to determine the relative competitiveness of other vendors in the market as well as sources to crawl for recommended content and keywords for use in various SEO operations.

Then, in step 3012, social graph information and social site history from predetermined social network sites for the store's social accounts (e.g., store entity, store owner users, etc.) is retrieved. The retrieved information is then analyzed by the SEO algorithm in step 3014 to identify high-value keywords, content, backlinks and influencers for the product within the social graph(s). In various embodiments, the retrieved product information may be contained in social objects such as "wall posts," comments, "tweets," profiles, stores, events, etc. In various embodiments, the retrieved content is semantically analyzed to determine the sentiment (i.e., the "tone" of the content) for each extracted element. In certain of these various embodiments, the social commerce marketplace system scores the retrieved keywords and content according to the source's authoritative value and the content creator's social influence (e.g., their digital worth score).

As used herein, authoritative value broadly refers to the contextual relationship of a keyword to the overall theme of its associated content source. As an example, the search term "Lincoln automobile" may return the phrase "the Lincoln automobile is named after President Abraham Lincoln," where the content source is a first web page primarily oriented to the history of President Lincoln. In this example, authoritative value is low. As another example, the same search term may return the same phrase, but from a second web page primarily oriented to the history of the Lincoln automobile. In this example, the authoritative value is high.

As likewise used herein, social influence broadly refers to the level of influence a user of a social networking environment is capable of exerting upon a predetermined market segment. In various embodiments, a digital worth score is derived from a user's social influence. As used herein, a digital worth score refers to a numeric value, or set of values, associated with a predetermined user's social influence. As an example, a user may write a blog extolling the virtues of a product, with the result that a high percentage of the readers of the blog purchase the product. In this example, the writer of the blog would have a high digital worth score. In these and other embodiments, the financial value of the associated purchase(s) of the referenced product is used to determine the digital worth score.

In various embodiments, the SEO algorithm uses additional information associated with the content authors and influencers that is stored within the social commerce marketplace system, including their:
name
email addresses
IP Address
geographic location
preferences The social commerce marketplace system then retrieves available historical clickstream web analytics information in step 3016. In various embodiments, the analytics information is retrieved from corporate web sites associated with the store owner that contain product or product related information. The analytics information is then processed to generate inputs for the SEO algorithm in step 3018. In various embodiments, the retrieved analytics information includes:
Web Analytics Data
   Visitor personal information (e.g., name, demographics, prior purchase history, etc.)
   Referring keywords (e.g., associated with source, visitor, geo-location, temporal information, etc.)
   Conversion Data
Listing Platform Data
   Content
   Source (e.g., person or entity)
   Sentiment
   Media (e.g., web, television, radio, etc.)
   Location One or more authoritative sites are then crawled in step 3020 to determine keywords and content related to the product, which may include:
titles
product name
descriptions
ratings
reviews
pricing
discounts
offers
location(s)

As used herein, an authoritative site broadly refers to the contextual relationship of individual content elements within a content source.

To extend the previously-used example, the phrase "the Lincoln automobile is named after President Abraham Lincoln," in a first web page primarily oriented to the history of President Lincoln may not be considered to be an authoritative site on the Lincoln automobile. Conversely, the same phrase in a second web page primarily oriented to the history of the Lincoln automobile may be considered to be an authoritative site on the Lincoln automobile.

Once the product has been added to the on-line store, the social commerce marketplace system semantically extracts topics, themes and keywords from the product's content and associated metadata in step 3022. In various embodiments, such content and associated metadata comprises:
merchant or manufacturer-defined content (e.g., titles, descriptions, promotion, pricing, etc.)

store owner-defined content
content defined by other store owners
visitor-generated content
third party content and data sources (e.g., backlinks)

In various embodiments, additional third party data related to the product is extracted and stored within the social commerce marketplace system, including:
sales information, such as:
number of units manufactured and sold
average sales price
sales location
ratings and reviews
demographics related to owners of the product A list of keywords, themes and topics from the previous process steps, along with any additional keywords that were extracted for the same catalog product when it was last added or analyzed for other stores is then generated in step 302424. The resulting list is then submitted to various search engines as well as other data service providers to retrieve additional information in step 3026. Search results corresponding to each element of the submitted list is then received in step 3028. In various embodiments, the search results include:
keyword ideas, referring to additional sets of keywords that are related to the submitted keyword
local search traffic, referring to the number of searches submitted to the search engine for a predetermined geographic region
global search traffic, referring to the number of searches submitted to the search engine by all Internet users
mobile search traffic, referring to the number of searches submitted to the search engine via mobile devices
frequency, referring to the frequency that the keyword is searched
competition, referring to the relative frequency of bids combined with the value and associated ad price of each keyword within various advertising networks
traffic estimation, referring to the estimated traffic, the estimated number of paid visits, the estimated paid search rank, and the estimated paid search cost per day
category, referring to various businesses, industries, genera's, etc. that the search engine has determined that the keyword is most closely associated with
domains and websites, referring to a list of the highest-ranked domain or website for a predetermined keyword
demographics, referring to the demographics corresponding to a set of users that used the keyword
purchase|conversion information, referring to a list of products and prices that a user purchased after searching with a keyword combined with the corresponding site where the purchase was made
ad competition, referring to the relative market competitiveness of the keyword for a paid search within a commercial search engine service or within an advertising network
vendors|competitive pricing information, referring to a list of top-performing vendors selling a product associated with a predetermined product, combined with its current price The keyword search results received in step 3028 are then analyzed by the SEO algorithm in step 3030 to generate a keyword score corresponding to each keyword's estimated effect on inbound traffic, conversion rate, competitiveness, competitive pricing, and other factors. Then, in step 3032, the SEO algorithm uses a variety of SEO formulas and optimization best practices to process the keyword scores generated in step 3030 to generate a ranked list of keywords predicted to result in the highest amount of traffic and conversion rates.

In step 3034, the user (e.g., an online store owner) uses various financial goal information to set financial goals for the product before it is published to the online store. In various embodiments, the financial goal information may include:
commissions, referring to the amount of monthly commission revenue the store owner would like to generate for the product
ad revenue, referring to the amount of monthly ad revenue the store owner would like to generate for the product's associated product detail page
quantity, referring to the number of product units the store owner would like to sell on a monthly basis A series of market opportunity (i.e., market penetration) scores are then generated in step 3036 from the data collected and analyzed in the previous process steps to identify areas that the product may perform well in (e.g., low competition, high demand, etc.). In various opportunities, these areas may include
local market, referring to one or more local geographic areas
social network, referring to one or more social networks or populations (i.e., segments) of users
geo-location/region, referring to a state, country, or other geographic region
search marketing, referring to a paid search market for a predetermined commercial search engine
market segment, referring to a group of individuals with similar characteristics The social commerce marketplace system then uses the preceding goals, selected list of keywords, and opportunity scores in step 3038 to determine the estimated traffic and related SEO elements (e.g., the number of backlinks links, etc.) required to reach the financial goals of the online store. Then, in step 3040, the social commerce marketplace system calculates the estimated difficulty of achieving the financial goals, which provides the store owner the information required to make a decision if they should include the product within their online store. In one embodiment, the financial goal information provided in step 3034 is presented to the online store owner to show the potential financial opportunity by market segment. It will be appreciated that such information would assist the online store owner in focusing and aligning their marketing efforts to those market segments that represent the greatest financial opportunities.

The product is then saved to the online store and its corresponding product details page is published to the online store's website in step 3042, followed by a determination being made in step 3044 whether to continue SEO goal attainment operations. If so, then the process is continued, proceeding with step 3004. Otherwise, SEO goal attainment operations are ended in step 3044.

Figure 31:
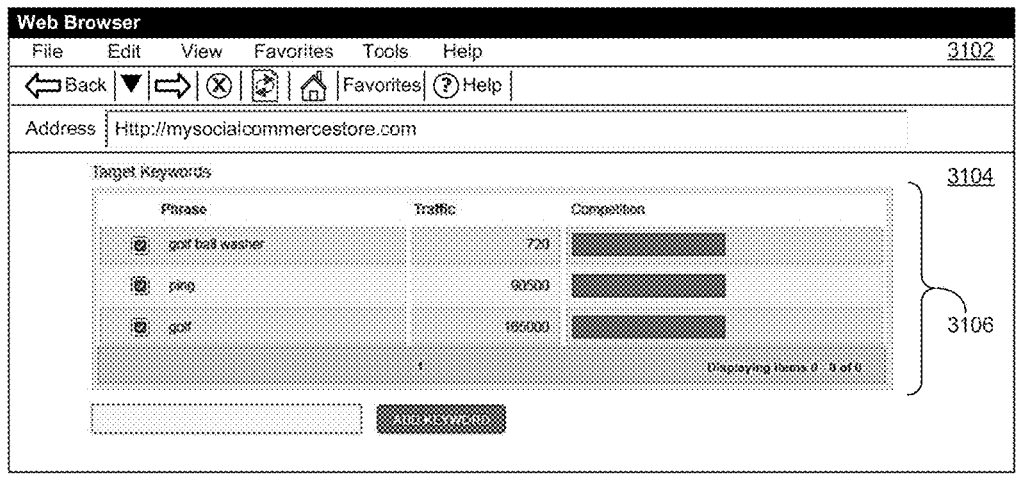
FIG. 31 shows a ranked list of keywords within a user interface window that are predicted to result in the highest amount of traffic and corresponding conversion rates.

FIG. 31 shows a ranked list of keywords within a user interface window that are predicted to result in the highest amount of traffic and corresponding conversion rates. In this embodiment, a user interface (UI) 3102, such as a web browser, is implemented to comprise a UI window 3104, which in turn comprises a plurality of search phrases 3106 that are ranked according to their predicted ability to result in the highest amount of traffic and corresponding conversions rates.

Figure 32:
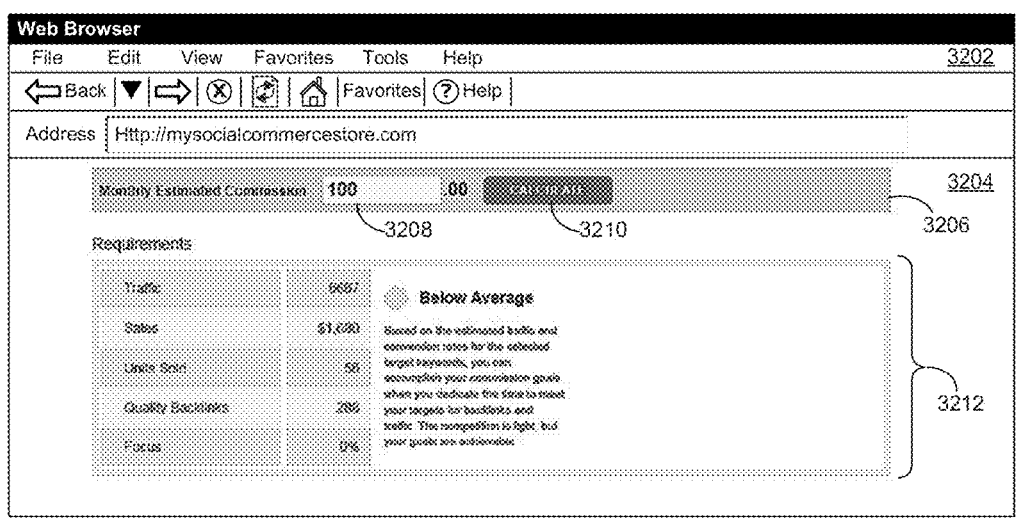
FIG. 32 shows estimated traffic and SEO elements within a user interface window that are anticipated to affect an online store's ability to reach its financial goals.

FIG. 32 shows estimated traffic and SEO elements within a user interface window that are anticipated to affect an online store's ability to reach its financial goals. In this embodiment, a user interface (UI) 3202, such as a web browser, is implemented to comprise a UI window 3204, which in turn comprises a financial goal window 3206 and a requirements window 3212 comprising a plurality of estimated traffic and SEO elements are anticipated to affect an online store's ability to reach its financial goals.

In one embodiment, the financial goal window 3206 comprises a financial goal amount data entry field 3208 and a 'Calculate' command button 3210. In this embodiment, a user enters a financial goal amount in the financial goal amount data entry field 3208 and then selects the 'Calculate' command button 3210. The estimated traffic and SEO elements required to reach the financial goal are calculated and then displayed in the requirements window 3212.

Figure 33:
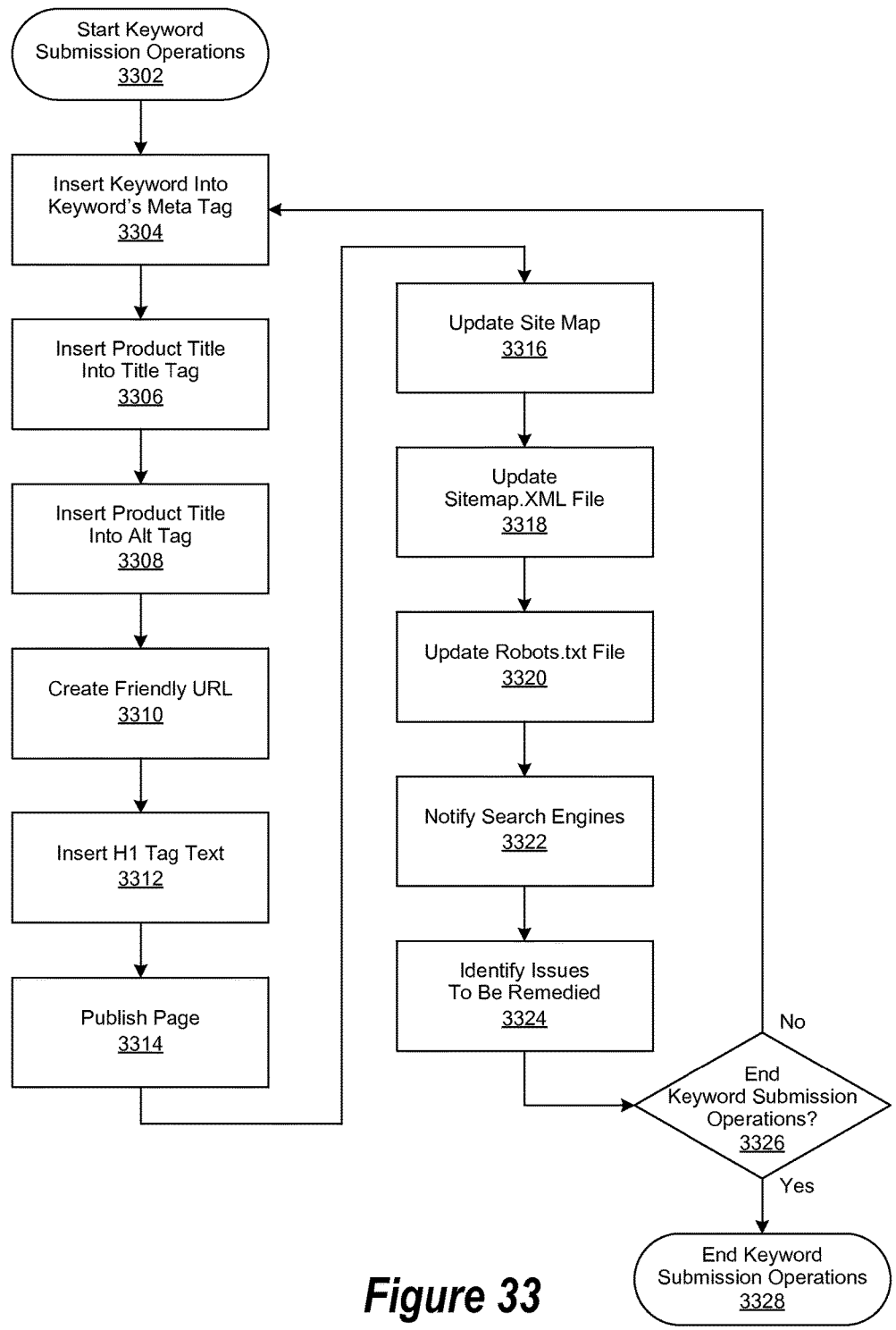
FIG. 33 is a generalized flow chart of the performance of keyword submission optimization operations.

FIG. 33 is a generalized flow chart of the performance of keyword submission optimization operations implemented in accordance with an embodiment of the invention. Those of skill in the art will recognize that the effectiveness of a keyword used within a site, such as an online storefront, is dependent upon whether it is used in the context of an authoritative content source, such as a web page containing product details. In various embodiments, the SEO algorithm is implemented to suggest keywords and predict their respective monetary SEO value when used to promote the sale of a product. In these and other embodiments, the SEO algorithm is likewise implemented to automate HTML code updates with associated keywords to make the target page authoritative. It will be appreciated that such automation can provide novice users with SEO optimizations that are typically only available from an SEO expert.

In this embodiment, keyword submission optimization operations are begun in step 3302 to automatically insert the keywords generated in step 3024 of the process described in the descriptive text of FIG. 30. The social commerce marketplace system then automatically inserts the aforementioned keywords into the target webpage's keywords meta tag within its associated HTML code in step 3304. In one embodiment, a user (e.g., the online store owner) can manually update the keywords within the keywords meta tag at any time through a user interface (UI).

Then, in step 3306, the social commerce marketplace system automatically inserts the product title provided by the merchant or a manufacturer into the webpage's HTML title tag. In one embodiment, a user (e.g. the online store owner) can manually update the title tag at any time through a UI. The social commerce marketplace system then automatically inserts the product title provided by the merchant or a manufacturer into the alt image tag for the product image's URL in step 3308. In one embodiment, a user (e.g. the online store owner) can manually update the alt image tag at any time through a UI.

A friendly URL that contains text elements from the product's title is then automatically created by the social commerce marketplace system in step 3310. As used herein, a friendly URL refers to a URL pointing to a location that references a topic or subject that is indicated in the name of the URL. As an example, the URL may contain the name of a product that is promoted within the URL's associated page or site. Then, in step 3312, the social commerce marketplace system automatically inserts the product title from the merchant/manufacture into the webpage's HTML H1 heading tag. In various embodiments, a user (e.g., the online store owner) can manually update any of the H1 through H6 HTML heading tags at any time through a UI. In various embodiments, the social commerce marketplace system also automatically updates other HTML elements expected by commercial search engines such as:

meta content language
meta content type
meta language
meta author
meta copyright
robots meta tag The target web page is then published to a production instance of the online store in step 3314. Once the target web page is published, the social commerce marketplace system automatically creates an HTML site map for the online store in step 1916 and keeps it updated thereafter. In various embodiments, the web page's index within the site map is updated whenever a material change (e.g., in its page name, title, URL, etc.) occurs.

Skilled practitioners of the art will be aware that it is common for search engine crawlers to use sitemap.xml files to help them index a target website. To assist such search engine crawlers the sitemap.xml file for the online store is automatically updated by the social commerce marketplace system in step 3318 whenever there is a material change (e.g., new page, URL name change, etc.). Those of skill in the art will likewise be aware that it is also common for search engine crawlers use robots.txt files to help them understand which areas of the site to index. To assist such search engine crawlers the robots.txt file for the online store is automatically updated by the social commerce marketplace system in step 3320 whenever there is a material change (e.g., new page, URL name change, etc.).

Then, in step 3322, the social commerce marketplace system automatically submits the page to various search engines to notify them if there was a change to the online store, such as in the page's HTML elements, its URL, or if the page was newly created or deleted. The social commerce marketplace system then automatically identifies potential issues and creates tasks for the user to remedy them in step 3324. In various embodiments, such issues may include:

not enough keywords
too many keywords
recommended product description text
add keywords to URLs A determination is then made is step 3326 whether to end keyword submission optimization operations. If not, then the process is continued, proceeding with step 3304. Otherwise, keyword submission optimization operations are ended in step 3328.

Figure 34:
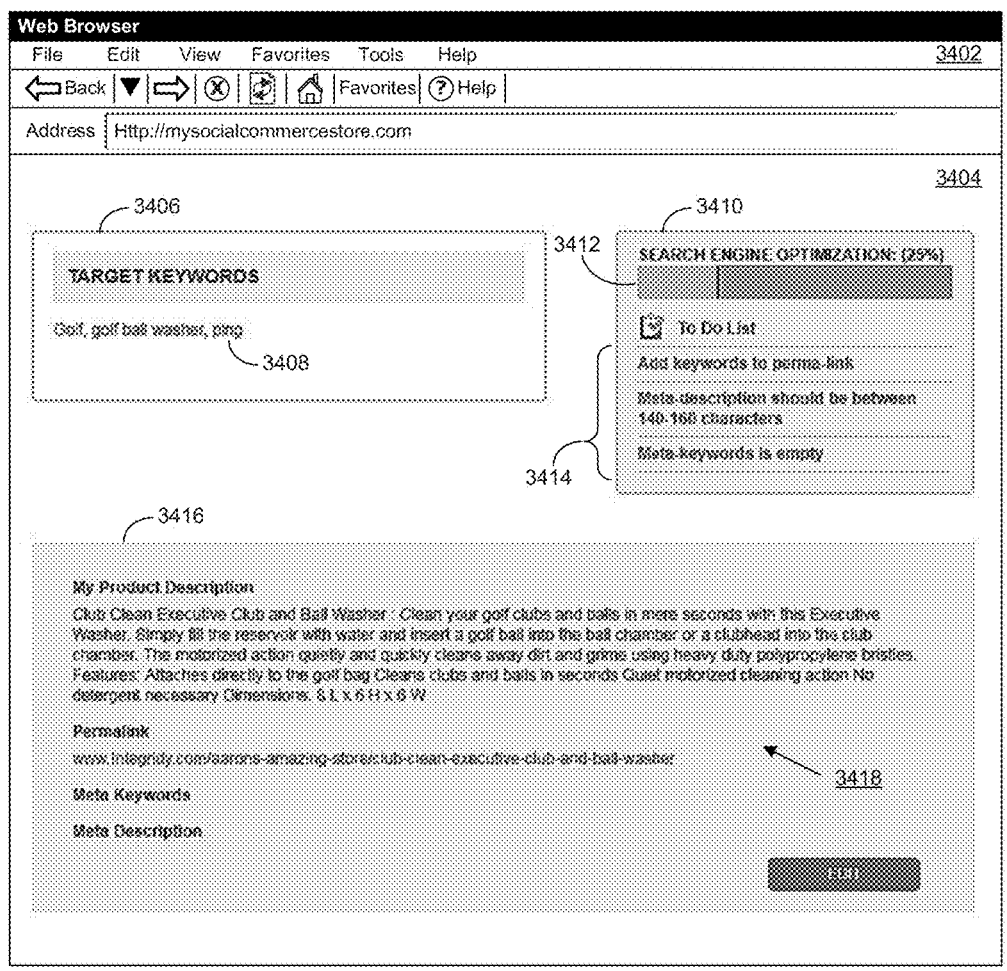
FIG. 34 shows information that is proactively submitted to a commercial search engine and its associated SEO effect within a user interface window.

FIG. 34 shows information that is proactively submitted to a commercial search engine and its associated SEO effect within a user interface window. In this embodiment, a user interface (UI) 3402, such as a web browser, is implemented to comprise a UI window 3404, which in turn comprises a target keywords sub-window 3406, recommendations window 3410, and a product description window 3416. As shown in FIG. 34, the target keywords sub-window 3406 comprises a plurality of target keywords 3408 and the product description window 3416 comprises a plurality of product description data 3418. In various embodiments, the target keywords 3408 and the plurality of product description data 3418 is processed to generate an SEO optimization prediction 3412 and a list of tasks 3414 to increase the likelihood of an online storefront to achieve their financial goals.

Figure 35A:
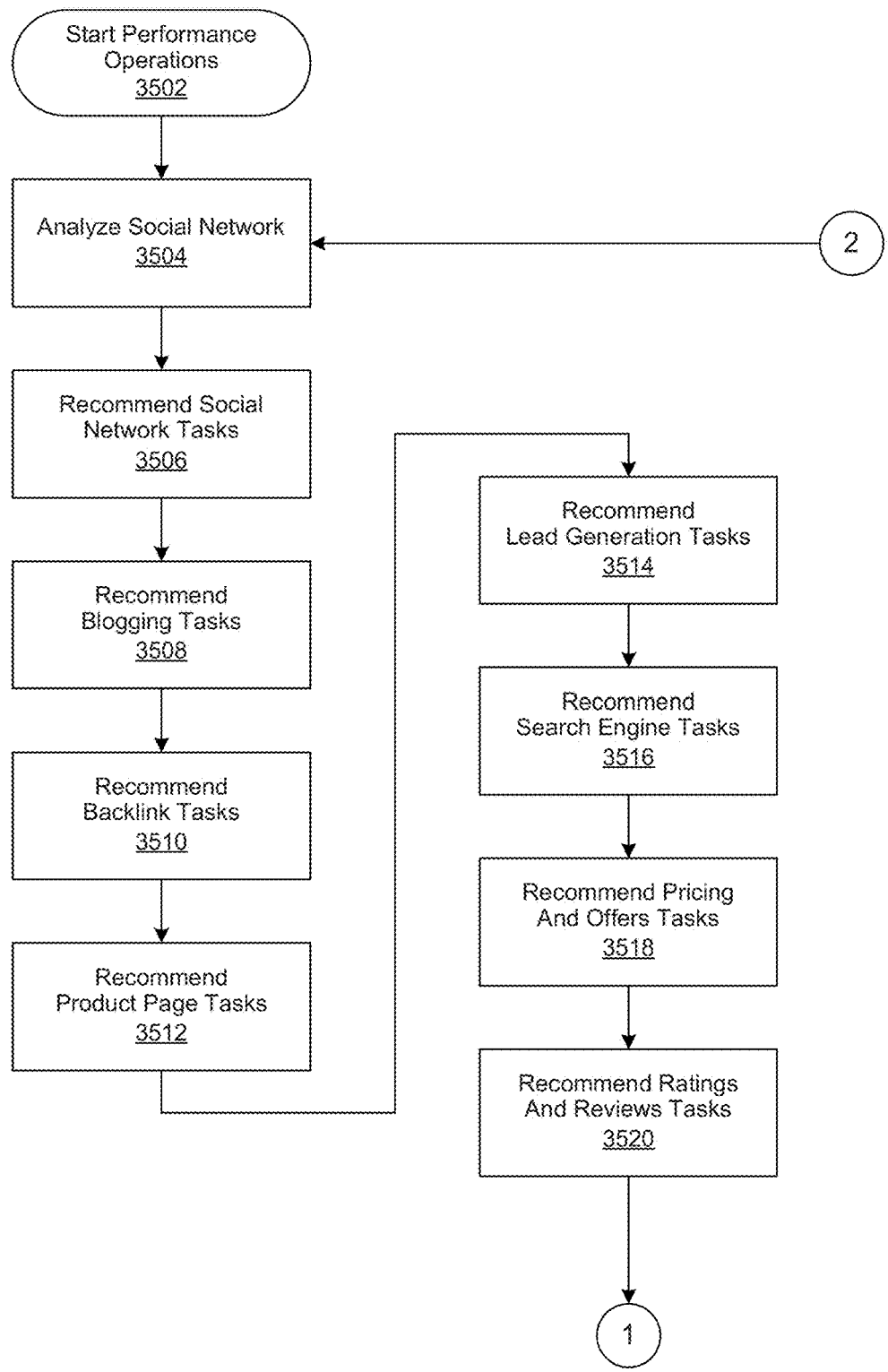
FIGS. 35a-b are a generalized flow chart of the performance of product and store performance optimization operations.
Figure 35B:
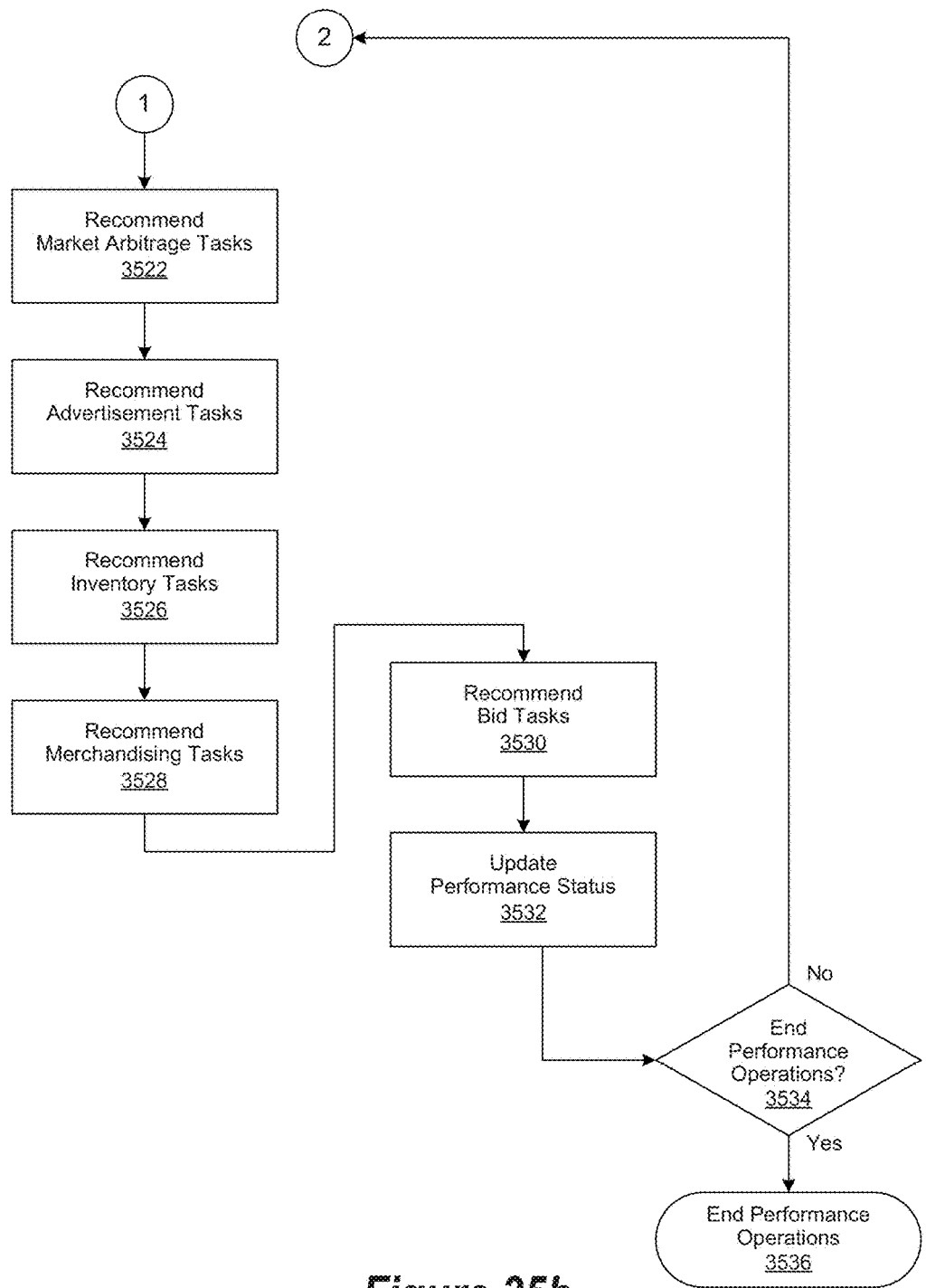

FIGS. 35*a-b* are a generalized flow chart of the performance of product and store performance optimization operations implemented in accordance with an embodiment of the invention. Skilled practitioners of the art will recognize that two online stores promoting the same product, and using the same content and underlying SEO algorithm, can anticipate receiving approximately the same traffic and recognizing the same sales volume for the product. As a result, each online store will only recognize approximately half of the available revenue generated by the product.

In various embodiments, an SEO algorithm is implemented to mitigate the potential deterioration of the earning value of a product promoted by similar online stores by:
- generating recommendations for changes to online store of product content, including the generation of content ideas for a user
- generating recommendations regarding where their marketing messages should be syndicated, including automated processed to efficiently perform the syndication
- analyzing the online store and store users' social network to determine its value and then making recommendations to capitalize on the network's potential
- generating recommendations and associated tasks to capitalize on market opportunities In these and other embodiments, the social commerce marketplace system evaluates the online store's SEO status, individual product detail page SEO status, and other factors to generate tasks for a user (e.g., the store owner) to complete to improve the likelihood of achieving their revenue goals In this embodiment, product and store performance optimization operations are begun in step 3502. Then, in step 3504, the social commerce marketplace system retrieves social graph information associated with a user (e.g., an online store owner), which is then used to determine their relationships, influence, reach within their network, and the corresponding influence and reach of each of those relationships for the online store and each store user. Based upon each store owner's digital worth and social graph, the social commerce marketplace system then generates recommended tasks in step 2106 to improve the likelihood of the online store reaching its financial goals. In various embodiments, these tasks include:
- comment and posting tasks, including a list of content sources within each social network that should have a comment or response posted by the user
- syndication tasks, including a list of people and the creation of backlinks to the online store
- friend request tasks, including a list of users within each social network the user should build a relationship with due to the user's influence and digital worth score
- store creation, including recommendations on the type of online store to create within each social network and any maintenance the user should complete to keep the store interesting and current
- ads, including recommendations on the type of ads to place within a specific social network Then, in step 3508 the social commerce marketplace system recommends social networking tasks for the user (e.g., the online store owner), including the creation of new types of blog posts and changes to make to existing blog posts. In one embodiment, the social commerce marketplace system identifies other online store blogs within a social network site that the user should consider building backlinks with to mutually benefit each party. In another embodiment, the social commerce marketplace systems recommends specific blog sites that have the highest market opportunity to attract powerful influencers, who in turn will create backlinks to the on line store. In this and other embodiments, the backlinks are created directly through page links, or indirectly through re-tweets, wall posts, etc. to drive organic traffic to the online store. In yet another embodiment, the social commerce marketplace system recommends the frequency of updates, content to post, and the types of offers to make within the blogs.

In step 3510, the social commerce marketplace system identifies third party influencers and creates recommended tasks that provide both ideas and instructions to obtain backlinks from each target. In one embodiment, in addition to existing targets based on their individual value, the social commerce marketplace system also recommends targets based upon the aggregate long-term value of the market opportunity associated with the target. In this embodiment, a determination is made regarding how valuable the target's social graph and influence are within a market segment and the likelihood that they will generate additional relationships that the online store can capitalize upon in the future.

The social commerce marketplace system then automatically generates recommended tasks in step 3512 to make changes to product detail pages, widgets, store blogs, or the online store's home page to improve the online store's SEO performance and subsequent traffic. In various embodiments, these recommendations are based upon visitor activity within a social network environment, their associated purchase activity, online store content changes, and other information. Then, in step 3514, the social commerce marketplace system generates recommend lead generation tasks, including:
- list of contacts to target
- type of communication to use (e.g., tweets, email, posts, etc.)
- type and structure of offers to make (e.g., packaging, bundling, pricing, etc.)
- time and date to send communications
- frequency of re-marketing activities
- recommended campaigns, including outlines of markets to target, the type of campaign to run, and the duration of the campaign.

The social commerce marketplace system then generates recommended search engine tasks in step 3516. In one embodiment, the social commerce marketplace system analyzes the competition and then recommends search engine keyword bidding activities for each identified marketing opportunity. In another embodiment, a recommendation is generated to determine marketing spend allocation to optimize various Search Engine Marketing (SEM) programs. Then, in step 3518, the social commerce marketplace system generates recommended pricing and offers that should be created and presented to each market segment or individual visitor. In various embodiments, the social commerce marketplace system analyzes competitive factors for each market opportunity segment and recommends optimized pricing and discount structures to optimize conversion rates, revenue and margins for each segment.

In step 3520, the social commerce marketplace system analyzes competitive factors (e.g., lower competition, more demand, etc.) for each market opportunity segment and then recommends specific ratings and reviews to associate with each product to optimize conversation and revenue uplift. Then, in step 3522, the social commerce marketplace system identifies markets and market segments that have arbitrage opportunity, which are then used to generate a list of recommended market tasks that capitalize on the arbitrage opportunities. Examples of market arbitrage opportunities include:
- high demand|low adoption rates
- high demand|low sales penetration rates
- high demand|lack of competitive vendor pricing
- shifts in buying patterns high demand|low inventory availability time-of-product in a market In one embodiment, the social commerce marketplace system performs an analysis to determine if there is an opportunity (e.g., based upon projected revenue or margin) to liquidate products to a specific market. In another embodiment, the social commerce marketplace system performs an analysis to recommend the type of marketing campaigns to execute within a specific market. In yet another embodiment, the social commerce marketplace system performs an analysis to recommend whether or not the online store should create a micro-site store for a specific market opportunity. In still another embodiment, the social commerce marketplace system performs an analysis to recommend 'local' physical locations to open a Flash 'pop-up' store based upon a local market opportunity.

Then, in step 3524, the social commerce marketplace system tracks ad spend and response rates across radio, television, and web media to generate recommendations for the optimal allocation of ad spend. In one embodiment, the social commerce marketplace system monitors ad spends for a specific product or product category to determine on-line marketing and merchandising tasks to capitalize on the ad influence to determine which products to sell, where (e.g., region, location, etc.) to sell them, and at what pricing point. In step 3526, the social commerce marketplace system then generated recommendations regarding what types of product to stock according to their anticipated sales rate such that various online stores can optimize their inventory levels to achieve higher net margins for a given market segment or opportunity.

The social commerce marketplace system then generates recommendations in step 3528 regarding which products to sell, which products to bundle, the price of a product, and the discount to apply, based upon the visitor's context or intent and the market opportunity analysis. In one embodiment, the social commerce marketplace system recommends which products to market to a specific market segment. In another embodiment, the social commerce marketplace system recommends which related products to offer or present to visitors based on the current product they are viewing and their market opportunity context. For example, a particular type of hair product may be presented, according to the user's local market trends and demand.

Then, in step 3530, the social commerce marketplace system analyzes procurement demand within predetermined markets and market segments to determine areas of opportunity. Based upon each opportunity, the social commerce marketplace system generates recommendations regarding which products to bid, pricing and packaging. After the recommended tasks have been completed, the social commerce marketplace system re-executes the SEO algorithm in step 3532 to update financial prediction as well as recommended store tasks. A determination is then made in step 3534 whether to end product and store performance optimization operations. If not, then the process is continued, proceeding with step 3504. Otherwise, product and store performance optimization operations are ended in step 3536.

Figure 36:
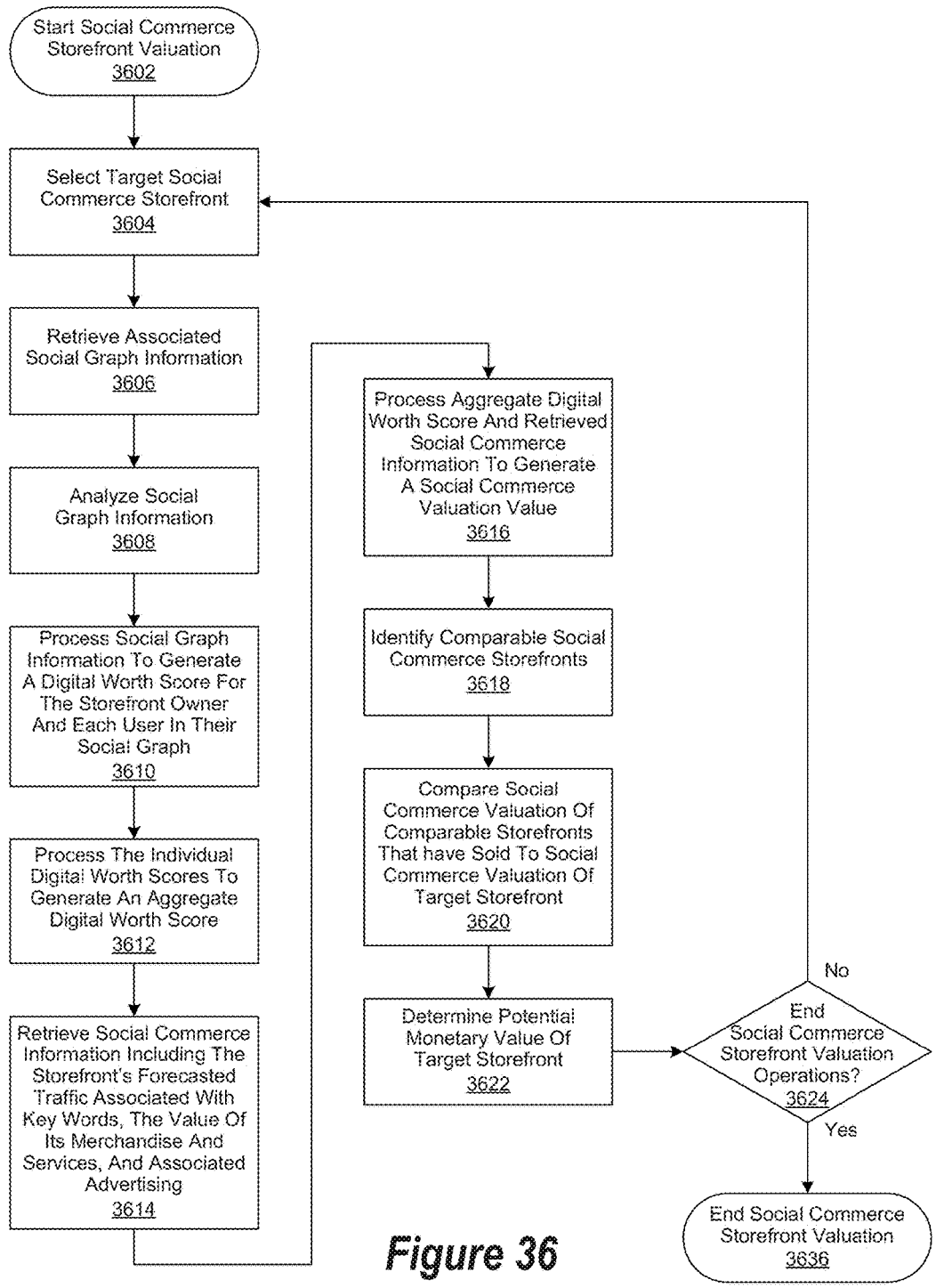
FIG. 36 is a generalized flowchart of the performance of social commerce storefront valuation operations.

FIG. 36 is a generalized flowchart of the performance of social commerce storefront valuation operations as implemented in accordance with an embodiment of the invention. In this embodiment, social commerce storefront valuation operations are begun in step 3602, followed by the selection of a target social commerce storefront in step 3604 for valuation. Then, in step 3606, social graph information associated with the owner of the target storefront is retrieved. As used herein, social graph information refers to information that describes the online relationship between a plurality of users. The social graph information is then analyzed in step 3608 to determine the identity, and associated social site history, of the users in the owner's social network. In one embodiment, the social commerce marketplace system authenticates to multiple third party social networking sites to retrieve the users' social identity and social site history.

Then, in step 3610, a digital worth score is generated for the owner of the target storefront owner and all users within their social graph. As used herein, a digital worth score refers to a numeric value, or set of values, associated with a predetermined user's social influence. In various embodiments, a digital worth score is derived from a user's social influence. As likewise used herein, social influence broadly refers to the level of influence a user of a social networking environment is capable of exerting upon a predetermined market segment. In various embodiments, the financial value of the associated purchase(s) of one or more predetermined products or product classes is used to determine the digital worth score. The individual digital worth scores are then processed in step 3612 to generate an aggregate digital worth score.

Then, in step 3614, social commerce information related to the social commerce storefront is retrieved. In various embodiments, the retrieved information includes forecasted traffic rates associated with the value of the target social commerce storefront's key words, the value of its merchandize and services, and corresponding advertising. The retrieved social commerce information is then processed in step 3616 with the aforementioned aggregate digital worth score to generate a social commerce valuation value. In one embodiment, the social commerce valuation value comprises a net present value (NPV) familiar to those of skill in the art.

Social commerce storefronts that are comparable to the target storefront are then identified in step 3616, followed by comparing the comparing the social commerce valuation value of those storefronts that have been sold to the social commerce valuation value of the target storefront in step 3620. The potential monetary value of the target storefront is then determined in step 3622 by selecting the social commerce valuation value of the most comparable storefront that has been sold. In one embodiment, an average of the respective social commerce valuation values of a plurality of comparable storefronts is used to determine the monetary value of the target storefront. A determination is then made in step 3624 whether to end social commerce storefront valuation operations. If not, then the process is continued, proceeding with step 3604. Otherwise, social commerce storefront valuation operations are ended in step 3636.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system comprising:
   a processor;
   a data bus coupled to the processor; and
   a computer-usable medium embodying computer program code, the computer-usable medium being coupled to the data bus, the computer program code interacting with a plurality of computer operations and comprising instructions executable by the processor and configured for:
      processing a first set of social graph data associated with a first social media user to identify a plurality of second social media users, the first social media user associated with a first social commerce storefront, the plurality of second social media users associated with a second set of social graph data;
      processing the first and second sets of social graph data to generate a first digital worth score and a plurality of second digital worth scores;
      processing the first and second digital worth scores to generate an aggregate digital worth score;
      retrieving social commerce data associated with the social commerce storefront;
      processing the aggregate digital worth score and the retrieved social commerce data to generate a first social commerce valuation value;
      identifying a second social commerce storefront comparable to the first social commerce storefront, the second social commerce storefront comprising a second social commerce valuation value;
      performing comparison operations to compare the first social commerce valuation value to the second social commerce valuation value to generate a potential monetary value for the virtual storefront.

2. The system of claim 1, wherein the product catalog data corresponds to a subset of the purchasable products.

3. The system of claim 1, wherein the product catalog data is processed to generate widget data, wherein the widget data is provided within a user interface window by a widget.

4. The system of claim 1, wherein:
   the social data is processed to generate social graph data;
   the social graph data is processed to generate keyword data and theme data;
   the keyword data and the theme data is processed to identify a subset of the product catalog data; and
   the subset of the product catalog data is provided to the user.

5. The system of claim 1, wherein the product catalog data is associated with a campaign.

6. The system of claim 1, wherein:
   the product catalog data is associated with social commerce content data; and
   the social commerce content data is concurrently provided to the user with the product catalog data.

7. A non-transitory computer-usable medium embodying computer program code, the computer program code comprising computer executable instructions configured for:
   processing a first set of social graph data associated with a first social media user to identify a plurality of second social media users, the first social media user associated with a first social commerce storefront, the plurality of second social media users associated with a second set of social graph data;
   processing the first and second sets of social graph data to generate a first digital worth score and a plurality of second digital worth scores;
   processing the first and second digital worth scores to generate an aggregate digital worth score;
   retrieving social commerce data associated with the social commerce storefront;
   processing the aggregate digital worth score and the retrieved social commerce data to generate a first social commerce valuation value;
   identifying a second social commerce storefront comparable to the first social commerce storefront, the second social commerce storefront comprising a second social commerce valuation value;
   performing comparison operations to compare the first social commerce valuation value to the second social commerce valuation value to generate a potential monetary value for the virtual storefront.

8. The non-transitory computer usable medium of claim 7, wherein the product catalog data corresponds to a subset of the purchasable products.

9. The non-transitory computer usable medium of claim 7, wherein the product catalog data is processed to generate widget data, wherein the widget data is provided within a user interface window by a widget.

10. The non-transitory computer usable medium of claim 7, wherein:
    the social data is processed to generate social graph data;
    the social graph data is processed to generate keyword data and theme data;
    the keyword data and the theme data is processed to identify a subset of the product catalog data; and
    the subset of the product catalog data is provided to the user.

11. The non-transitory computer usable medium of claim 7, wherein the product catalog data is associated with a campaign.

12. The non-transitory computer usable medium of claim 7, wherein:
    the product catalog data is associated with social commerce content data; and
    the social commerce content data is concurrently provided to the user with the product catalog data.

13. The non-transitory computer usable medium of claim 7, wherein the computer executable instructions are deployable to a client computer from a server at a remote location.

14. The non-transitory computer usable medium of claim 7, wherein the computer executable instructions are provided by a service provider to a customer on an on-demand basis.

* * * * *